(12) United States Patent
Isaacs et al.

(10) Patent No.: US 6,426,745 B1
(45) Date of Patent: Jul. 30, 2002

(54) MANIPULATING GRAPHIC OBJECTS IN 3D SCENES

(75) Inventors: Paul Isaacs, San Francisco; Kurt J. Schaefer, Mountain View; Robert K. Myers, Santa Cruz, all of CA (US)

(73) Assignee: Computer Associates Think, Inc., Islandis, NY (US)

( * ) Notice: Subject to any disclaimer, the term of this patent is extended or adjusted under 35 U.S.C. 154(b) by 0 days.

(21) Appl. No.: 08/845,857

(22) Filed: Apr. 28, 1997

(51) Int. Cl.[7] .......................... G06T 15/00; G06T 11/00
(52) U.S. Cl. ....................................... 345/419; 345/433
(58) Field of Search ................................ 345/433, 436, 345/437, 438, 439, 145, 419; 382/256, 277, 294, 295, 296, 298

(56) References Cited

U.S. PATENT DOCUMENTS

| | | |
|---|---|---|
| 5,588,098 A | 12/1996 | Chen et al. |
| 5,694,142 A | 12/1997 | Dumoulin et al. ............. 345/9 |
| 5,694,153 A | 12/1997 | Aoyagi et al. ............. 345/161 |
| 5,738,352 A | 4/1998 | Ohkubo et al. ......... 273/148 B |
| 5,771,042 A * | 6/1998 | Santos-Gomez ........ 345/145 X |
| 5,825,308 A * | 10/1998 | Rosenberg .............. 345/145 X |

OTHER PUBLICATIONS

Ignatin, "A Computer Graphics Interface for Intuitive Manipulation of Three–Dimensional Objects", Senior Independent Work, Princeton University, (May 30, 1990).

* cited by examiner

*Primary Examiner*—Matthew Luu
*Assistant Examiner*—Chanté Harrison
(74) *Attorney, Agent, or Firm*—Cooper & Dunham, LLP

(57) ABSTRACT

Graphic objects in a 3D scene are manipulated using a computer system by defining a coordinate space based on a feature of a graphic object in the 3D scene, and constraining a range of motion available to an object manipulation operation based on the defined coordinate system. A graphic object, or its constituent graphic elements, can be manipulated (e.g., translated, scaled or rotated) using the constrained range of motion. The motion can be constrained to a motion plane, to a single direction within the motion plane, or in a direction perpendicular to the motion plane. The definition of new coordinate spaces and constrained ranges of motion can be integrated into the beginning stage of a standard cursor manipulation technique (e.g., click-drag-release) thus obviating the need for separate and distinct commands that tend to diminish user interface agility.

17 Claims, 67 Drawing Sheets

MANIPULATING GRAPHIC OBJECTS IN 3D SCENES

BACKGROUND

This invention relates to manipulating graphic objects in 3D scenes.

The computer system illustrated in FIG. 1—which includes mouse 15, keyboard 16, CPU 17 and CRT 18—represents a hardware setup for running software that allows a user to view and/or create 3D scenes. A 3D scene typically comprises one or more graphic entities placed in a background setting to create an informative or aesthetically pleasing image. Such 3D scenes may be used in generating image data files (e.g., GIF or JPEG), web pages (e.g., HTML files), 3D worlds (e.g., VRML files) or may be strung together in a sequence to create an animated 3D movie (e.g., MPEG-1 or Quicktime files). These 3D scenes are "virtual" in the sense that the space they occupy and their graphic entities and characteristics are conceptual rather than actual, but possess the functional (e.g., optical and spatial) properties of the physical entities that they represent.

To compose a 3D scene, a user (e.g., a graphical content developer) typically uses an interactive, graphic drawing application to construct several 3D entities from individual graphic elements such as polygons, edges (or lines) and points. The user can manipulate the 3D entities and their respective elements, for example, through sizing (or scaling), positioning (or translating) and orienting (or rotating) operations, until the scene has the desired appearance. FIG. 2 shows an example of a 3D scene composed of several graphic entities such as a table 20, a ruler 21, a chair 22 and a model X-29 aircraft 23 within a room formed of walls 24 and a tiled floor 25. To create this scene, the user had to carefully compose and arrange each of the graphic entities and their elements to be properly oriented, positioned and scaled relative to the other entities and elements in the scene. Additionally, such composition and arrangement must be performed on elements within an entity such that they are properly oriented, positioned and scaled relative to other elements within the same graphic entity.

An "object" refers to one or more graphical entities, one or more graphical elements forming a graphical entity, or some combination of graphical entities and elements. Hence any statement regarding manipulation, composition or arrangement of graphical objects may be applied equally to graphical entities or graphical elements, either alone or in combination.

Using conventional systems and methods to create graphic scenes of any complexity can be a painstaking and time-consuming process. Generally a user is required to manually create and manipulate graphic objects using mouse pointing and click-and-drag techniques that require considerable degrees of hand-eye coordination and practice and often several iterations of trial-and-error. These tasks are considerably more difficult when creating a 3D scene because the user must manipulate objects in a virtual 3D space using two-dimensional input (e.g., the user's movement of the mouse along the plane of the mouse pad). As a result, mouse movements frequently are misinterpreted by the graphics program, resulting in undesired object manipulations—that is, objects will have skewed features or will end up in the wrong location or orientation.

Several different visual object manipulation tools have been developed to aid users in manipulating objects in 3D scenes. These tools may or may not appear temporarily within the 3D scene, however, they are not a part of the 3D scene that is the final product. Rather, they appear on the display screen only while the 3D scene is being authored to assist a user in manipulating graphic objects.

Object manipulation tools generally fall into two different categories: indirect and direct. With indirect manipulation tools, the user does not work within the 3D scene itself but rather uses a separate graphical abstraction which lies outside the 3D scene, typically at a fixed location on the display screen, to bring about corresponding changes to the graphic object. An example of an indirect manipulation tool is a slider bar or thumbwheel, provided as part of the graphic user interface (GUI), which causes a graphic object to rotate about a single axis or translate along one axis in response to input from a user.

Direct manipulation tools, in contrast, allow a user to manipulate a graphic object directly by placing the cursor in the proximity of the object, and dragging the cursor within the scene to affect the desired change to the object. An example of a direct object manipulation tool is a manipulator box having visual features which enable a user to translate, rotate and scale a graphic object encompassed within the manipulator box.

As shown in FIG. 2, for example, a manipulator box 26 having boundary line 28 encompasses the X-29 aircraft 23. The user can translate the X-29 within the scene by clicking the cursor anywhere on one of the box's faces and dragging the cursor to the desired location. In response, the X-29 and the manipulator box will follow the cursor's movement. The user can scale the aircraft by clicking the cursor on one of the white cubes 27 at each vertex of the manipulator box and dragging the cursor in the desired direction. If the user drags a white cube 27 inward towards the aircraft, the X-29 and the manipulator box become proportionately smaller. In contrast, the X-29 and the manipulator box become larger if the user drags a white cube 27 away from the aircraft. The X-29 can be rotated by clicking on and dragging one of the green spheres 29 which causes the X-29 and the manipulator box to rotate about a single one of the three axes of the manipulator box.

The three lines connecting the three sets of green spheres 29 define the three different axes of rotation for the manipulator box 26. The axis about which the rotation occurs is determined by considering which knob is selected and, following selection of the knob, the initial direction of motion of the cursor. The net result is that the knob rotates about one of the two axes to which the knob is not attached, carrying the manipulator box and the X-29 along with it.

Object manipulation tools, both direct and indirect, may serve several purposes. First, the tools may provide visual cues or feedback which better enable a user to manually position an object so that it will end up at the desired location and orientation. For example, some 3D drawing applications provide a two-dimensional grid 30 as shown in FIG. 3 which enables users to manually position a graphic object within a 3D scene with increased precision, and thereby achieve consistency and proportionality throughout the scene. A grid typically is implemented as a plane containing two perpendicular axes of a 3D coordinate system. The third axis, called the plane normal, is perpendicular to the first two axes and therefore perpendicular to the plane of the grid as well. In FIG. 3, grid 30 contains the Y and X axes and the plane normal is the Z axis. A user can align graphic objects to the grid or position one object a desired number of units from another object.

Object manipulation tools also may allow a user to selectively constrain the motion of a graphic object during manipulation relative to one or more axes of a coordinate system. Attempting to interpret 2D mouse movements as fully 3-dimensional gestures with simultaneous motion in all 3 dimensions is an exceedingly difficult, if not impossible, is task. Users accordingly can instruct the program to interpret mouse movements as corresponding to a single direction along a designated axis (i.e., one-dimensional motion constrained to a single axial direction within or perpendicular to a plane) or within a designated plane (i.e., two-dimensional motion constrained to the plane defined by two axes of a coordinate system). The re-interpreted, constrained mouse motion can be used to apply any type of object manipulation, including translation, rotation and scaling. The purpose of constraining motion to fewer than all three axes is to divide the difficult task of moving an object in virtual 3D space into several more manageable subtasks. Rather than forcing a user to be so deft at mouse control as to be able to move an object precisely from one point in 3D space (e.g., 0, 3, 27) to another point in 3D space (e.g., 60, 4, 2) with a single mouse movement, the user can make three separate movements: one constrained to motion along the X-axis (from (0, 3, 27) to (60, 3, 27)), a second movement constrained to motion along the Y-axis (from (60, 3, 27) to (60, 4, 27)) and a third movement constrained to motion along the Z-axis (from (60, 4, 27) to (60, 4, 2)). As a result, the likelihood of unintentional and incorrect movements is minimized because the object can translate only in a single direction during each sequential translation operation.

The motion of an object can be constrained relative to any of several different predefined coordinate systems, each of which defines a separate, predetermined "coordinate space." Within a single 3D scene, at least four different kinds of coordinate spaces can exist, each instance of which has its own independent set of axes. The axes for the different spaces need not, and typically will not, be aligned with each other. Rather, each different coordinate space defines a separate and independent frame of reference in which graphic objects can be manipulated.

First, all 3D scenes exist within a "world space"—an absolute coordinate system existing at the highest level of abstraction. Each scene has only one instance of a world space. In FIG. 2, for example, the room formed of walls 24 and a tiled floor 25 can be thought of as that scene's world space.

Second, each entity within a 3D scene resides within its own "local space"—a local coordinate system that remains fixed relative to the elements forming the graphic entity. In FIG. 2, for example, the local space for the X-29 aircraft 23 may, but need not necessarily, be aligned with the manipulator box's axes of rotation (i.e., the three lines connecting the three sets of green spheres 29).

Third, the computer screen defines a "screen space" having a Y-axis extending vertically along the screen, an X-axis extending horizontally along the screen and a Z-axis extending perpendicularly through the plane of the screen. Each scene has only one screen space coordinate system.

Lastly, graphic entities can be manipulated with reference to a "parent space"—a space that is hierarchically one level above the entity's local space. When a "parent" is moved, the "child" moves along with it, while a child may be moved relative to and independent of its parent. The parent space of an entity is defined as the local space of the parent of that entity. For example, the X-29 in FIG. 2 sits on the table 20 and so the table may be regarded, but need not necessarily be regarded, as the parent of the X-29. If the table is the X-29's parent, then moving the table simultaneously will move the X-29 an equal amount, while the X-29 "child" may be moved independently of its parent, the table. And if the table is the X-29's parent, then the X-29's parent space is the table's local space.

An example of constraining motion relative to the axes of a predefined coordinate space is illustrated in FIGS. 4A and 4B. The axes depicted in FIGS. 4A–B potentially could correspond to any of the four coordinate spaces described above. In this example, the user selectively constrains the movement of an object 40 so that, regardless of the mouse movements made by the user, the object 40 will move only in the direction of a single designated axis (X, Y or Z) within the coordinate space. In FIG. 4A, for example, the object 40 is at position 44 which has the XYZ coordinates (0, 0, N) relative to the origin 48 of the coordinate system. This means that the object 40 is located at 0 along both the X and Y-axes but at an offset N along the Z-axis. The object's position as projected onto grid 30 is indicated by shadow 47. In this example, the user has constrained cursor motion to the X-axis direction as indicated by directional arrow 42. As the user drags the cursor 41 left-to-right generally in the direction pointed at by directional arrow 42, object 40, its manipulator box 46 and its shadow 47 move in the direction of the X-axis from position 44 in FIG. 4A to position 45 in FIG. 4B, which has the coordinates (D, 0, N). The Y and Z-axis coordinates of cursor 41 and object 40 remain constant throughout the translation operation, even if the mouse was moved in a direction other than along the X-axis. The user can constrain motion in this manner similarly along the Y or Z axes.

An object alternatively can be constrained to move freely within a single plane (i.e., in any combination of the directions of two axes), rather than in the direction of just a single axis. FIG. 5 shows a time-lapse view of an object 51 being translated within the plane of a two-dimensional grid 50 along an arbitrary cursor path 52. The grid 50 is aligned with the plane defined by the X and Z-axes of the coordinate space. As the user moves the cursor over the grid 50, the object 51 follows the cursor through successive positions P1–P7, each of which must remain on grid 50. In this plane-constrained manipulation mode, the user is unable to modify the Y-axis coordinate of the object 51.

Grid 50 in FIG. 5 also may provide a "snapping" effect. Snapping constrains the position of a graphic object to vertex points on the grid 50, which has a predefined spacing between the logical grid lines. As shown in FIG. 5, as the user moves object 51 along cursor path 52, the object "snaps" to a closest grid vertex point 53 even though the vertex point might be slightly outside of the cursor path. Snapping enables objects to be positioned relative to each other based on the positioning and granularity of the underlying logical grid.

A variation of plane-constrained snapping is illustrated in FIG. 6, which shows a time-lapse view of a single display screen 60 split into two side-by-side windows: a perspective view window 61 and an orthographic view window 62. In this mode, object 65 is constrained to a plane of motion that is parallel to, and separated an arbitrary distance from, grid 63 which is aligned with the plane defined by the X and Z-axes. A user can manipulate object 65 by clicking the cursor on the object while in the orthographic view window 62 and manipulating the object as desired within that window. The resulting movement is displayed in a perspective view in window 61. As shown in FIG. 6, the user moves the object 65 through successive positions P1–P7 along an arbitrary cursor path 64 in window 62 and the object snaps to positions above the grid 60 corresponding to vertex points 66 on the grid. The perspective view includes shadows S1–S7 corresponding to positions P1–P7 to give the user a visual indication of the object's position as projected onto the grid.

Another variation of snapping is shown in FIG. 7 in which several objects 72, 73 and 74 are arranged on a grid 70. In this time-lapse view, a user has introduced (e.g. pasting, importing or creating) a new object 71 into the scene and drags it through the scene along an arbitrary cursor path 75. As the object 71 moves through successive positions P1–P13, the object automatically realigns itself such that its bottom surface snaps to the object surface to which it is closest. Between positions P8 and P9, for example, object 71 changes its orientation from having its bottom surface aligned with the front surface of block 73 to having its bottom surface aligned with a top surface 75 of cylinder 74. Object 71 remains in this same orientation until it reaches position P12, at which point object 71 reorients itself so that its bottom surface is aligned with the side surface 76 of cylinder 74. As the object 71 moves along cursor path 75, the object may encounter various snap points at key locations of different surfaces. For example, position P10 could correspond to a snap point at the center of the top surface 75 of cylinder 74. If the cursor passed close enough to this snap point, the object would automatically pull away from the cursor path and temporarily "stick" to (i.e., resist movement away from) position P10.

Other snapping techniques include the use of "snap sources" and "snap targets" to effect a "move this to there" operation. To reposition an object, the user will position a snap source identifier on the object to be manipulated and a snap target identifier at the desired location and orientation within the scene to which the object is to be moved. Upon activating the snap operation, the object will automatically translate and rotate so that the snap source identifier moves to, and becomes aligned with, the snap target identifier.

Many of the same or similar techniques as described above can be applied to object manipulations other than translation—e.g., scaling or rotating. For example, an object can be constrained to rotate about a single axis within a coordinate system or the object may be allowed to rotate freely in all three directions about its center point, which remains fixed. Similarly, the scaling of an object can be constrained relative to one or more axes of a coordinate system.

SUMMARY

In one aspect, graphic objects in a 3D scene are manipulated using a computer system by defining a coordinate space (e.g., a 3D space) based on a feature (e.g., polygon, edge or point) of a graphic object in the 3D scene, and constraining a range of motion based on the defined coordinate system. A graphic object, or its constituent graphic elements, can be manipulated (e.g., translated, scaled or rotated) using the constrained range of motion. The motion can be constrained to a motion plane, to a single direction within the motion plane, or in a direction perpendicular to the motion plane. The definition of coordinate spaces and constrained ranges of motion can be integrated into the beginning stage of a standard cursor manipulation technique (e.g., a click-drag-release gesture) thus obviating the need for separate and distinct commands that tend to diminish user interface agility.

In defining the coordinate space, a motion surface (either a planar or non-planar entity) or motion plane can be specified. The motion plane can be aligned based on two dimensions of the coordinate space and is defined using a different heuristic depending on the type of feature under consideration. When the feature is a polygon, the motion plane is coplanar with the plane of the polygon. The motion plane for a polygon can be determined from two adjacent edges in the polygon, for example, a pair of adjacent edges closest to a specified position (e.g., a cursor position). When the feature is an edge, the motion plane is perpendicular to an average of normals of polygons (either all of the polygons or a subset thereof) touching that edge. When the feature is a point, the motion plane is calculated as a function of edges (either all of the edges or a subset thereof) that touch that point. In the case of a point, the motion plane approximates an average of planes touching that point, and can be calculated as the plane whose normal is the average of plane normals for edges that touch that point. Motion plane definition also can be based on a spatial relationship between the feature and other adjacent features. For any type of feature, a coordinate space defined according to one feature of a graphic object in the 3D scene is independent of a coordinate space defined according to another feature of a graphic object in the 3D scene.

The particular feature that is to be used in defining the coordinate space can be identified from input from a user (e.g., a mouse click). A new or different coordinate space is defined (or the same coordinate space is redefined) with each successive instance of input from the user. Other input received from the user can be used in constraining a range of available motion. For example, when the user clicks the mouse on a polygon, the range of motion is constrained to a plane that is coplanar with the polygon; when the user clicks the mouse on an edge, the range of motion is constrained to a plane that is perpendicular to an average of normals of polygons touching that edge; and when the user clicks the mouse on a point, the range of motion is constrained to a plane that is a function of edges touching that point.

The user input upon which coordinate spaces and constrained ranges of motion are defined may be integrated with the dragging that is typical of a "click-drag-release" gesture such that "click" chooses a new coordinate space (or repeats the previous coordinate space) defined by three axial directions, "drag" moves in the chosen direction(s), and "release" ends the gesture. Hence no input beyond the click-drag-release gesture is required, even though a new coordinate space, along with its associated directions, is specified each time.

Once defined, the constrained range of motion can be used in manipulating a graphic object. Manipulation is performed in a direct, as opposed to an indirect, manner by a user of the computer based on the constrained range of motion. The feature that is to be manipulated can be either the same as, or different from, the feature that was used is defining the coordinate space. Available types of manipulations include translating, rotating and scaling of features. Translation can occur freely within a motion plane defined by two dimensions of the coordinate space, or in a single direction within the motion plane or in a direction perpendicular to the motion plane. Rotation can occur in one dimension about a fixed axis or freely in all three dimensions about a fixed point. Scaling can involve enlarging or shrinking a feature equally across one, two or three dimensions about a fixed point.

Any single feature within the 3D scene can be manipulated independently or a collection of two or more features can be manipulated at the same time. In the latter case, the collection of features is manipulated in concert such that each feature is affected in an analogous manner as every other feature. One of the features can be designated as the master feature. In that case, only the master feature is directly manipulated by the user while the motion of the remaining features is automatically matched to that of the master feature.

The constrained range of motion can be used in aligning a graphic object, for example, by snapping the graphic object to a constrained position. Such aligning can include positioning a graphic object relative to another graphic object, relative to an absolute grid, or positioning the object with a relative grid. Different types of aligning include translating, rotating or scaling a graphic object until a spatial condition is met or an alignment event occurs. Users can be provided with visual and sensory feedback to aid in the alignment operation.

In another aspect, a graphic object manipulation tool includes at least one knob that controls a graphic object manipulation function, a planar indicator having a center point, and a linear indicator passing through the planar indicator's center point in a direction perpendicular to the plane defined by the planar indicator. The planar indicator and the linear indicator automatically align themselves relative to a feature of the graphic object when the tool is placed on the feature. When the feature comprises a polygon, the tool realigns such that the plane of the planar indicator is coplanar with a plane of the polygon. When the feature comprises an edge, the tool realigns such that the linear indicator is colinear with the edge. When the feature comprises a point, the tool realigns such that the planar indicator is coplanar with a plane whose normal is the average of plane normals for edges that touch that point.

The manipulation functions that can be performed with the tool include rotating and scaling one or more features of a graphic object. The tool can have two or more knobs, for example, one knob positioned on the planar indicator for controlling rotation and another knob positioned on the linear indicator for controlling scaling. Rotating the rotation knob causes a corresponding rotation of the feature of the graphic object, either in one dimension about the tool's linear indicator or in three dimensions freely about the center point of the tool.

To scale a feature of a graphic object, the scaling knob can be moved towards the tool's center causing the feature to shrink or the knob can be dragged away from the tool's center causing the feature to enlarge. The scaling can be controlled to occur equally in one, two or three dimensions about a fixed point. One dimensional scaling occurs along the linear indicator and about the planar indicator's center. Two dimensional scaling occurs within the plane defined by the planar indicator and about the tool's center. Three dimensional scaling also occurs about the tool's center.

The manipulation tool can take a wide variety of forms. It can include at least one spoke extending from an edge point of the planar indicator to the planar indicator's center point. A knob, for example, a rotation knob, can positioned at an intersection formed by the at least one spoke and an edge point on the planar indicator. Among other things, the planar indicator can be a wheel, a two-dimensional ring, a disk, a series of discrete points forming a discontinuous two-dimensional circle, a solid and continuous three-dimensional disk, or it can take a non-circular form. The linear indicator can be, among other things, an axle, a one-dimensional line, or a multi-dimensional rod (for example, having a cylindrical shape).

These feature-based manipulation tools and techniques provide users with simple yet powerful mechanisms that allow informative and/or aesthetically pleasing 3D scenes to be created rapidly, precisely and interactively. Rather than having to rely on predefined coordinate systems as frames of reference for manipulating objects, users can define their own coordinate systems dynamically based on any feature within the 3D scene. Each feature within the scene has an associated motion plane based on the type of feature (e.g., polygon, edge or point), its orientation within the scene, and the types and orientations of neighboring features. Users can specify, which each successive click of the mouse, motion planes that are independent of the predefined coordinate systems and use them to translate, rotate and/or scale any object (i.e., any single instance or collection of graphical entities and/or their constituent elements) within the scene. In performing these manipulation operations, users can constrain motion of the object relative to the motion plane. This includes the ability to constrain motion within the motion plane itself, to a single direction within the motion plane, and to a direction perpendicular to the motion plane.

Users can define motion planes and constrained ranges of motion and immediately move in those directions through quick, simple and standard cursor manipulation techniques such as mouse pointing, clicking and dragging. No special commands or equipment are required nor do any unconventional mouse manipulation techniques need to be learned. As a result, users can maintain a high degree of interface agility while manipulating objects.

The visual object manipulator described here, the PEP jack, provides users with a powerful and intuitive tool that can be used to scale or rotate any single instance or collection of graphical entities or their constituent elements within the scene. The PEP jack can align itself automatically relative to any feature as it is dragged through the scene. Because the particular orientation adopted by PEP jack depends on the type of feature to which it is attached, PEP jack is aligned automatically to the proper position to perform its scaling and rotating operations. The PEP jack's scaling capabilities are highly flexible, allowing users to quickly and easily scale objects about a fixed point equally in one, two or three-dimensions. Similarly, the PEP jack allows users to rotate objects either in one-dimension about the PEP jack's linear indicator or freely (i.e., unconstrained rotation in all three dimensions) about the PEP jack's center point.

The ability to constrain motion in the manners described provides users with a rich body of object manipulation functionality. The mechanisms that supply this functionality are intuitive and powerful. They allow users to directly manipulate objects while providing qualitative and quantitative feedback, both visual and sensory. Using this feedback, users are able to quickly and precisely align objects, or features of objects, relative to each other, and in an absolute sense.

Other advantages and features will become apparent from the following description, including the drawings and claims.

DETAILED DESCRIPTION

Figure 1:
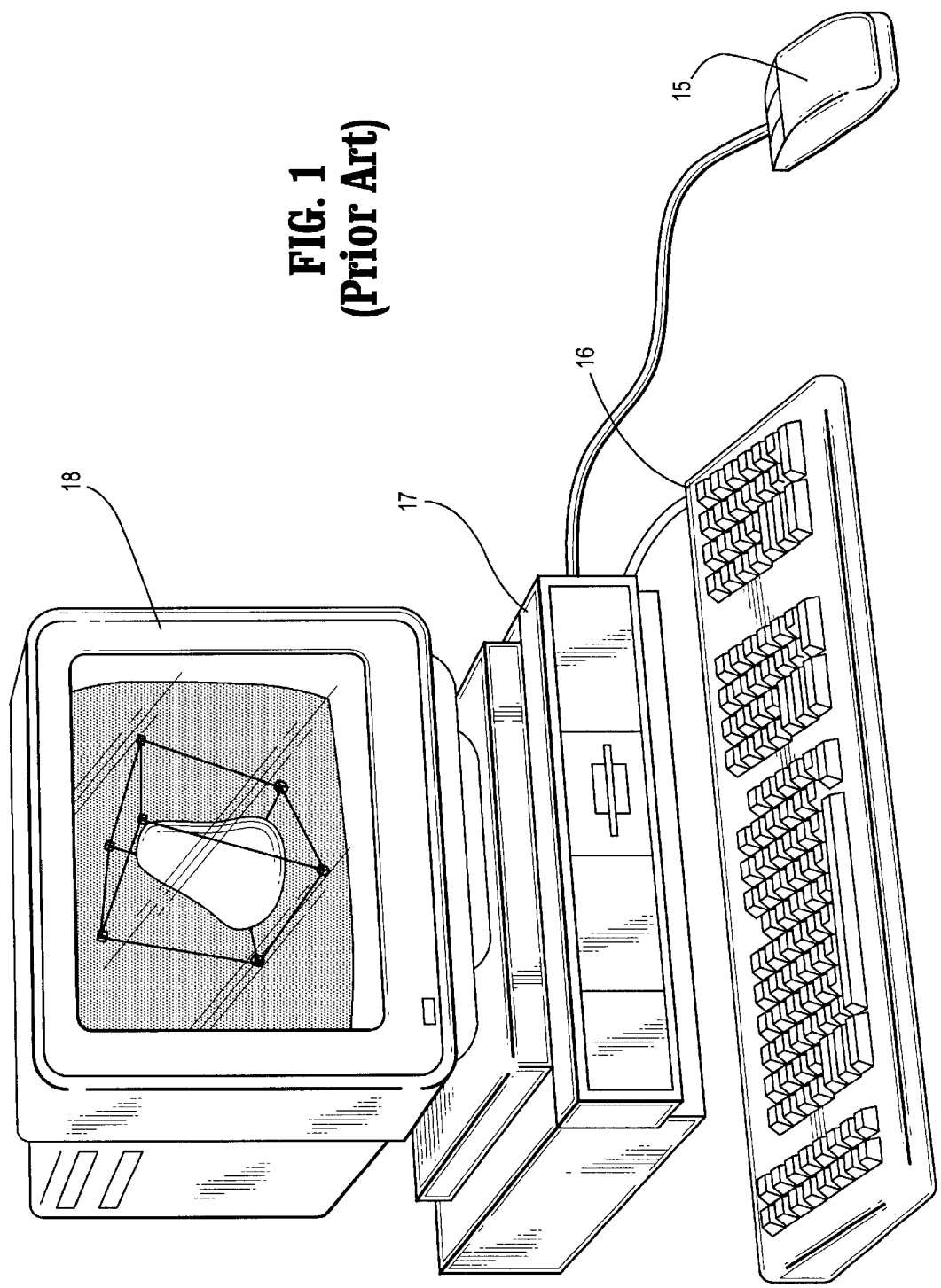
FIG. 1 shows a computer system displaying a 3D image.
Figure 2:
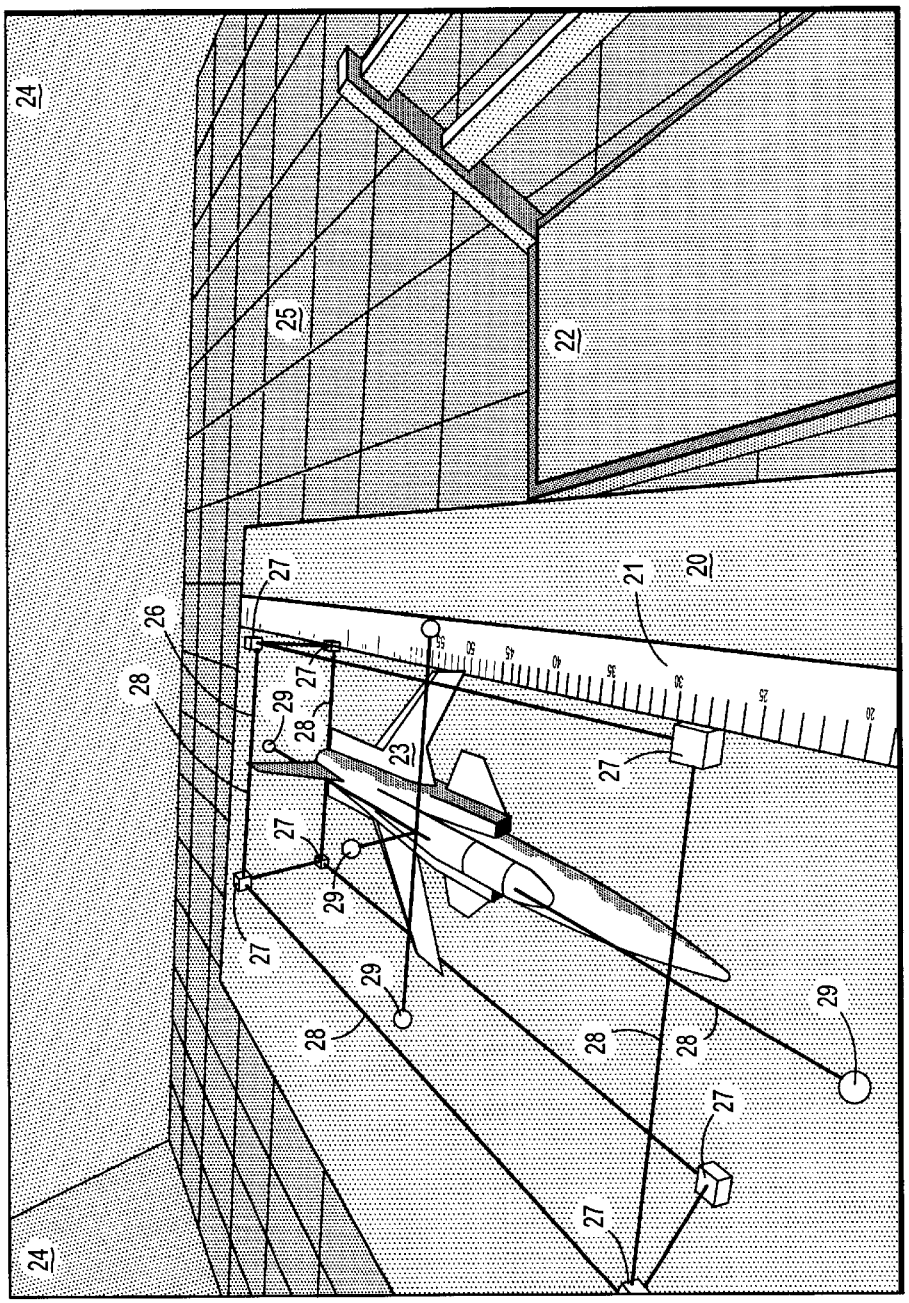
FIG. 2 shows an example of a 3D scene.
Figure 3:
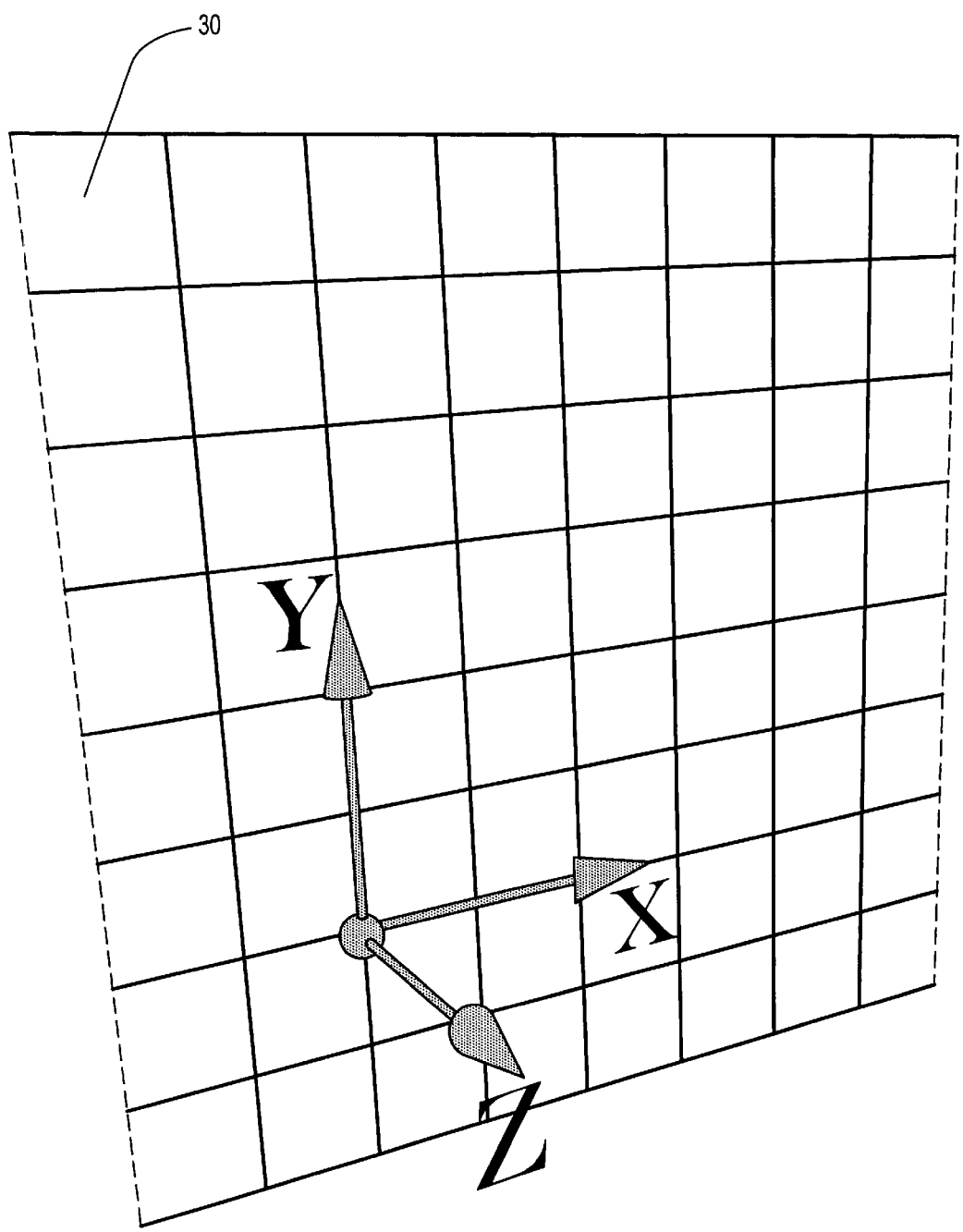
FIG. 3 shows a grid display and a set of 3D axes.
Figure 4A:
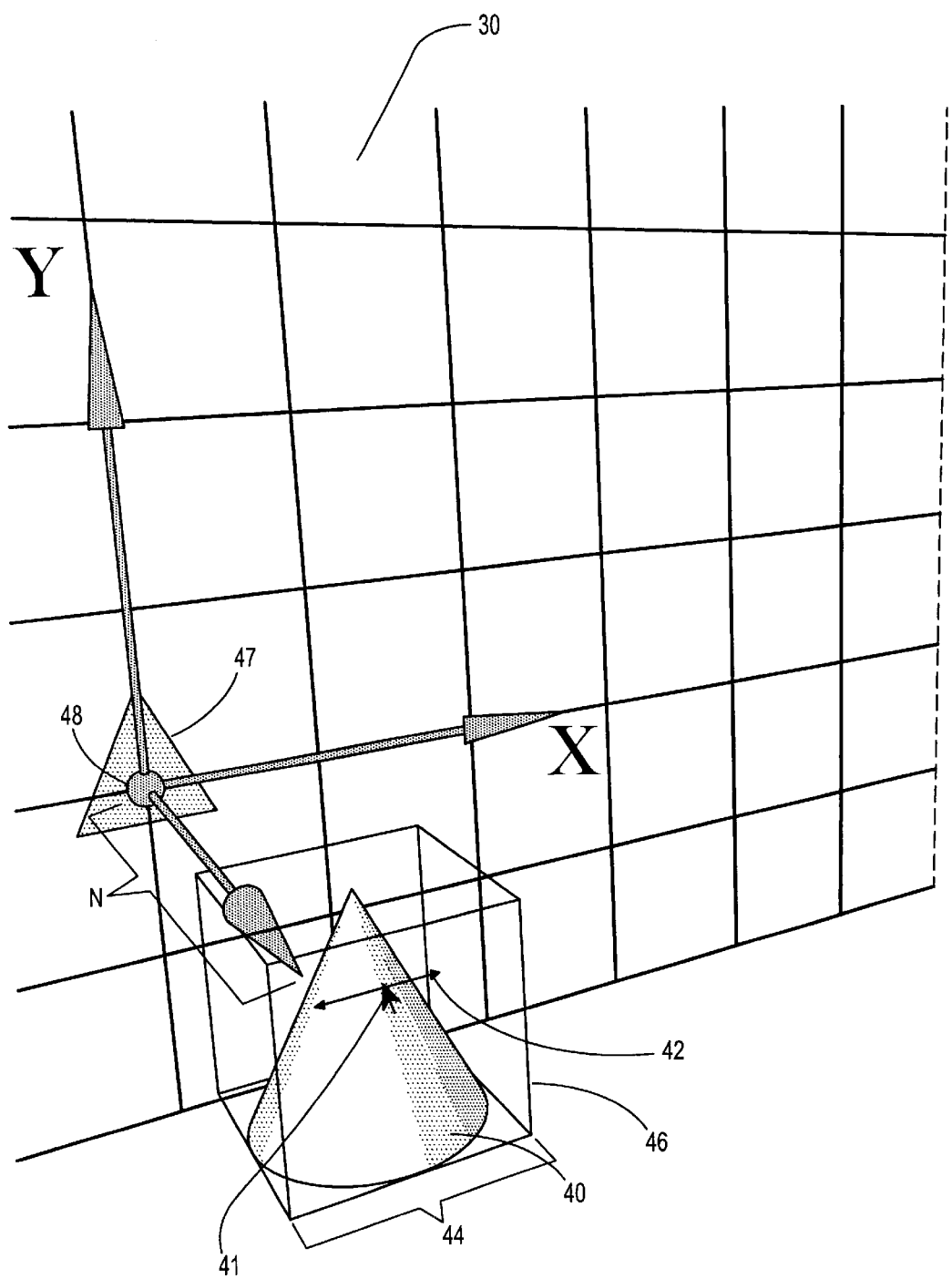
FIGS. 4A–4B illustrate an object being moved relative to the grid display of FIG. 3.
Figure 4B:
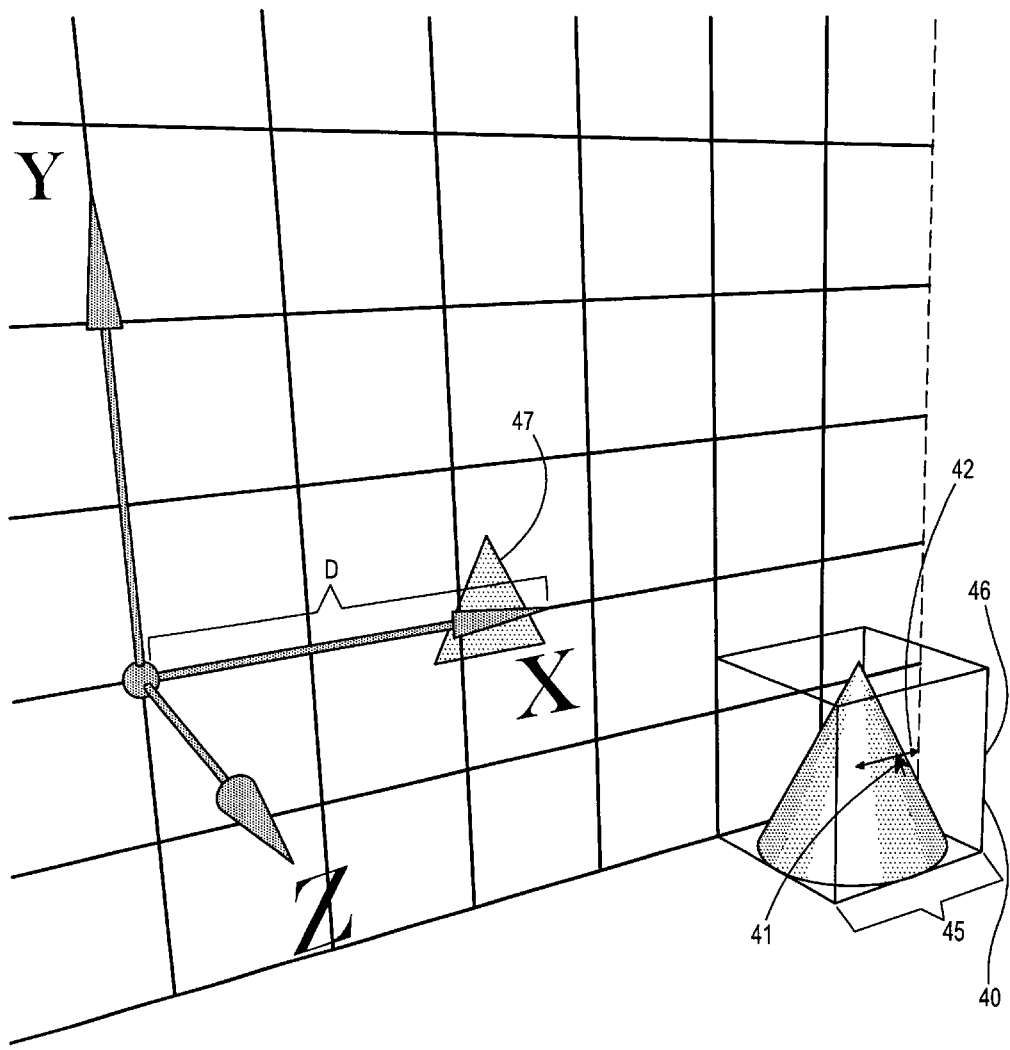
Figure 5:
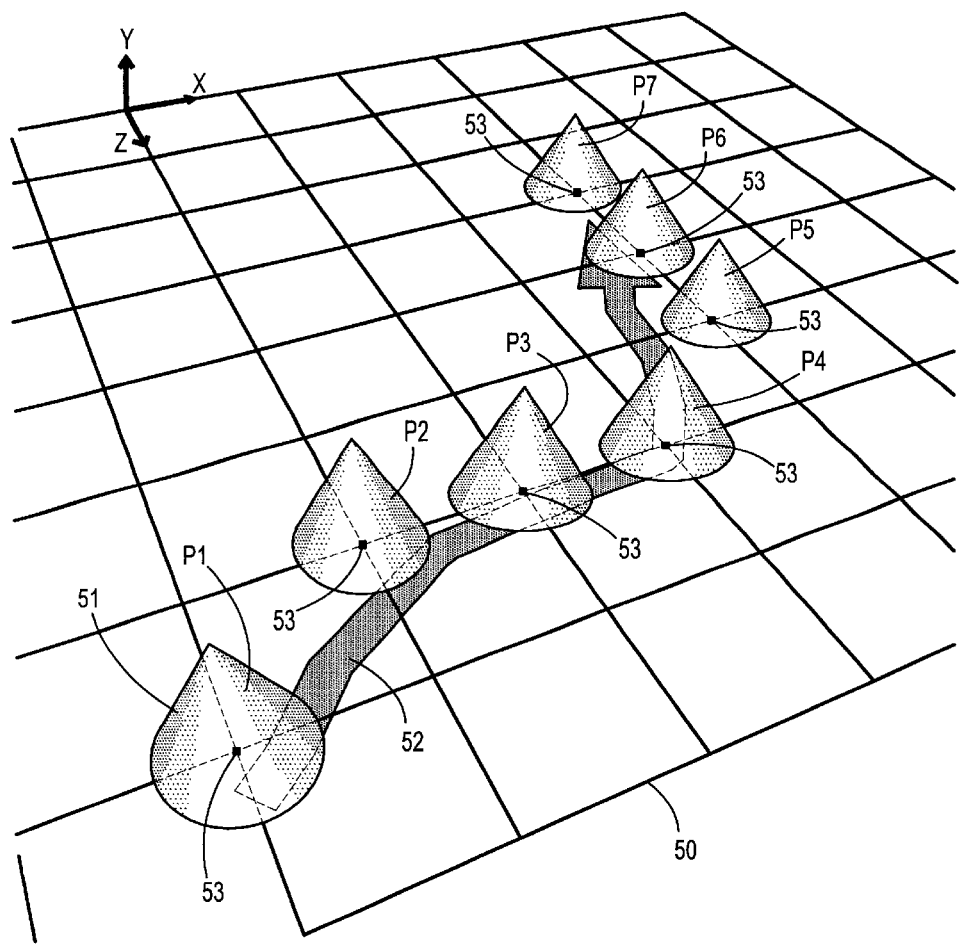
FIG. 5 shows an object being moved within a grid plane.
Figure 6:
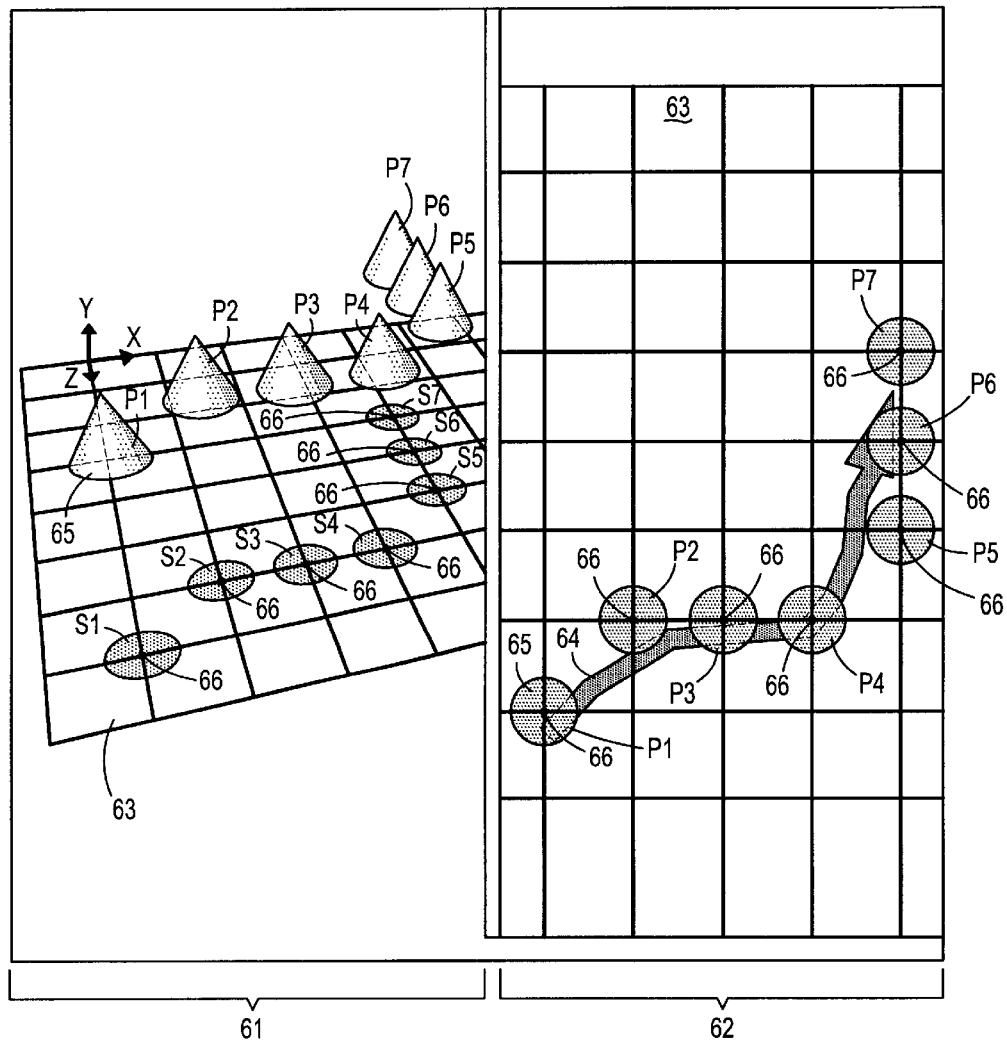
FIG. 6 is a split screen shot showing perspective and orthographic views of an object being moved over a grid plane.
Figure 7:
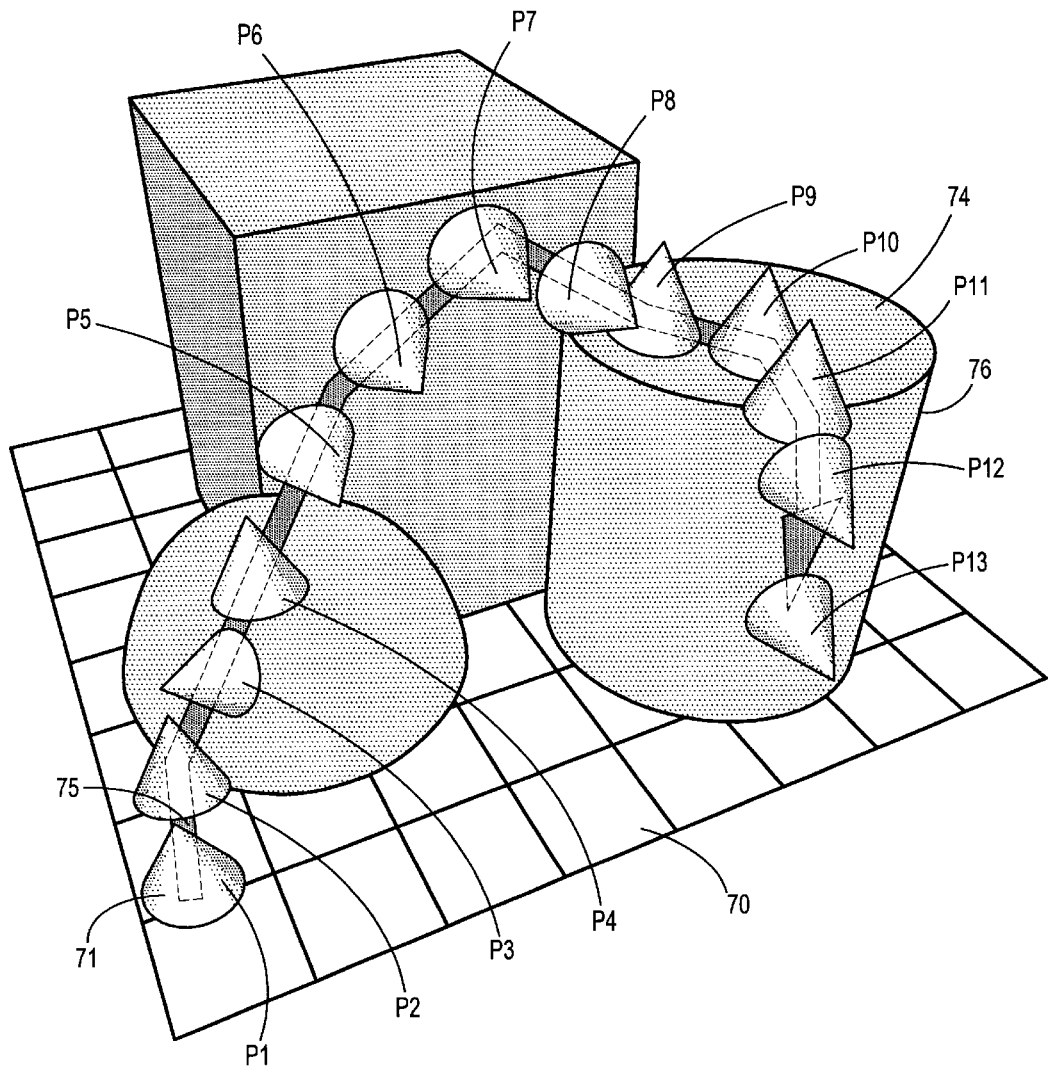
FIG. 7 shows a moving object being introduced so as to align with other objects in a 3D scene.

The visual feedback, motion constraint, and other object manipulation capabilities of conventional tools have proven useful in creating 3D scenes. However, because the planes of constrained motion that are available to users must correspond to the axes of a predefined coordinate system within various different coordinate spaces (e.g., world, local, screen or parent), these conventional manipulation tools are severely limited. A user cannot constrain motion relative to a chosen plane (or to a line parallel or normal to that plane) unless the plane happens to be aligned with two axes of the coordinate system. Moreover, arbitrary groupings of one or more graphical elements cannot be manipulated (e.g., translated, scaled or rotated) independent of the predefined coordinate spaces within which they were generated. These limitations of conventional systems have made it difficult, if not impossible, to develop complex 3D scenes in which, for example, the features of one object must be aligned with the features of another object in directions unrelated to the axes of the available coordinate spaces.

Silicon Graphics' Cosmo™ Worlds VRML authoring environment provides a rich body of object manipulation functionality that enables a user of a computer system to define a motion plane using any feature (e.g., polygon, edge, point) of any object within the scene regardless of its orientation relative to predefined coordinate systems. Any arbitrary grouping of features or objects in the scene then can be manipulated (e.g., translated, scaled or rotated) in a constrained manner relative to the defined motion plane using direct manipulation techniques.

Cosmo™ Worlds uses different heuristics to define the orientation of a motion plane based on the particular feature type—for example, polygon, edge or point—that is selected by the user. The chosen heuristics provide the user with an intuitive and powerful frame of reference in which to manipulate objects. Users can manipulate objects while constraining motion to the defined motion plane, to different directions within the motion plane, or to a direction normal to the motion plane.

Cosmo™ Worlds implements this and other functionality through intuitive visual manipulation tools which allow users to easily and precisely generate and manipulate graphic objects while developing a 3D scene. These tools enable users to orient, align, position and size the graphic objects, and their component features, relative to features of the same or other graphic objects within the scene. Several different visual cues and snapping capabilities are provided which enhance the user's ability to align objects quickly and precisely. Online documentation, incorporated herein by reference, describing the operation and features of Cosmo™ Worlds may be accessed at the following location on the World Wide Web:

http://www.sgi.com/Products/cosmo/worlds/CosmoWorlds_UG/

A copy of selected portions of the documentation is attached as Appendix A.

The rich object manipulation functionality provided by Cosmo™ Worlds is discussed under three different headings—dynamic motion plane definition, object manipulation tool, and object alignment techniques—although the discussion under each heading has bearing on the subject matter of the other two headings. The three headings are discussed in detail with reference to several examples illustrated in FIG. 8A through FIG. 37B.

Dynamic Motion Plane Definition

FIGS. 8A, 8B and 10A–12B illustrate a 3D virtual house undergoing construction using Cosmo™ Worlds. The grid lines on the surface of the house and the set of XYZ axes displayed in these figures are for purposes of explanation only and would not appear to the user in the Cosmo™ Worlds application display screen. The house 80 is composed of several different features including roof 81, front wall 82, door 83, left side wall 84, chimney 85 and floor 86. Each of these features in turn is defined by several different graphic elements such as polygons, edges and points, which are collectively referred to as PEPs. Other features including a right side wall and a back surface are present in the house's 3D model but are not visible in the view shown in FIG. 8A.

Figure 8A:
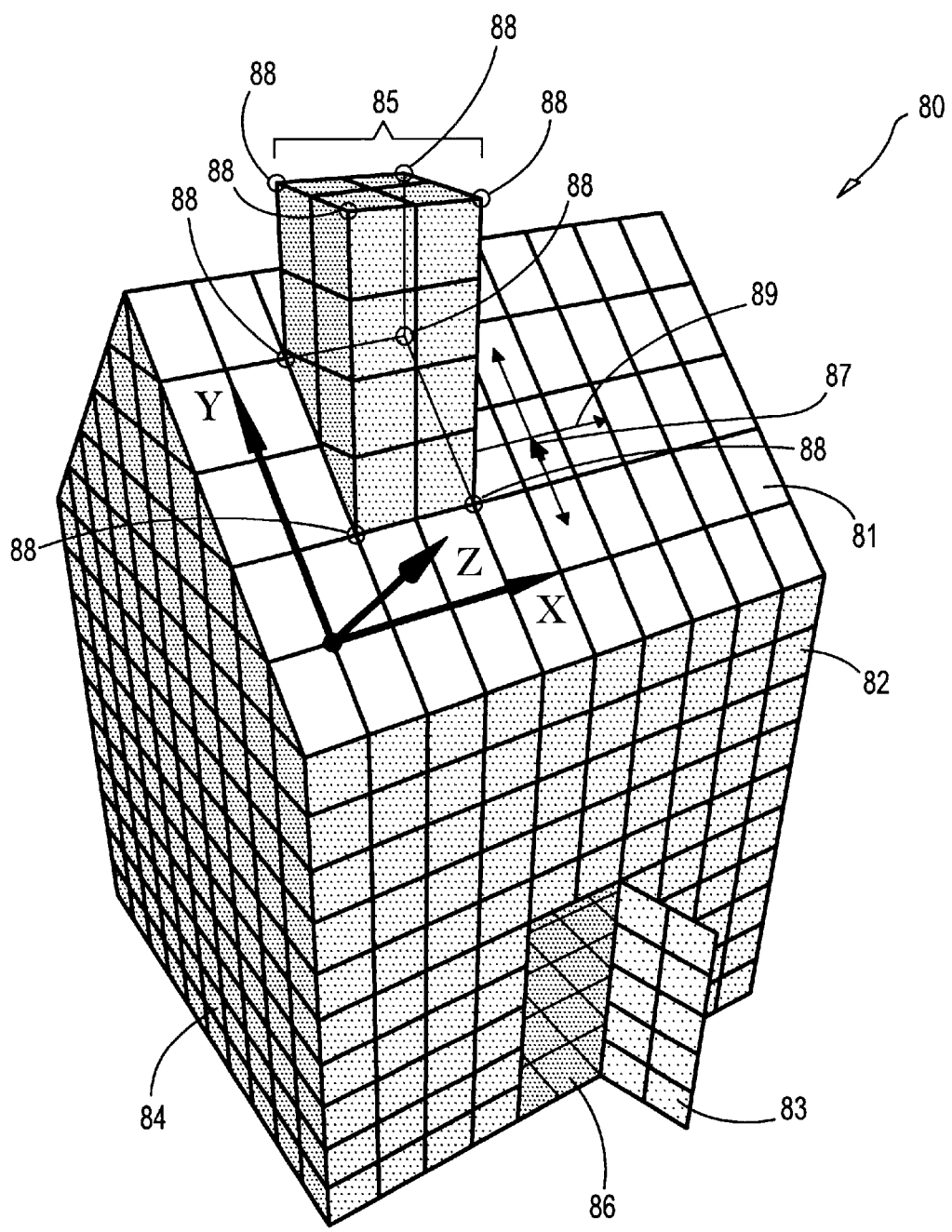
FIGS. 8A–8B show an example of translating a chimney within the plane of a roof on a house.
Figure 8B:
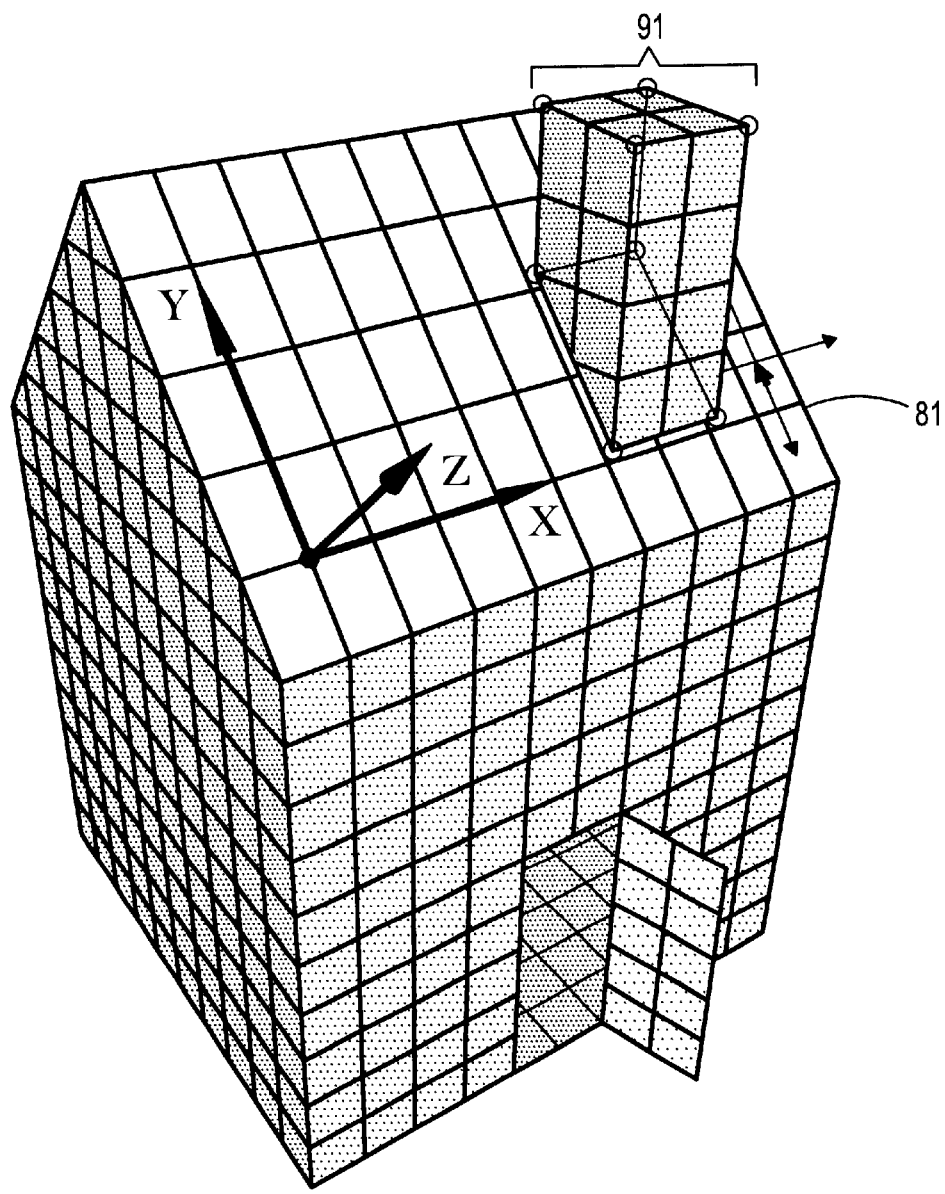

FIGS. 8A and 8B show a before and after sequence of translating one feature (e.g., one or more PEPs) within the scene while constraining that feature's motion relative to a plane corresponding to a reference PEP. To do so, the user enters the PEP editing mode, and uses standard mouse point-and-click techniques to select a feature (e.g., a single PEP or a collection of PEPs) to be manipulated. The chosen feature is referred to as the "PEP selection," and the last PEP in the selected group is referred to as the "master PEP selection." Cosmo™ Worlds uses various highlighting feedback techniques to aid the user in designating and recognizing PEPs. For example, a PEP temporarily appears brighter as the cursor passes over it so that the user will know when the cursor is correctly positioned to select a desired PEP. Once selected, points and edges appear yellow with a red center except for the master PEP selection which appears yellow with a black center. The vertices of selected PEPs are encircled with selection circles. Moreover, a selected PEP is always rendered so that it remains visible to the user when viewing the scene from any angle. In the example shown, the user has selected for manipulation the six polygons forming the chimney 85 (top, bottom, and four sides), as indicated by the color highlighting and eight selection circles 88.

After the user has selected the feature to be manipulated, the user must specify the motion plane relative to which the selected feature is to be manipulated. To do so, the user places the mouse cursor over the feature that is to be used as the reference PEP in defining the motion plane and clicks the mouse button. The orientation of the motion plane so defined will vary depending on the type of PEP designated. If the reference PEP is a polygon, the motion plane is parallel to the plane in which the polygon lies. If the reference PEP is an edge, the motion plane is the plane whose normal is the average of the plane normals of all polygons that touch that edge. If the reference PEP is a point, the motion plane is the plane whose normal is the average of the plane normals for all edges that touch that point. In the example illustrated in FIGS. 8A and 8B, because the user has placed cursor 87 over the roof 81, the reference PEP is the polygon forming the roof 81. The motion plane accordingly is parallel to the plane of the roof 81, that is, the plane defined by the Y and X axes.

Although Cosmo™ Worlds recognizes polygons, edges and points as the features that can be used in defining motion planes, virtually any other type of feature could be used for that purpose. For example, motion planes could be defined based on spherical surfaces or splines, either two or three-dimensional. Each additional type of geometric feature used to define a motion plane would have its own associated heuristic for calculating the corresponding motion plane. Moreover, the heuristics associated with different geometrical features need not necessarily define motion planes. Instead, other motion surfaces, for example, spherical or splinar surfaces, could be generated to define different ranges of constrained motion.

In addition, the calculations for finding motion planes, for example, for edges and points, may rely on a subset of the adjacent features rather than on all of the adjacent features. For example, where the reference PEP is an edge, the motion plane could be calculated as the plane whose normal is the average of the plane normals of some but not all polygons that touch that edge. Similarly, where the reference PEP is a point, the motion plane could be calculated as the plane whose normal is the average of the plane normals for some but not all of the edges that touch that point. These modified calculations may be useful for excluding internal surface polygons touching the reference PEP from the motion plane calculus.

The ability to define motion planes on-the-fly based on features within a scene is integrated into the Cosmo™ Worlds PEP editing mode in a manner that allows users to maintain a high degree of agility while manipulating objects. The user need not use any special-purpose equipment or execute any special command to signal that the motion plane is to be respecified (e.g., by clicking on a dedicated GUI button) to take advantage of the dynamic motion plane definition capabilities of Cosmo™ Worlds. Rather, coordinate spaces, and thus motion planes, can be created quickly and easily using standard cursor manipulation techniques such as mouse pointing, clicking and dragging. Each time the mouse is clicked on a different reference PEP, a new motion plane is defined automatically and dynamically based on the geometry of the reference PEP and its associated heuristic. The user's initial hand gesture in dragging the mouse can define a constrained range of motion relative to the motion plane.

After the user has identified the feature to be manipulated and has designated a reference PEP (thereby defining the motion plane), the user can manipulate the PEP selection relative to the motion plane in several different manners. If the user simply "click-drags" the cursor (i.e., drags the cursor with the mouse button clicked) without any keyboard or other input, the selected feature is constrained to move freely around within the motion plane. A cross formed of four directional arrows appears underneath the cursor to identify the directions in which the PEP selection can be moved.

If the user "control-drags" the cursor (i.e., presses the "CTRL" key on the keyboard while dragging the cursor with the mouse button clicked), the PEP selection is constrained to motion in a single direction—namely, perpendicular to the motion plane. In that case, a two-headed directional arrow appears underneath the cursor to identify the direction in which the PEP selection can be moved.

If the user "shift-drags" the cursor (i.e., presses the "SHIFT" key on the keyboard while dragging the cursor with the mouse button clicked), the PEP selection is constrained to motion in a single direction within the motion plane, as indicated by a two-headed directional arrow underneath the cursor. The particular direction of shift-constrained motion can depend on the location of the cursor within the scene, the type of PEP that is being used as the reference PEP, and the direction that the cursor moves in response to the user's initial gesture (i.e., the direction of motion immediately following the pressing of the mouse button).

Figure 9A:
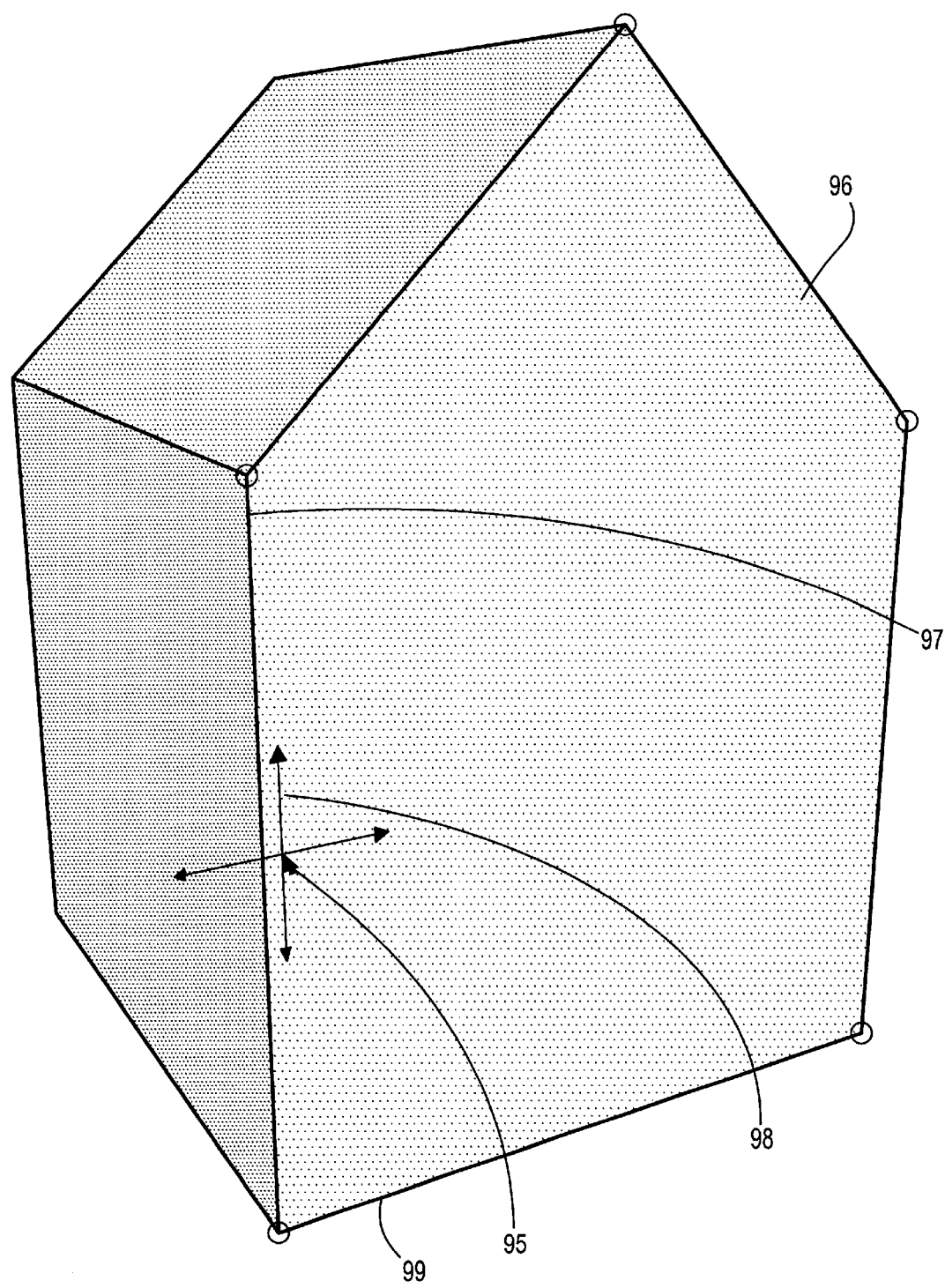
FIGS. 9A–9C illustrate how motion constraints are defined relative to the edges of a polygon.
Figure 9B:
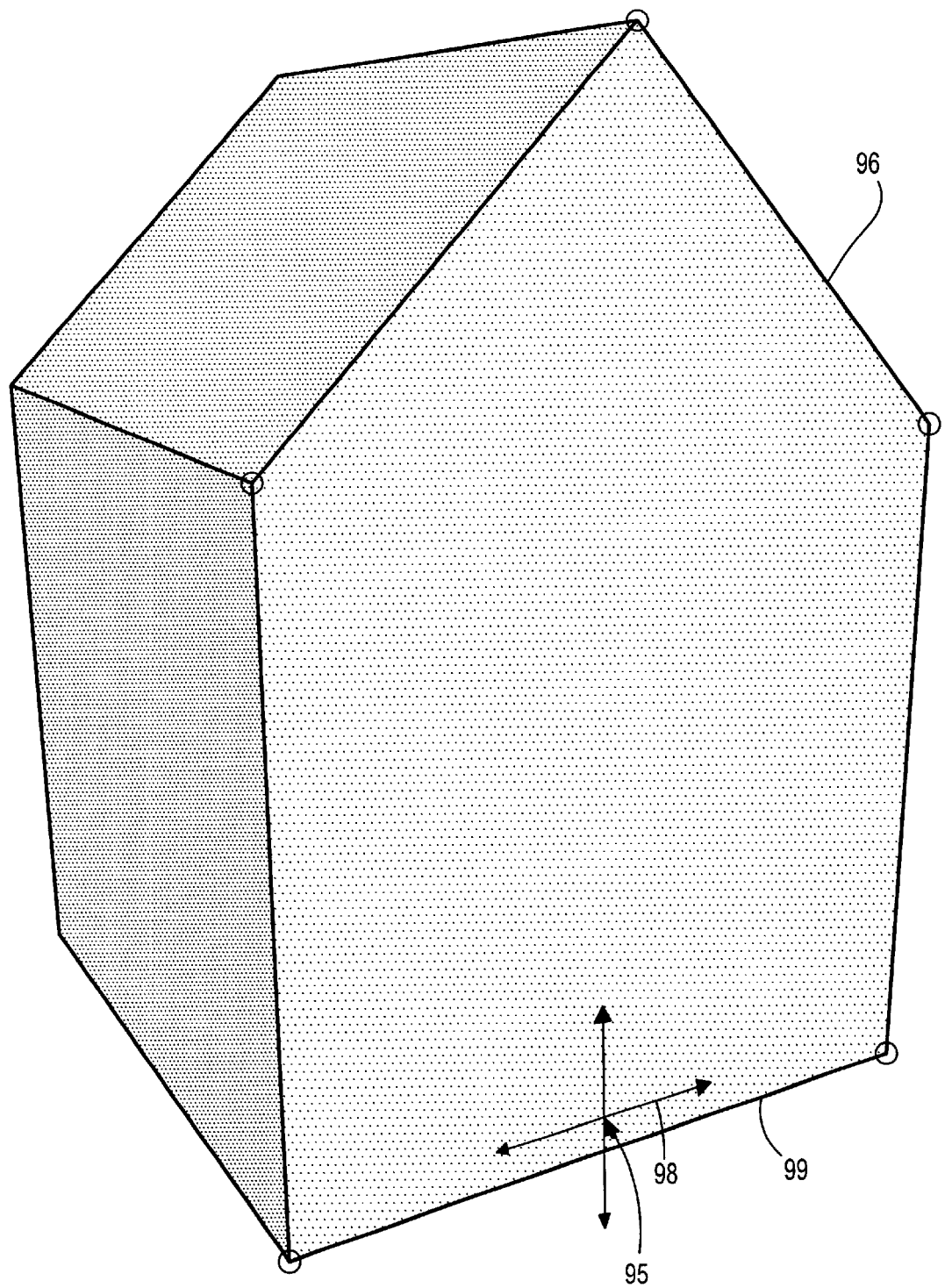
Figure 9C:
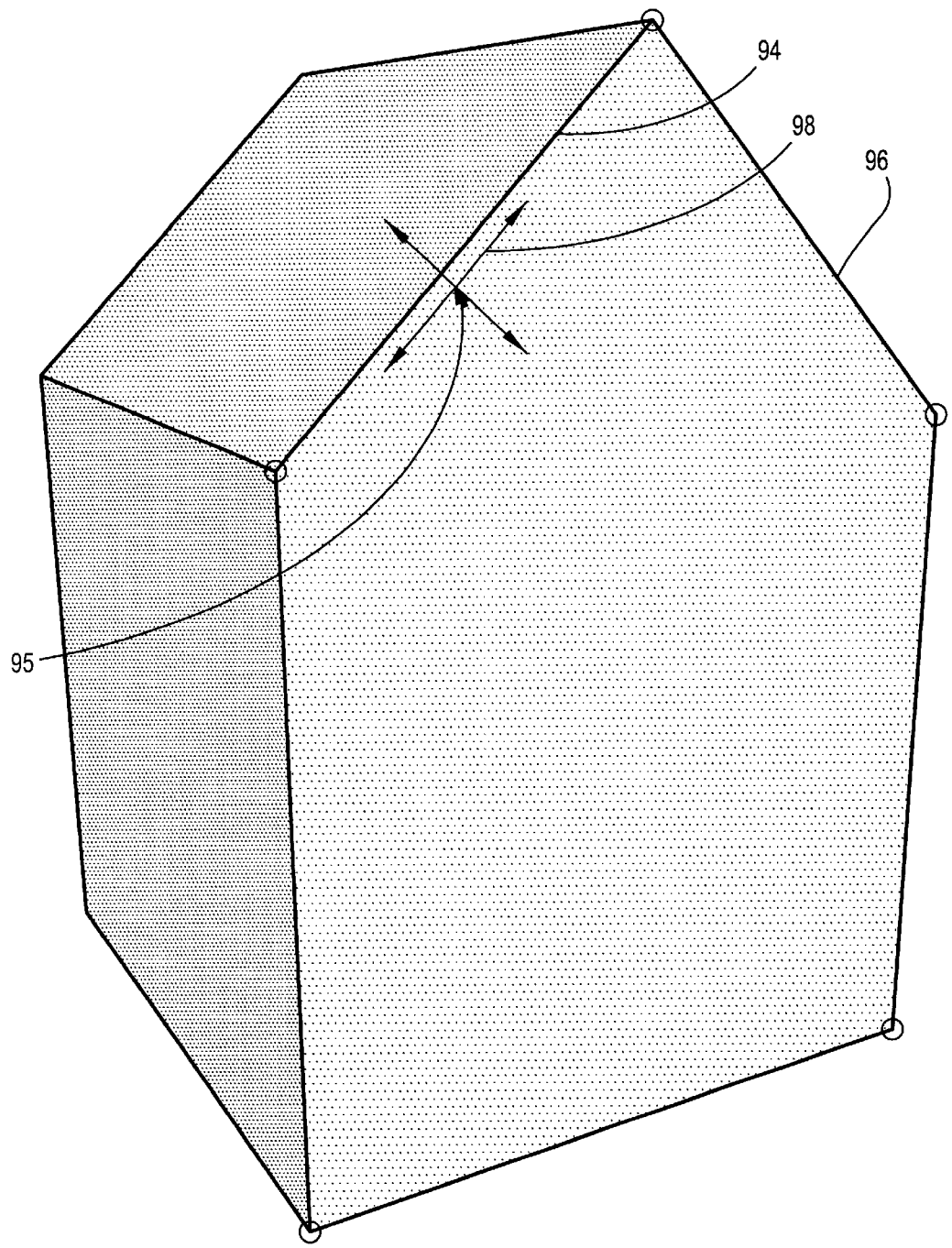

If the reference PEP is a polygon, shift-dragging constrains motion to a direction either parallel to the direction of the polygon edge to which the cursor is closest or perpendicular to the direction of the closest polygon edge, depending on the user's initial hand gesture. As shown in FIG. 9A, for example, assuming polygon 96 has been designated as the reference PEP, when the cursor 95 is placed near a vertical edge 97, the four-headed directional arrow 98 underneath the cursor aligns itself to edge 97 to indicate that motion can be constrained to a direction parallel to edge 97 or perpendicular to it depending on which direction more closely approximates the user's initial hand gesture. Similarly, when the cursor 95 is closer to a horizontal edge 99, the directional arrow 98 aligns itself to edge 99 to indicate that motion is constrained to a direction parallel to edge 99 or perpendicular to it depending on the user's initial hand gesture. Finally, as shown in FIG. 9C, when the cursor is closest to edge 94, the directional arrow aligns itself to edge 94 to indicate that motion is constrained to a direction parallel or perpendicular to that edge depending on the user's gesture.

If the reference PEP is an edge, shift-dragging constrains motion to a direction within the motion plane either parallel to the edge or perpendicular to the edge, depending on which of these two directions more closely approximates the user's initial hand gesture.

If the reference PEP is a point, shift-dragging constrains motion to a direction that depends in part on the direction of an edge-projection nearest the cursor when the user clicked the mouse button down in the vicinity of the reference point. The set of edge-projections is created by determining all edges which touch the reference point, and then projecting these edges onto the motion plane. Once the nearest edge-projection is determined, the constrained direction within the motion plane is either parallel to the nearest edge-projection or perpendicular to the nearest edge-projection, depending on which of these two directions more closely approximates the user's initial hand gesture.

In the example of FIG. 8A, the user intends to constrain the movement of chimney 85 to any direction within the designated plane of motion (i.e., the X-Y plane) and thus does not press the CTRL or SHIFT keys while click-dragging the cursor. A four-headed directional arrow 89 appears accordingly to inform the user that the chimney 85 can be moved freely in any direction parallel to the plane of the roof 81. In this case, since all points in the base of the chimney already lie within the plane of the roof, the base of the chimney will remain in the plane of the roof while the chimney as a whole is subjected to this planar translation.

As shown in FIG. 8B, the user translates the chimney 85 parallel to the plane of the roof 81 to a new position 91 that is slightly more than four grid units in the direction of the positive X-axis and slightly less than one grid unit in the direction of the negative Y-axis from the original position 85. Because the chimney's motion is constrained to be parallel to the motion plane defined by the X and Y-axes, the user is prevented from unintentionally translating the chimney 85 in the direction of the Z-axis appearing in FIGS. 8A and 8B.

It is important to note that the XYZ axes illustrated in FIGS. 8A and 8B are independent of, and unrelated to, any of the predefined coordinate spaces typically associated with a 3D scene (e.g., world space, local space, screen space, parent space). Rather, the axes shown in FIGS. 8A and 8B represent a temporary coordinate system that was generated on-the-fly in response to user input—specifically, the designation of a reference PEP at the moment the click-drag gesture was initiated—and based on the above-described heuristics concerning how motion planes are defined according to the type of reference PEP that was designated by the user. Put another way, Cosmo™ World allows a user to manipulate graphic objects using a dynamic coordinate space that can be defined relative to any feature within the 3D scene. The ability to dynamically define coordinate spaces and use them to manipulate objects in this manner, provides users with a considerable degree of flexibility and a body of rich functionality not previously available in 3D object manipulation tools.

Figure 10A:
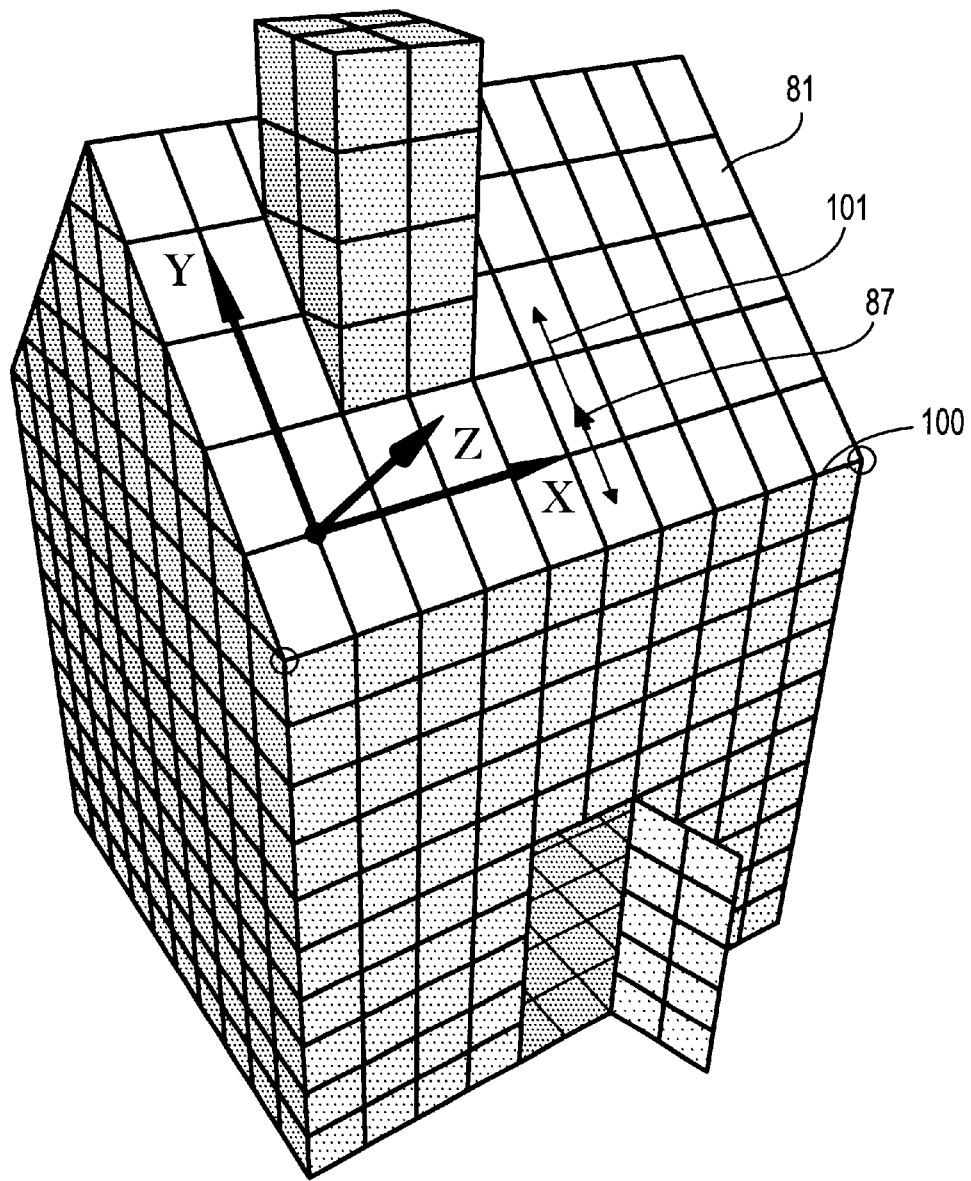
FIGS. 10A–10B show an example of modifying a roof polygon within its own plane.
Figure 10B:
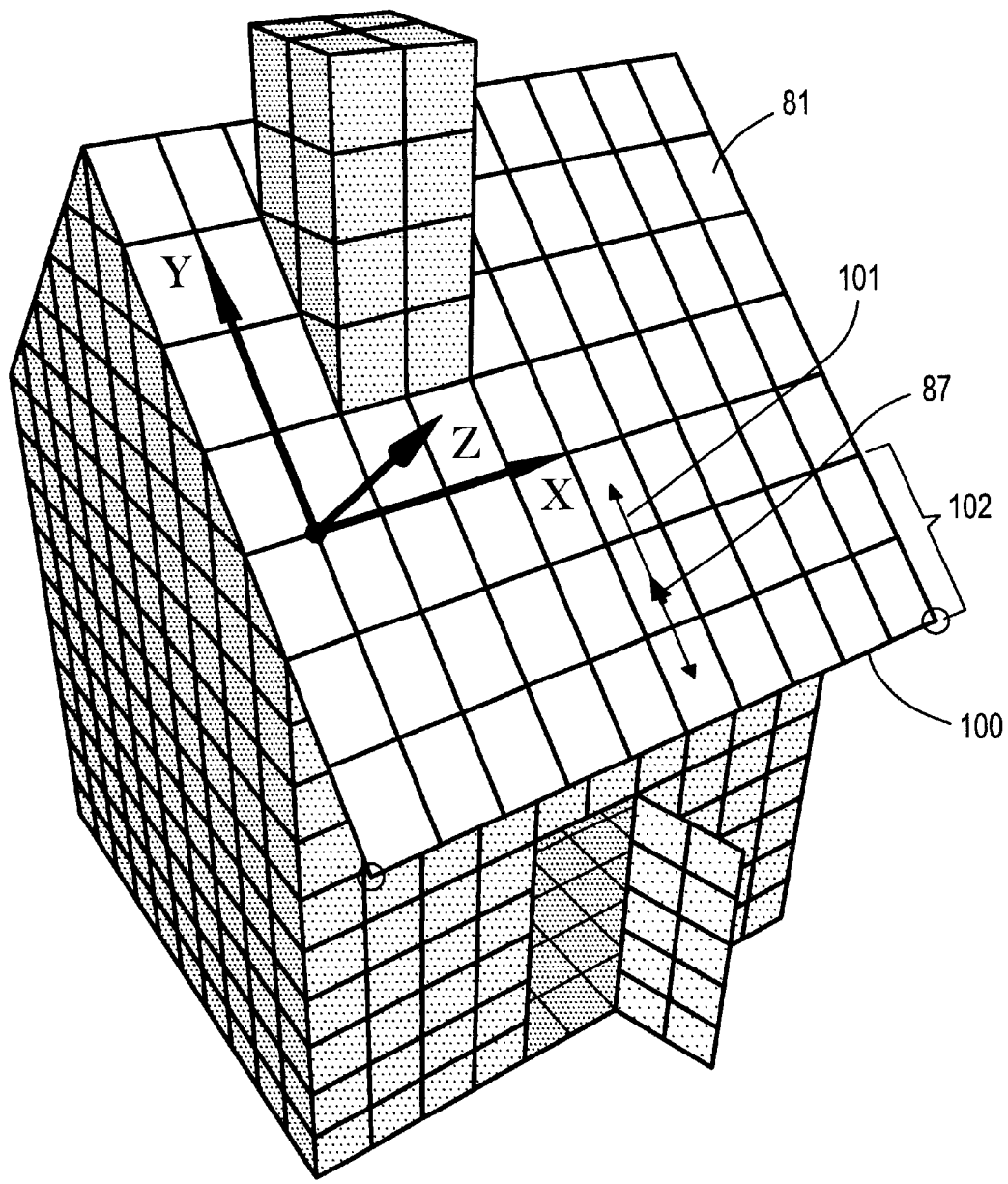

FIGS. 10A and 10B depict before and after views of another example in which a user defines a motion plane based on a feature within the scene and uses that motion plane to manipulate an object. In this case, the PEP that is to be manipulated is an element of the feature that serves as the reference PEP. In FIG. 10A, the user has designated a bottom edge 100 of roof 81 as the PEP selection (i.e., the feature to manipulated). Because the user has positioned cursor 87 over the roof 81 to designate it as the reference PEP, the motion plane accordingly is coincident with the plane of the roof 81 just as in FIGS. 8A and 8B. As before, the XYZ axes depict the temporary coordinate system that was dynamically created when the roof 81 was designated as the reference PEP. In this case, however, the user desires to constrain motion to a single direction within the motion plane and thus has depressed the SHIFT key and gestured in the direction of the Y-axis to cause a bi-directional arrow 101 to appear. The bi-directional arrow 101 confirms to the user that motion is to be constrained to the Y-axis.

As shown in FIG. 10B, the motion plane and the single-direction motion constraint designated by the user allow an overhang 102 to be quickly and easily added to the roof 81. This is accomplished by pulling the edge 100 in the direction of the negative Y-axis to extend the roof 81 by two grid units.

Figure 11A:
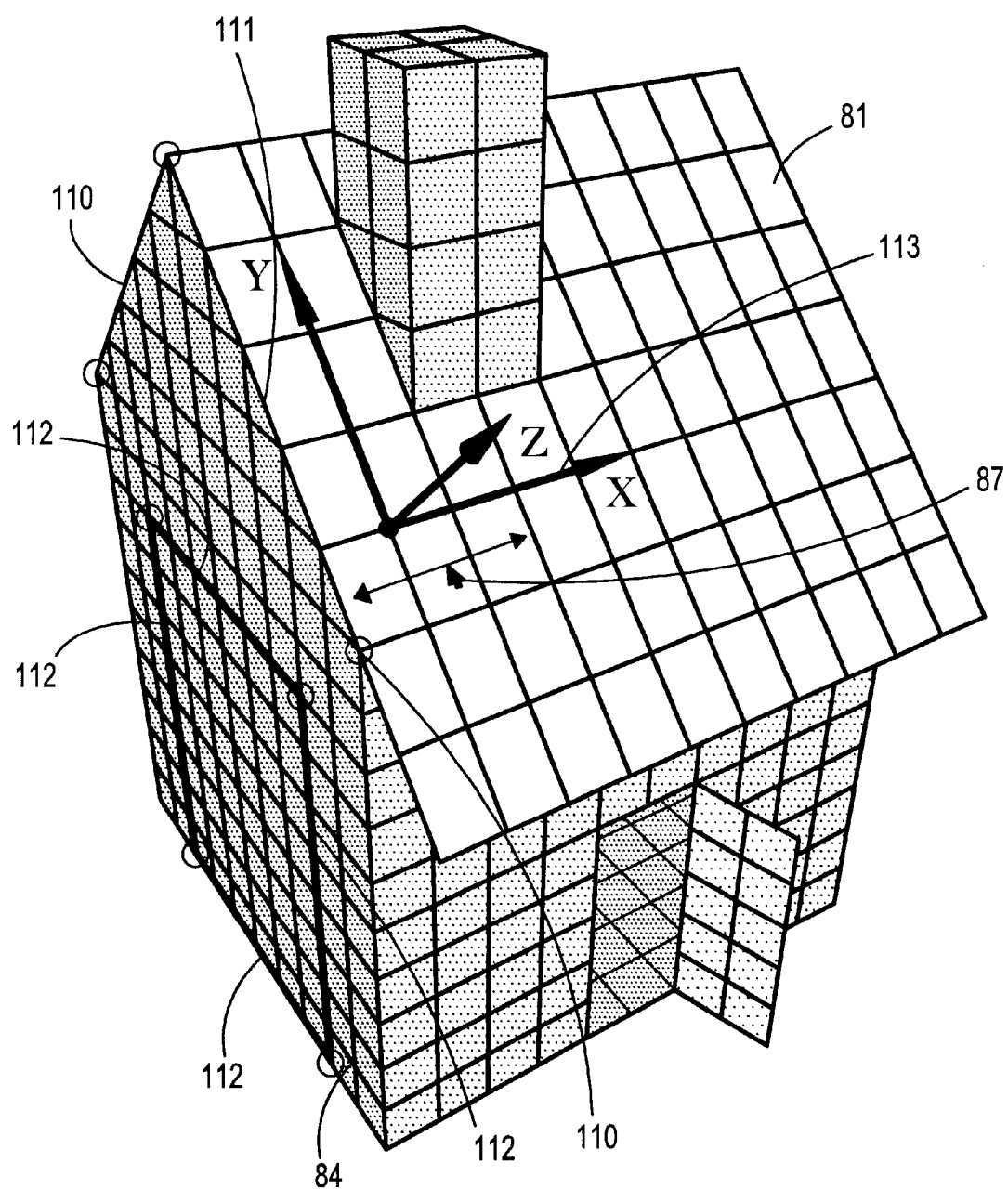
FIGS. 11A–11B show an example of modifying roof polygons and a wall polygon relative to the plane of the roof.
Figure 11B:
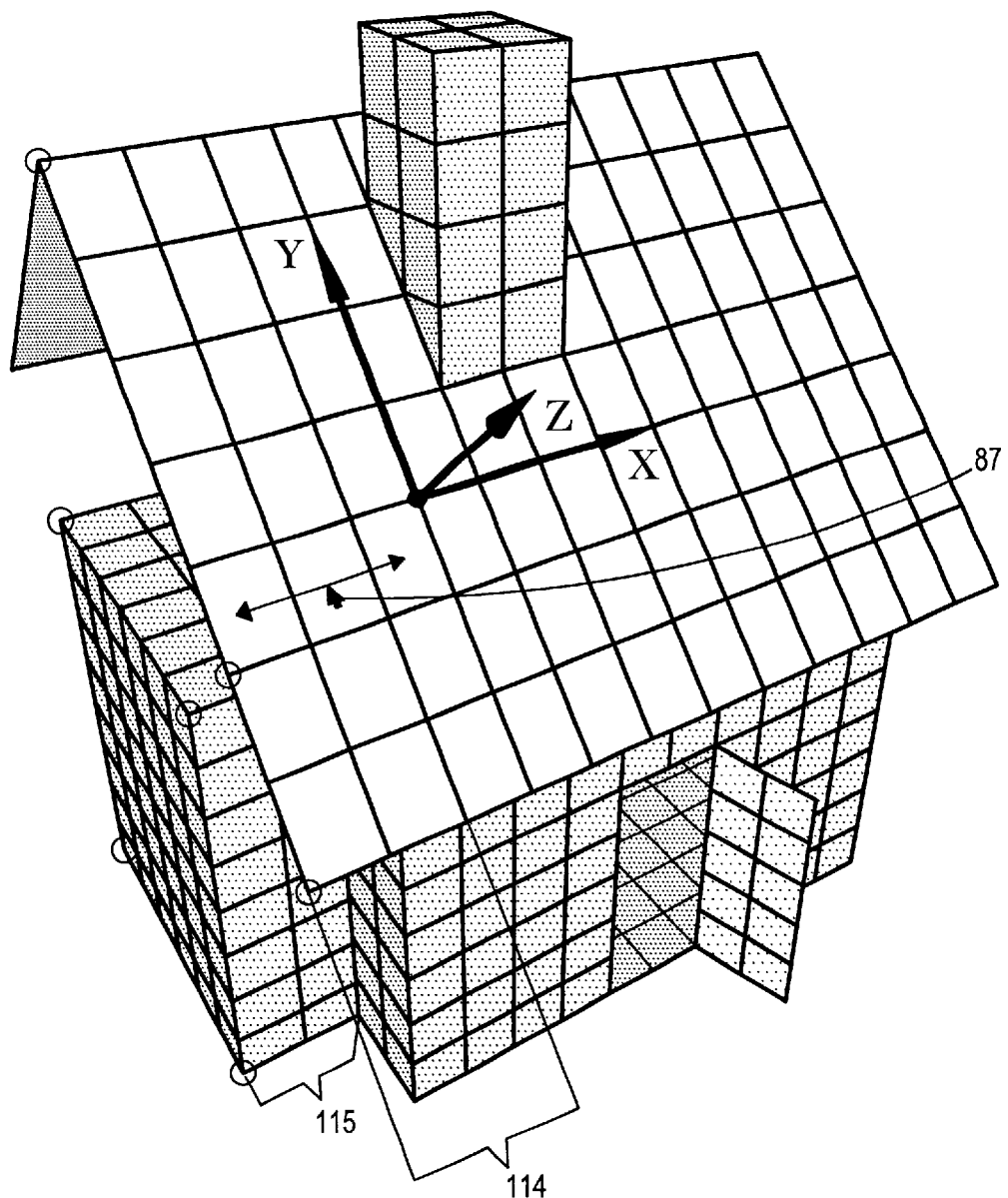

FIGS. 11A and 11B depict before and after views of the house undergoing further modifications using the object manipulation features of Cosmo™ Worlds. Here, the user's PEP selection includes eight points defining six different edges: two edges 110 and 111 along the roof 81, and four edges (or lines) 112 defining a rectangle on the house's left side wall 84. Because the cursor 87 is positioned over the roof 81, the motion plane continues to be parallel to the roof. The user has constrained motion to a single direction (the X-axis direction) within the motion plane as indicated by bi-directional arrow 113.

As shown in FIG. 11B, the user shift-drags the cursor 87 in the direction of the negative X-axis to create another overhang 114 above the house's left side wall 84 and to extrude an addition 115 to the house from that wall.

Figure 12A:
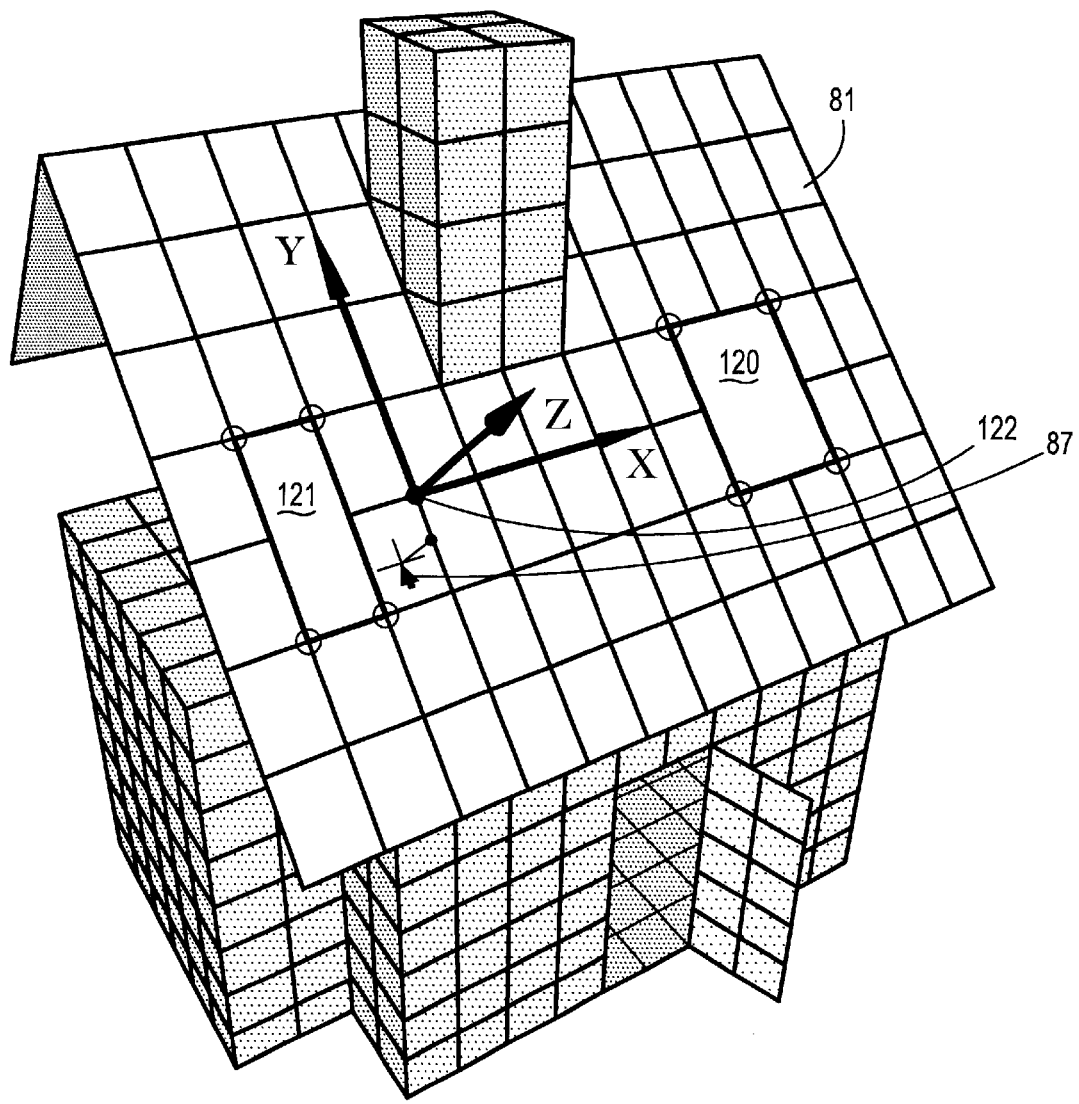
FIGS. 12A–12B show an example of extruding skylights from a roof plane.
Figure 12B:
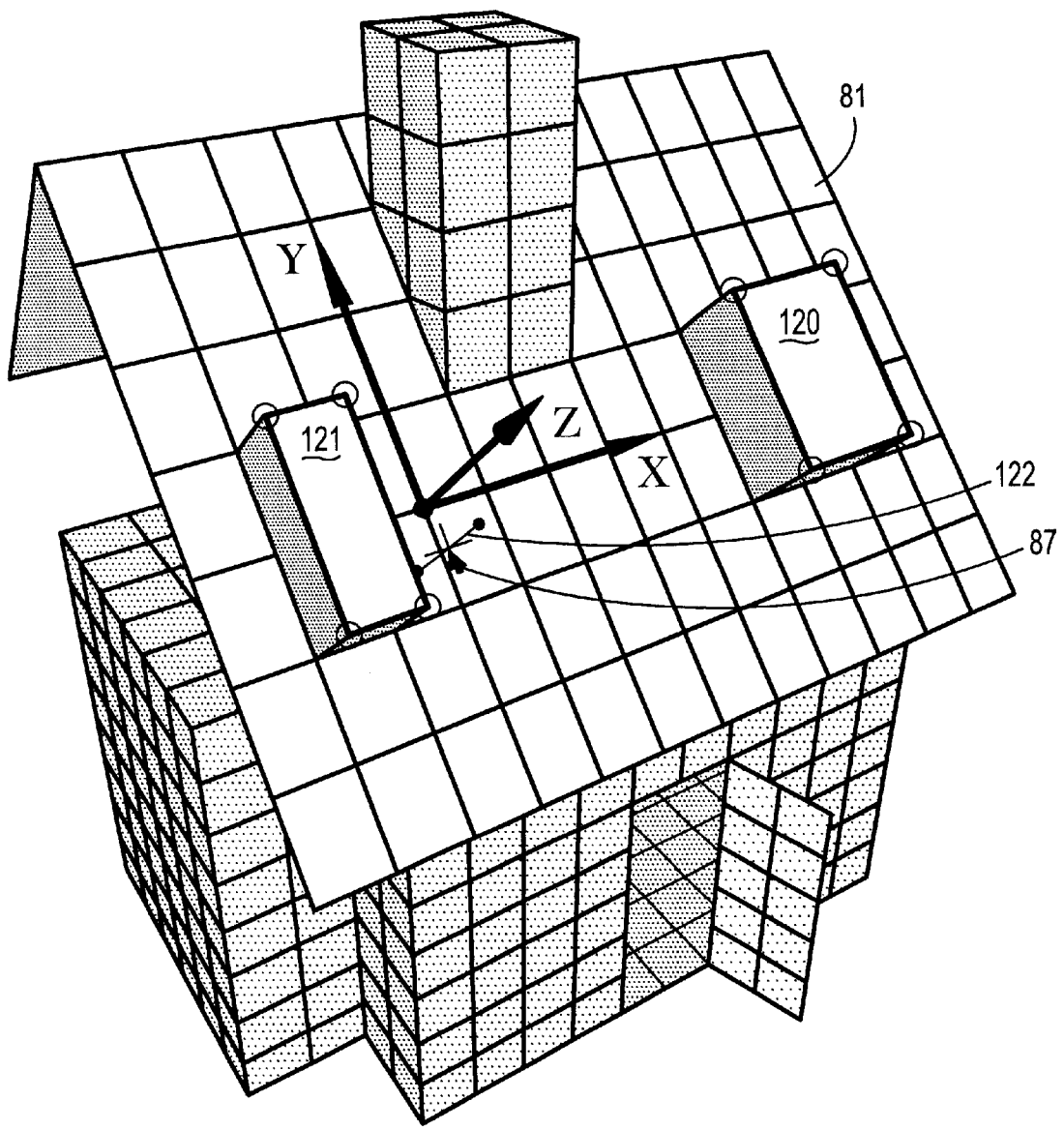

Finally, as shown in the before and after views of FIGS. 12A and 12B, the user completes the house by simultaneously creating two rectangular skylights. To do so, the user designates polygons 120 and 121 as the PEP selection and control-drags the cursor in the direction of the positive Z-axis to extrude the polygons in a direction perpendicular to the plane of the roof 81 (i.e., the motion plane). Because the user has the control key depressed during the dragging operation, a bi-directional arrow 122 is aligned with the Z-axis to indicate that motion is constrained to that single direction.

Edges and points also may be used as reference PEPs in defining motion planes. In the before and after views of FIGS. 13A and 13B, an octagonal stadium 130 is manipulated using an edge 131 between two of the stadium walls 136 and 137 as the reference PEP. The motion plane defined by edge 131 is represented by grid 132 whose normal direction z is the average of the normals to the planes of walls 136 and 137. The corresponding dynamic coordinate space defined by designating the edge 131 as the reference PEP is represented by the set of axes 133, which is oriented such that the Y-axis is parallel to the reference edge's direction, the X-axis is perpendicular to the Y-axis within the motion plane, and the Z-axis is perpendicular to the motion plane. The grid 132 and axes 133 are illustrated for explanatory purposes and would not actually appear to the user in the Cosmo™ Worlds application.

Figure 13A:
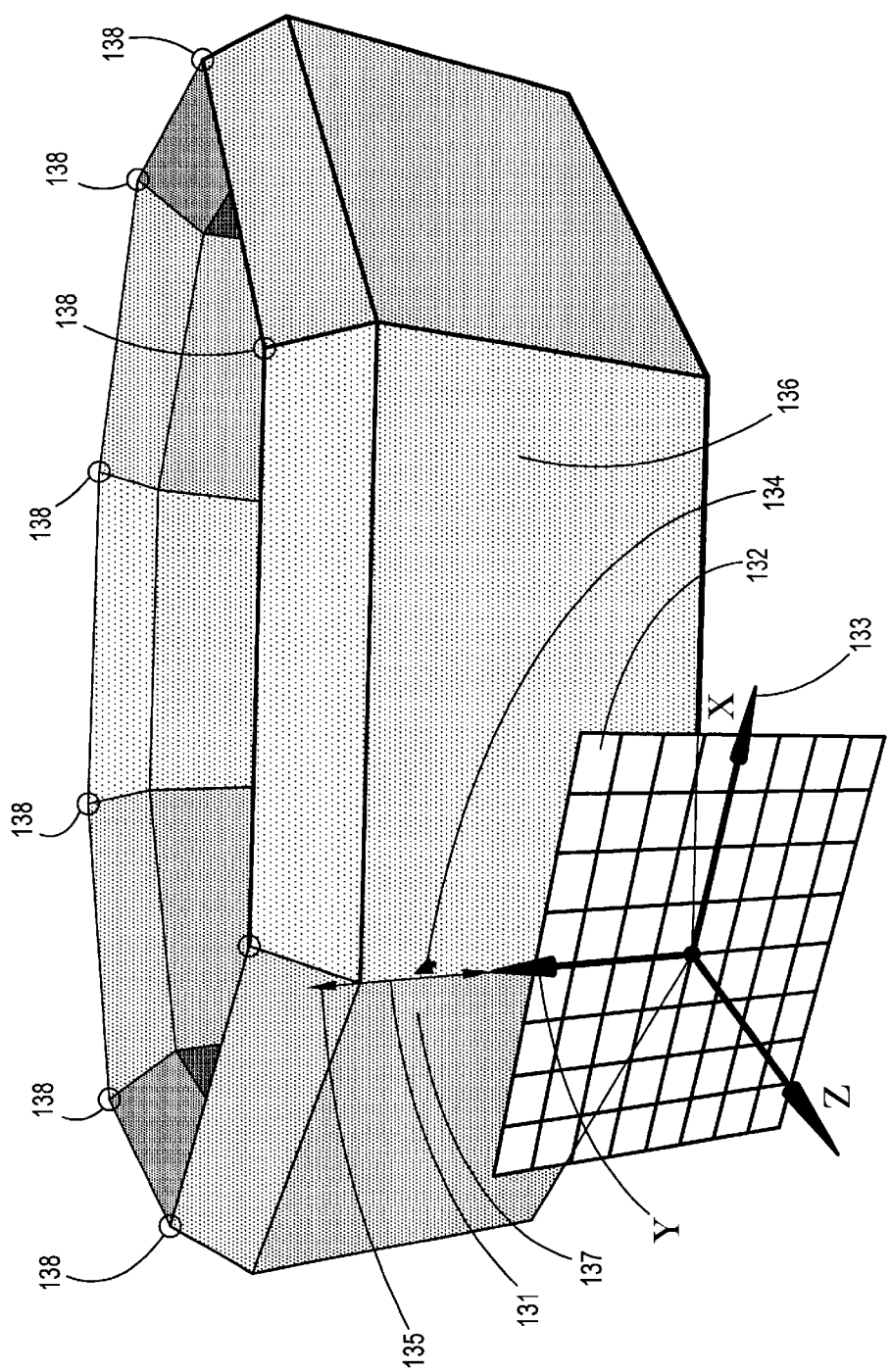
FIGS. 13A–13B and 14A–14B show an example of adding features to a stadium using an edge feature of the stadium as a reference for defining a motion plane.
Figure 13B:
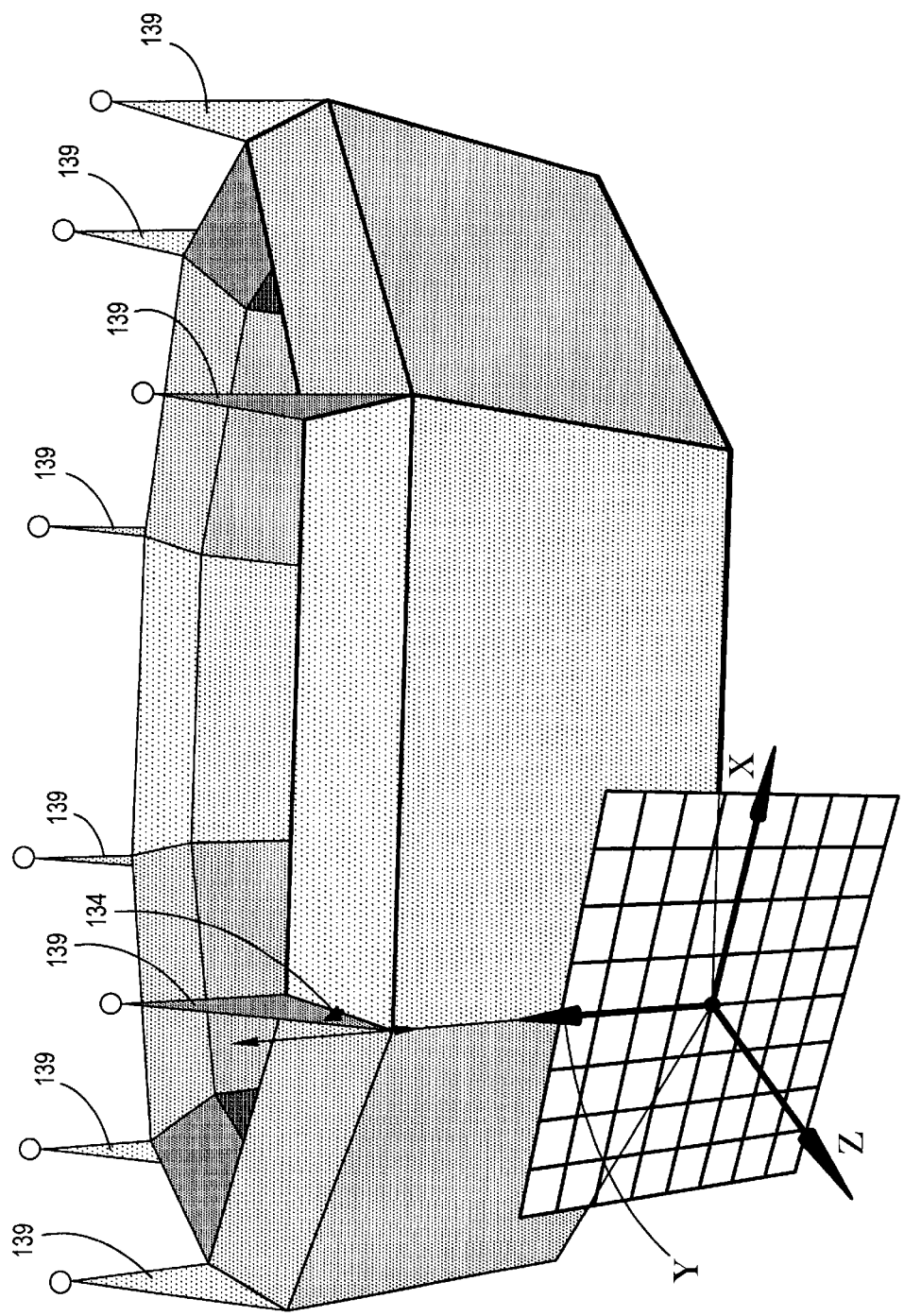

As indicated by the yellow and red selection circles 138, the user has defined the eight roof points as the PEP selection. The user has constrained the motion to the direction parallel to the edge 131, as indicated by arrow 135, by depressing the SHIFT key and gesturing generally in the direction of the Y-axis. As shown in FIG. 13B, eight crennelations 139, one at each roof point, are created by shift-dragging the cursor 134 in the direction of the positive Y-axis to pull the roof points in that same direction. The user similarly could have constrained motion to the single direction along the X-axis by depressing the SHIFT key and making an initial cursor gesture generally in the direction of the X-axis.

Figure 14A:
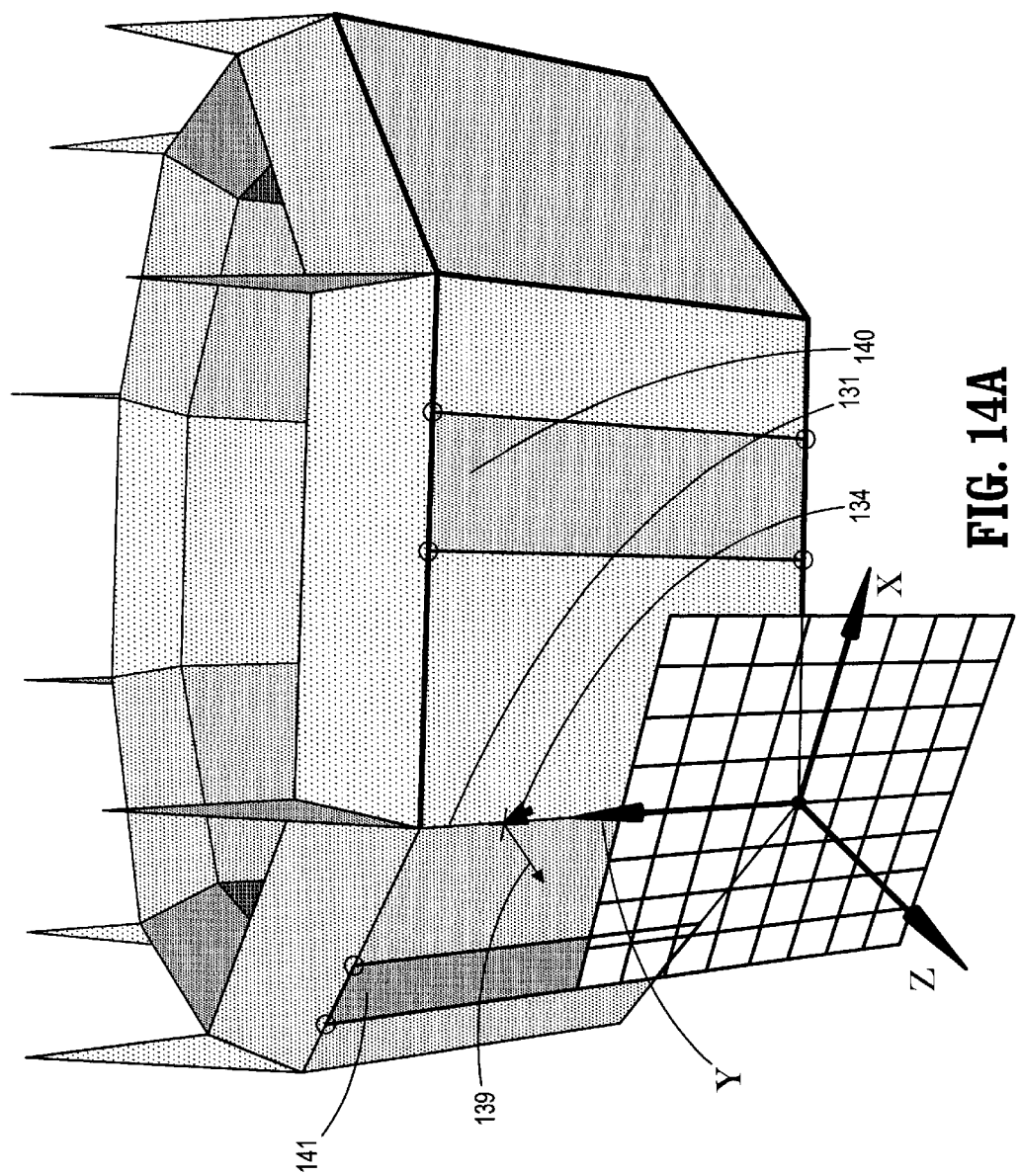
Figure 14B:
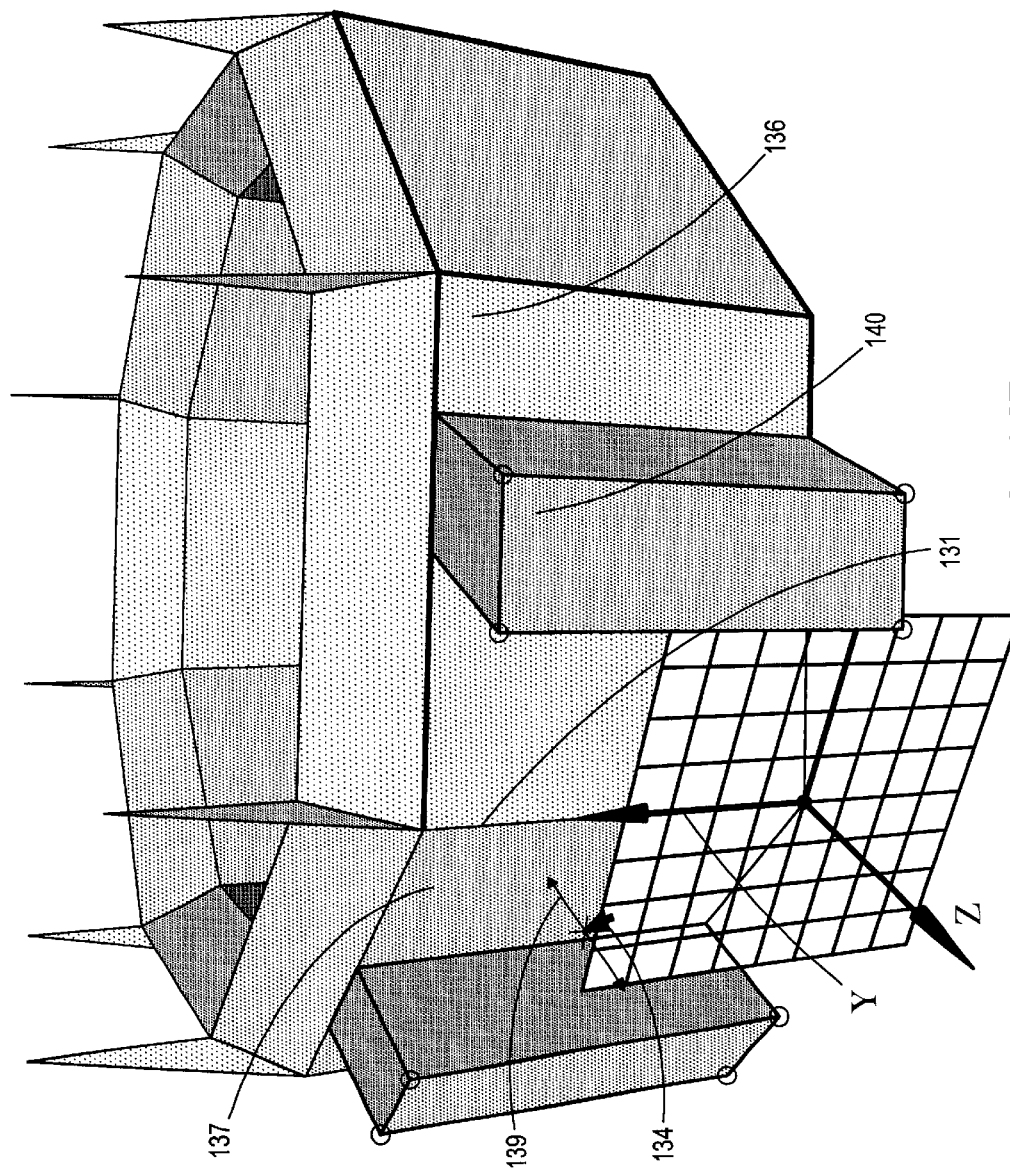
Figure 15B:
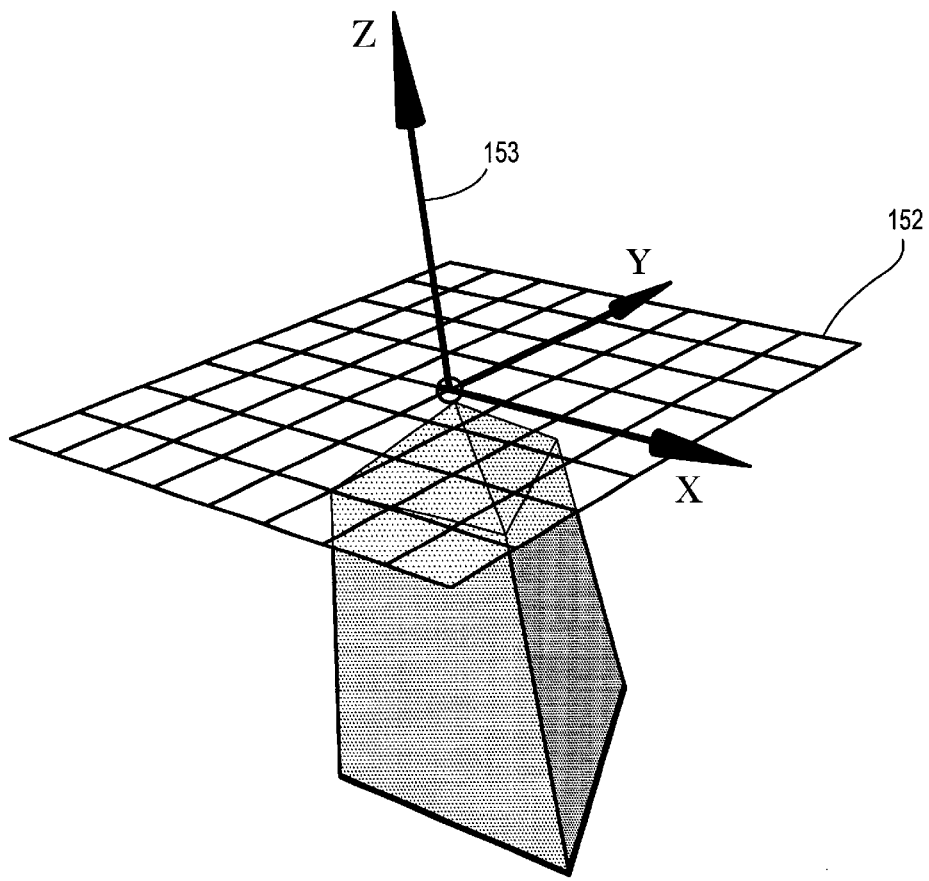
FIGS. 15A–15C and 16A–16B show an example of manipulating features of a tent using a feature of the tent as a reference for defining a motion plane.
Figure 15A:
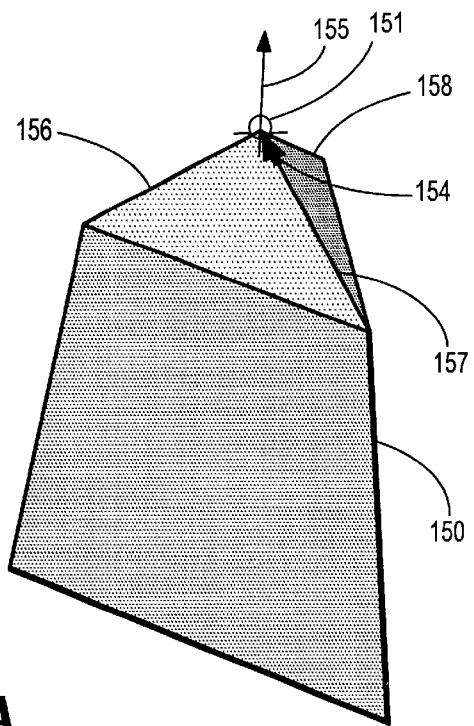
Figure 15C:
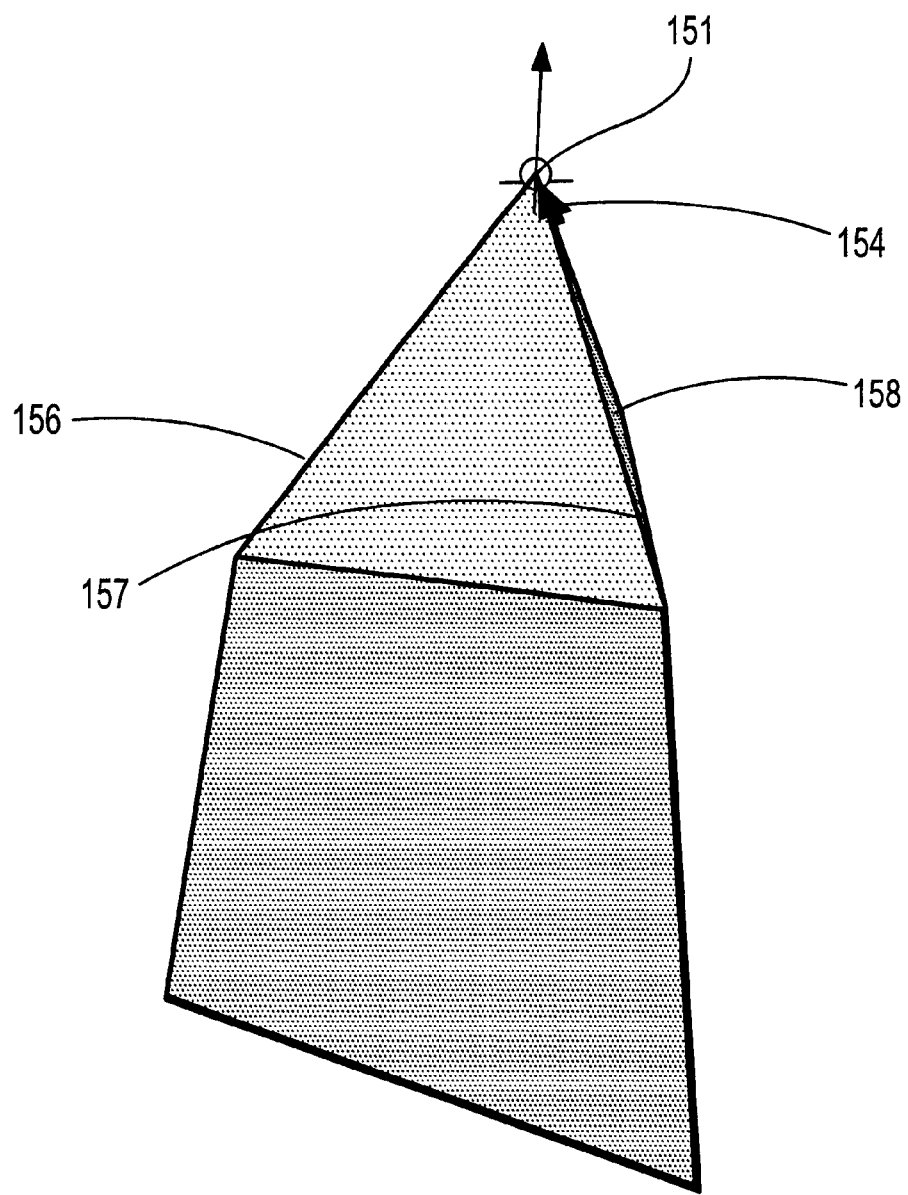

Next, the user relies on the same reference PEP, edge 131, and thus the same motion plane, in extruding two piers from the stadium walls 136 and 137 to flank the edge 131 as shown in FIGS. 14A and 14B. To do so, the user first designates rectangles 140 and 141 as the PEP selection, and then control-drags the cursor in the direction of the positive Z-axis of the coordinate space defined by edge 131.

The bi-directional arrow 139 indicates the single direction (along the Z-axis) to which motion is constrained in FIGS. 14A and 14B. This direction notably is not perpendicular to the stadium walls 136 and 137, but rather is a direction that is uniquely defined as a result of designating edge 131 as the reference PEP. Because each PEP within a scene has an associated motion plane and coordinate system that is based on the PEP's type (e.g., polygon, edge or point) and its orientation within a scene, users potentially have available an immense number of different yet meaningful coordinate systems relative to which objects can be manipulated.

FIGS. 15A through 16B depict two examples in which points are used to dynamically define a coordinate space with reference to which objects can be manipulated. As shown in the "before" state of FIG. 15A, the user has designated the top point 151 of a three-sided tent 150 both as the PEP selection (the feature to be manipulated) and as the reference PEP (the feature that defines the motion plane). The corresponding motion plane is represented by grid 152, which as shown in FIG. 15B is aligned such that it is perpendicular to the average of the normals of the Z-directions for the three top edges 156, 157 and 158 of the tent 150, whereby the Z-direction for each edge is calculated as described in the examples of FIGS. 13A–14B. The corresponding coordinate space, as represented by axes 153, is oriented such that the Z-axis is perpendicular to the motion plane, the Y-axis lies in the motion plane and is aligned with the projection of edge 158 onto the motion plane, and the X-axis lies within the motion plane and is perpendicular to the Y-axis. The Y-axis was aligned with the projection of edge 158, rather than the projection of edge 156 or edge 157, because the cursor 154 was closest to the projection of edge 158 when the user clicked the mouse button to designate point 151 as the reference PEP.

The user has constrained motion in this example to the Z-axis by control-dragging the cursor 154 generally in the direction specified by the directional arrow 155. As a result, point 151 is pulled in the positive Z-axis direction thereby elongating edges 156, 157 and 158 proportionately, as shown in the "after" state of FIG. 15C.

Figure 16A:
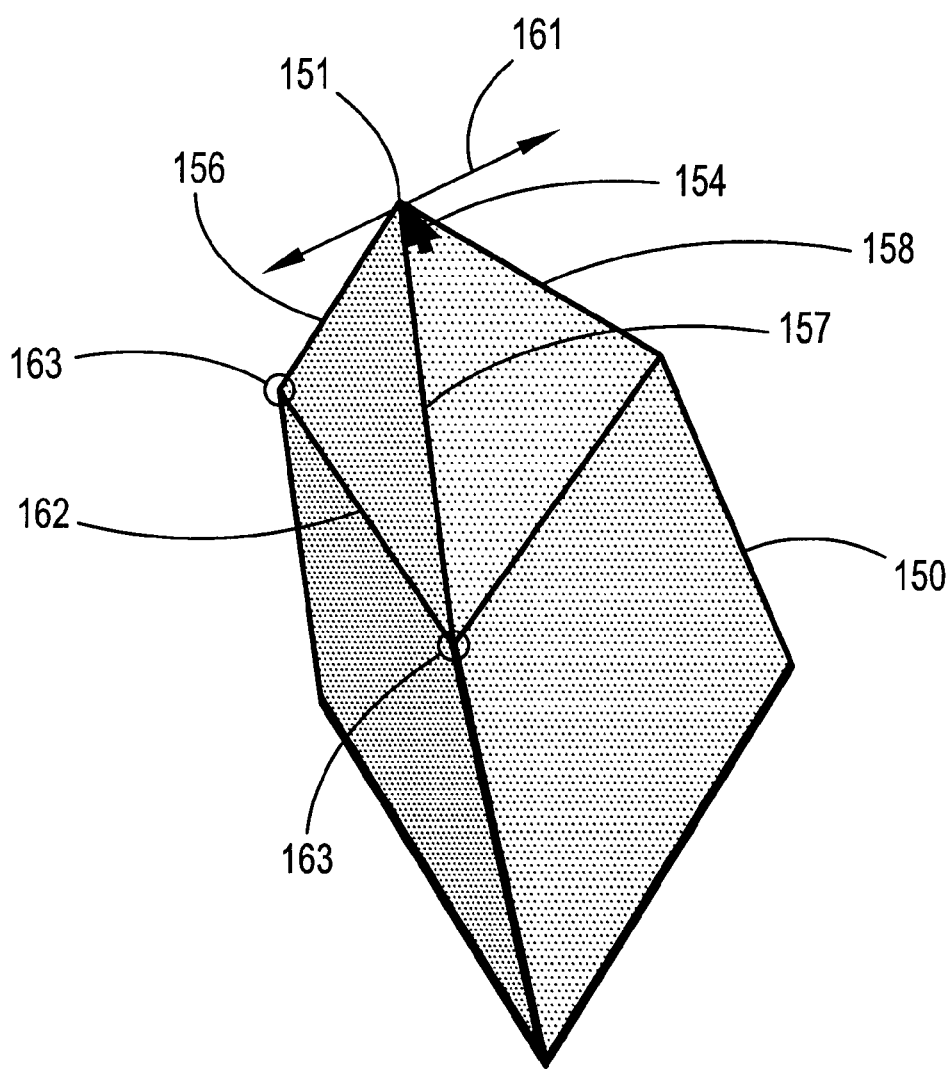
Figure 16B:
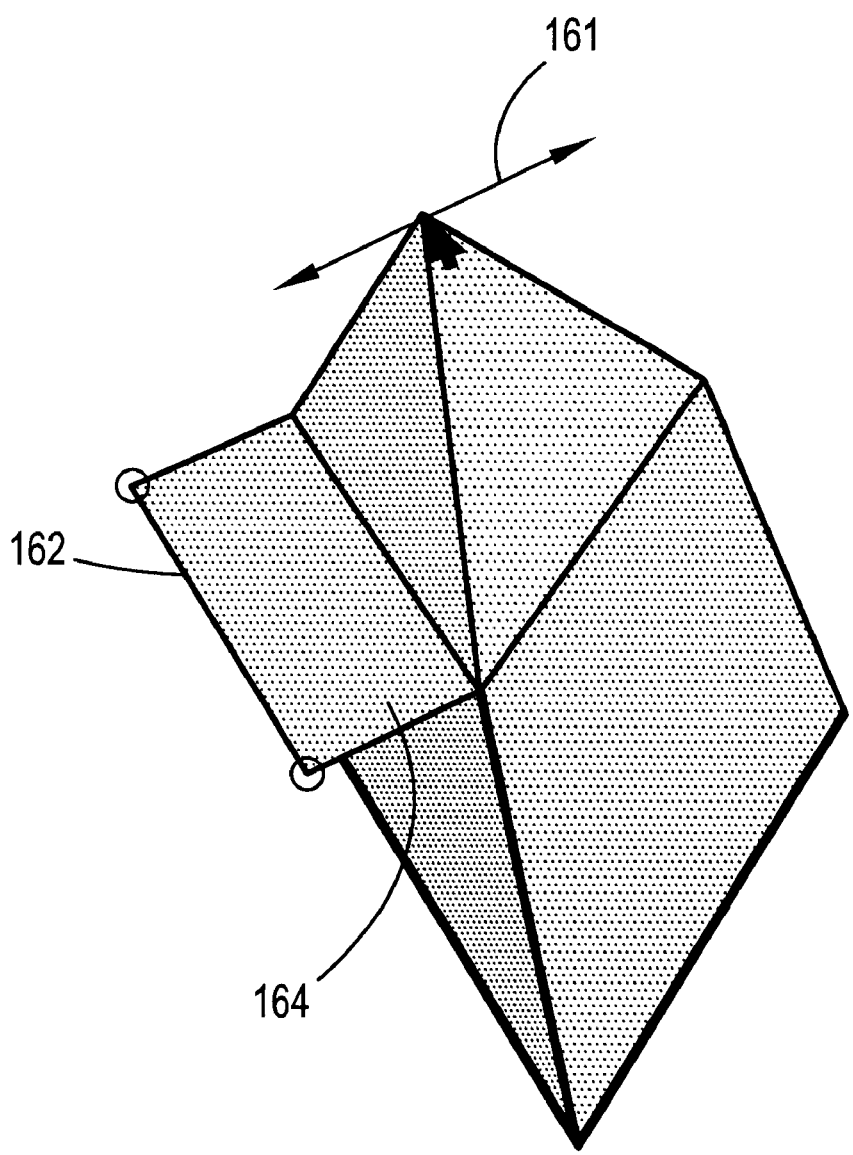

FIGS. 16A and 16B depict a before and after sequence in which motion is constrained to a single direction within the motion plane. Because the same reference PEP is used, point 151, the motion plane remains the same in FIGS. 15A–15C and in FIGS. 16A–16B. A different PEP selection is used in this example, however, specifically, edge 162, as indicated by the yellow and red selection circles 163. Here, the user constrains motion to the Y-axis by shift-dragging the cursor 154 with an initial hand gesture generally in the direction 161. If, on the other hand, the user's initial hand gesture more closely approximated the direction of the X-axis, the motion would have been constrained to the X-axis.

FIG. 16B shows the result of the object manipulation sequence. The user's shift-dragging movement of the cursor in the Y-axis direction has created a tent flap 164 extending in a plane parallel to the motion plane.

Object Manipulation Tool

Cosmo™ Worlds also provides users with a visual object manipulation tool known as the "PEP jack" which allows users to scale and rotate any feature or set of features (e.g., one or more PEPs) relative to dynamically created coordinate systems. Just as with the translation operations described above, the particular orientation of a dynamically created coordinate system depends on the type of feature (e.g., polygon, edge or point) on which the PEP jack is placed and the orientation of that feature within the scene. As a result, the PEP jack provides users with a powerful and flexible manipulation tool for rotating and scaling objects relative to an arbitrarily defined coordinate space. Although in Cosmo™ Worlds the PEP jack operates exclusively on PEPs, it could find equal utility in other contexts, for example, in manipulating entire graphical entities.

Figure 17:
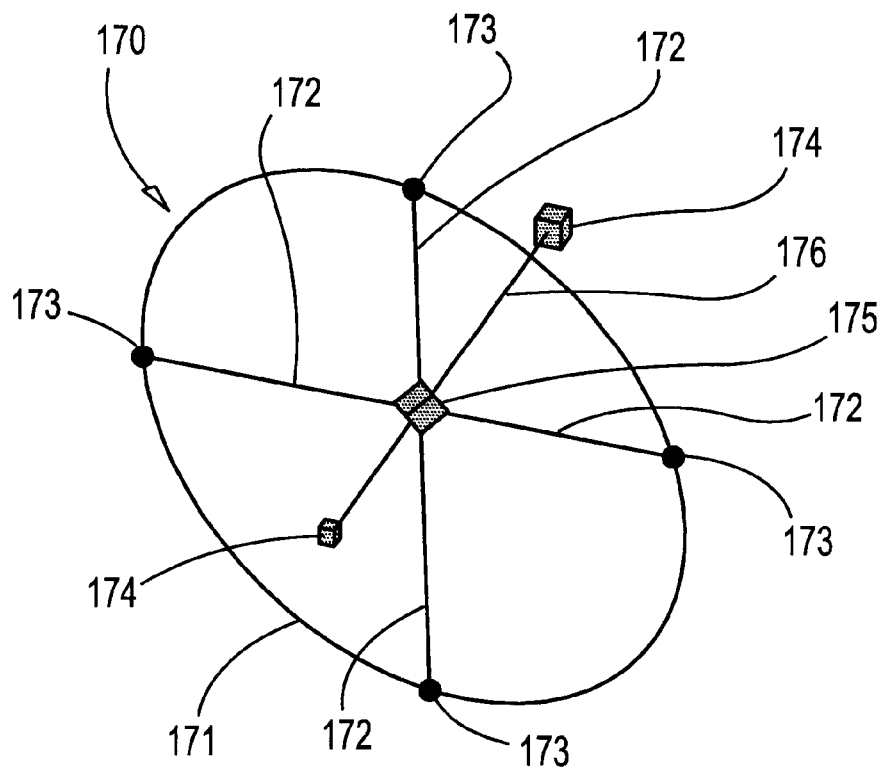
FIG. 17 shows the PEP jack object manipulation tool.

As shown in FIG. 17, the PEP jack 170 is formed of a two-dimensional circle (or wheel) 171 having four coplanar spokes 172 connected to an axle 176 at the wheel's center. A handle 175 for moving the PEP jack 170 within a 3D scene is positioned in the wheel's center at the intersection of the four spokes 172 and the axle 176. Four spherical rotation knobs 173 are evenly distributed around the wheel's circumference, one rotation knob 173 at each of the intersections of the wheel 171 and the spokes 172. A resizing cube 174 is positioned at each end of the axle 176.

Many other geometric variations of the PEP jack are possible, for example, the wheel could be a 2D or 3D solid disk, or a ring of discontinuous points. The wheel need not have spokes and need not necessarily be circular. The axle could be a one-dimensional line, a set of discontinuous points, or a 2D or 3D entity of varying shapes and sizes. The knobs could have other shapes and sizes and could be positioned at other places on the PEP jack. The knobs could perform other functions, either instead of or in addition to, the functions presently supported by the PEP jack.

The PEP jack has two basic object manipulation functions: rotating PEPs and scaling PEPs. The first step in performing either of these functions is to position the PEP jack in the scene and hence define a coordinate space for subsequent scaling and rotating operations. The PEP jack has three basic modes in which it can be positioned. The default mode of positioning occurs when the user simply clicks on the handle 175 and drags the PEP jack 170 to the desired location in the scene. As the PEP jack is being dragged in the default mode, it automatically and immediately reorients itself whenever it passes over a PEP. The manner in which the PEP jack orients itself relative to a PEP depends on the type of PEP (e.g., polygon, edge or point) the PEP jack is placed upon.

Figure 18:
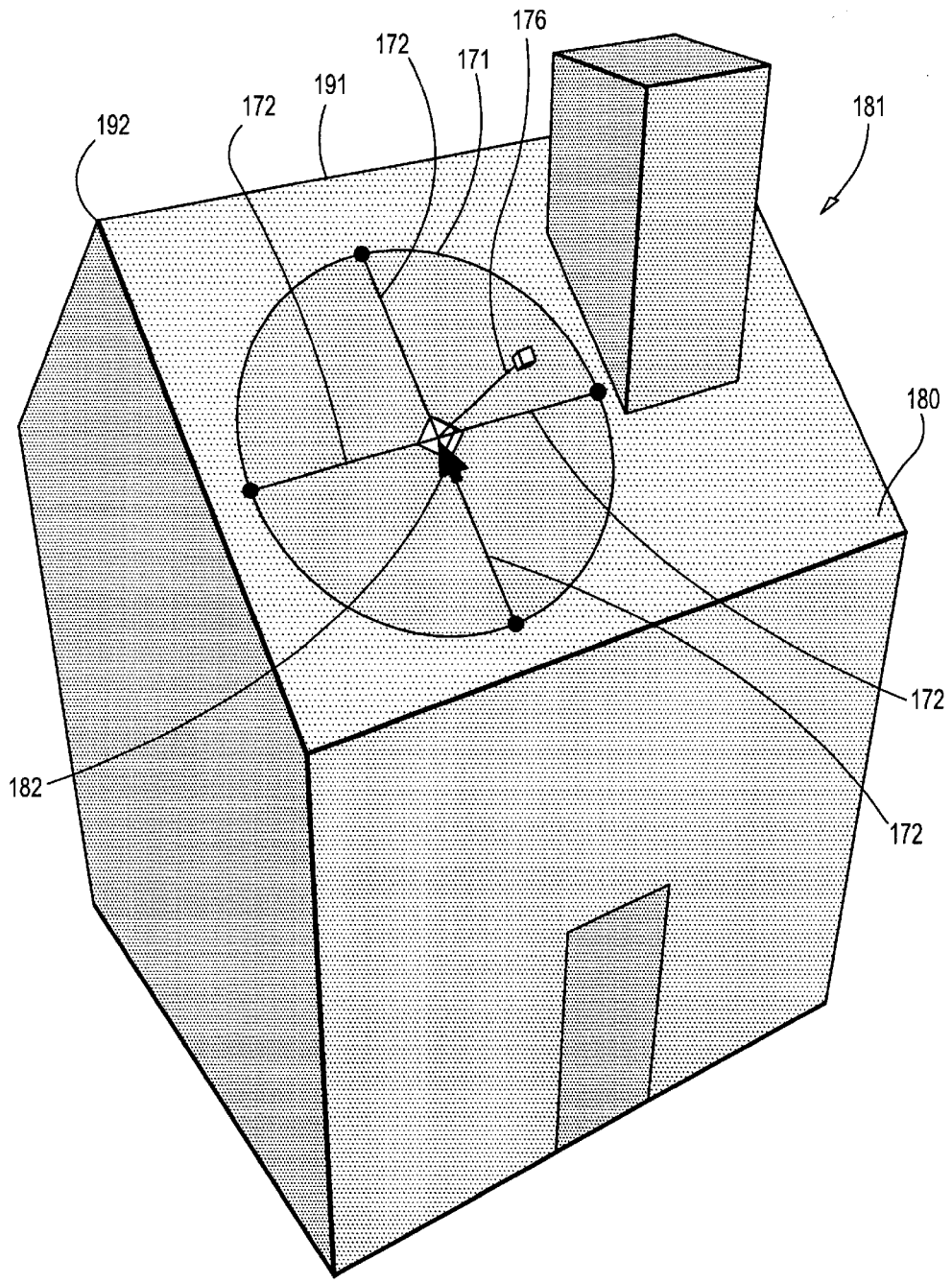
FIGS. 18–22 show the PEP jack oriented relative to different features of a house.

As shown in FIG. 18, if the translation handle 175 is click-dragged in default mode over a polygon such as a roof polygon 180, the PEP jack orients itself so that the wheel 171 is coplanar with the polygon 180, with the axle 176 extending perpendicularly out from the plane of the roof 180 and wheel 171.

Figure 19:
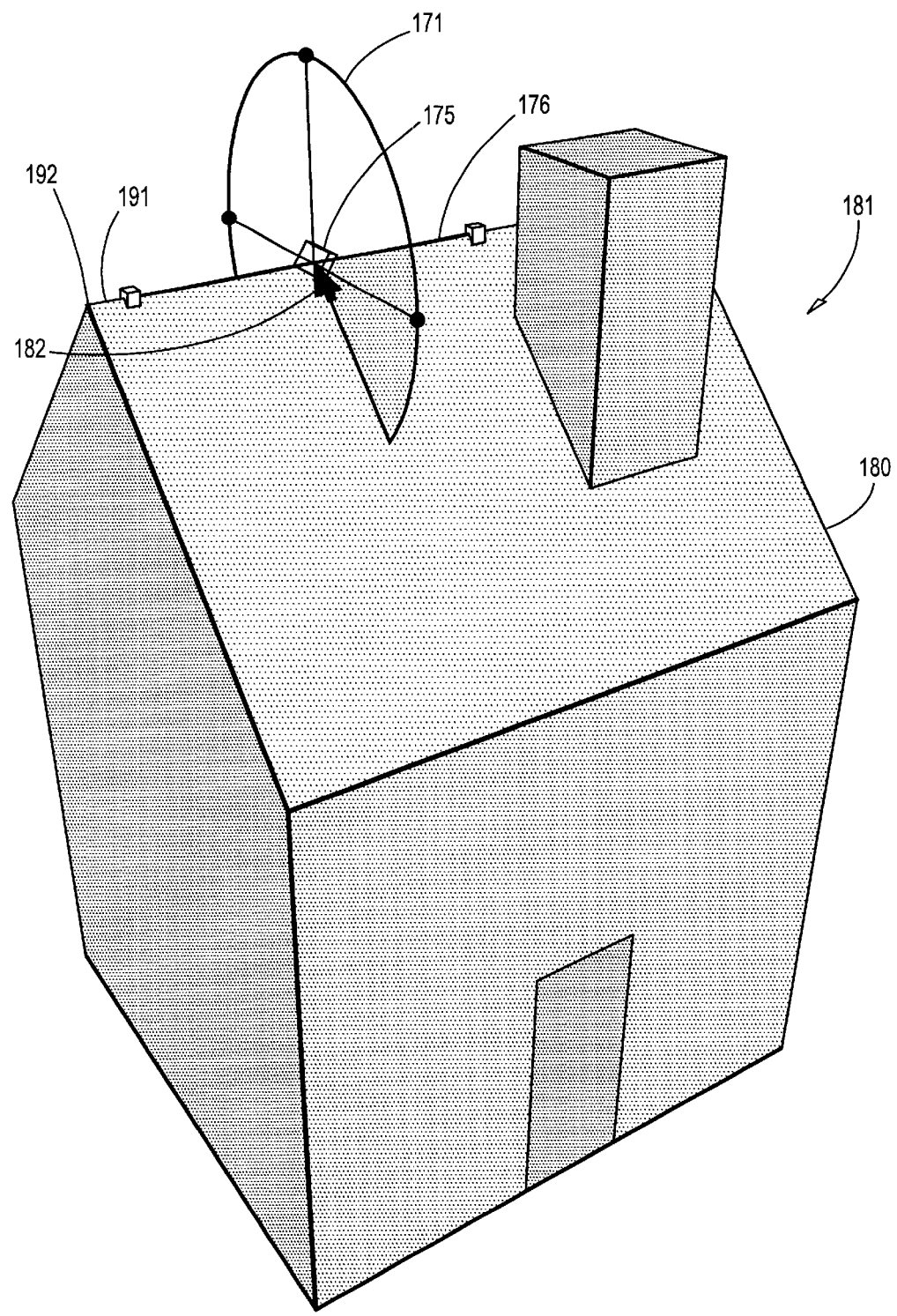

If the PEP jack's translation handle 175 is then click-dragged to an edge such as the rooftop edge 191, the PEP jack automatically reorients itself as shown in FIG. 19 to make axle 176 colinear with the edge 191, with the wheel 171 positioned in a plane perpendicular to that of the axle 176.

Figure 20:
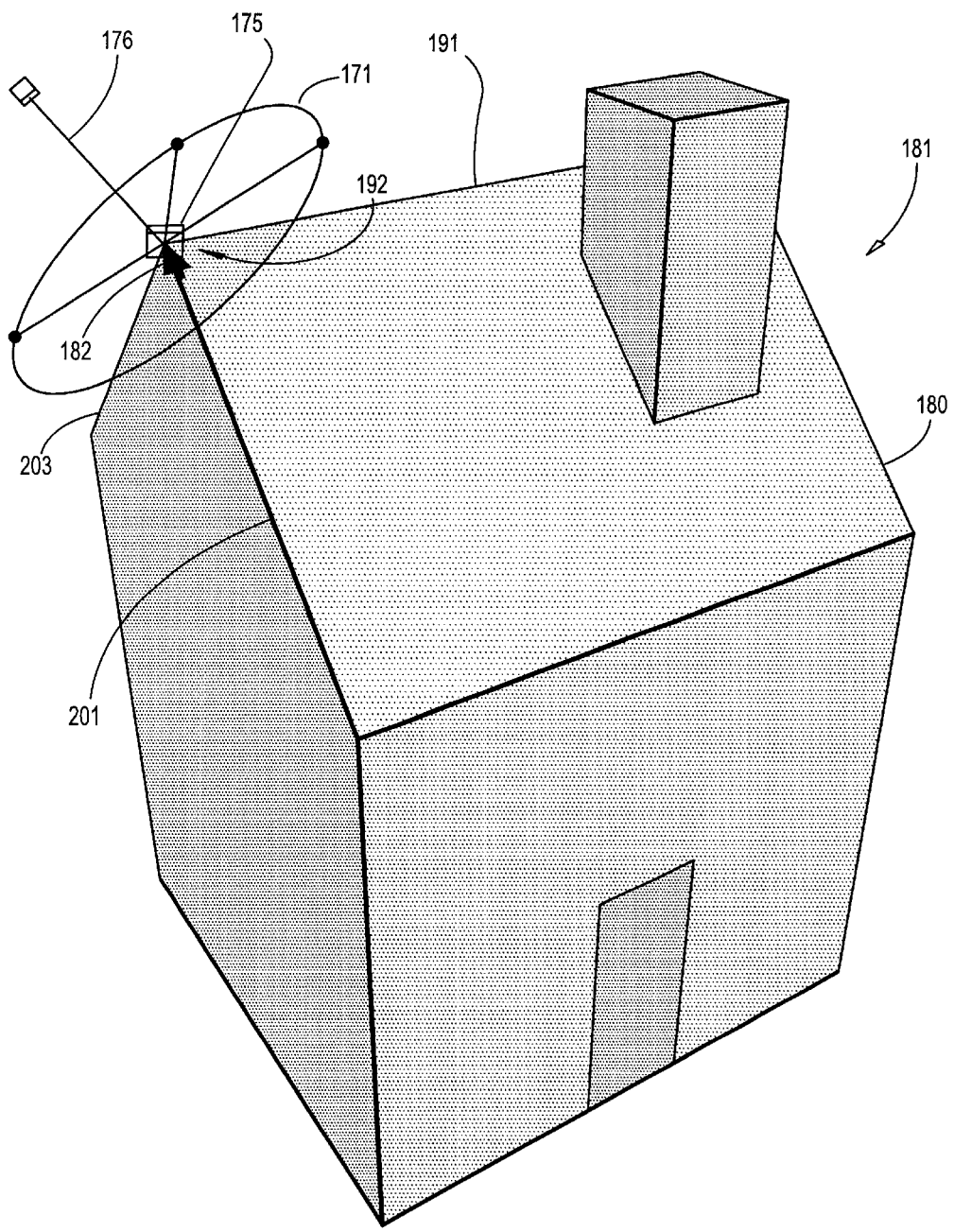

If the PEP jack's translation handle 175 is then click-dragged to a point such as the rooftop point 192, the PEP jack automatically reorients itself as shown in FIG. 20 to make axle 176 parallel to the average of all edges 191, 201 and 203 connected to that point 192, with the wheel 171 positioned in a plane normal to the direction of the wheel.

Figure 21:
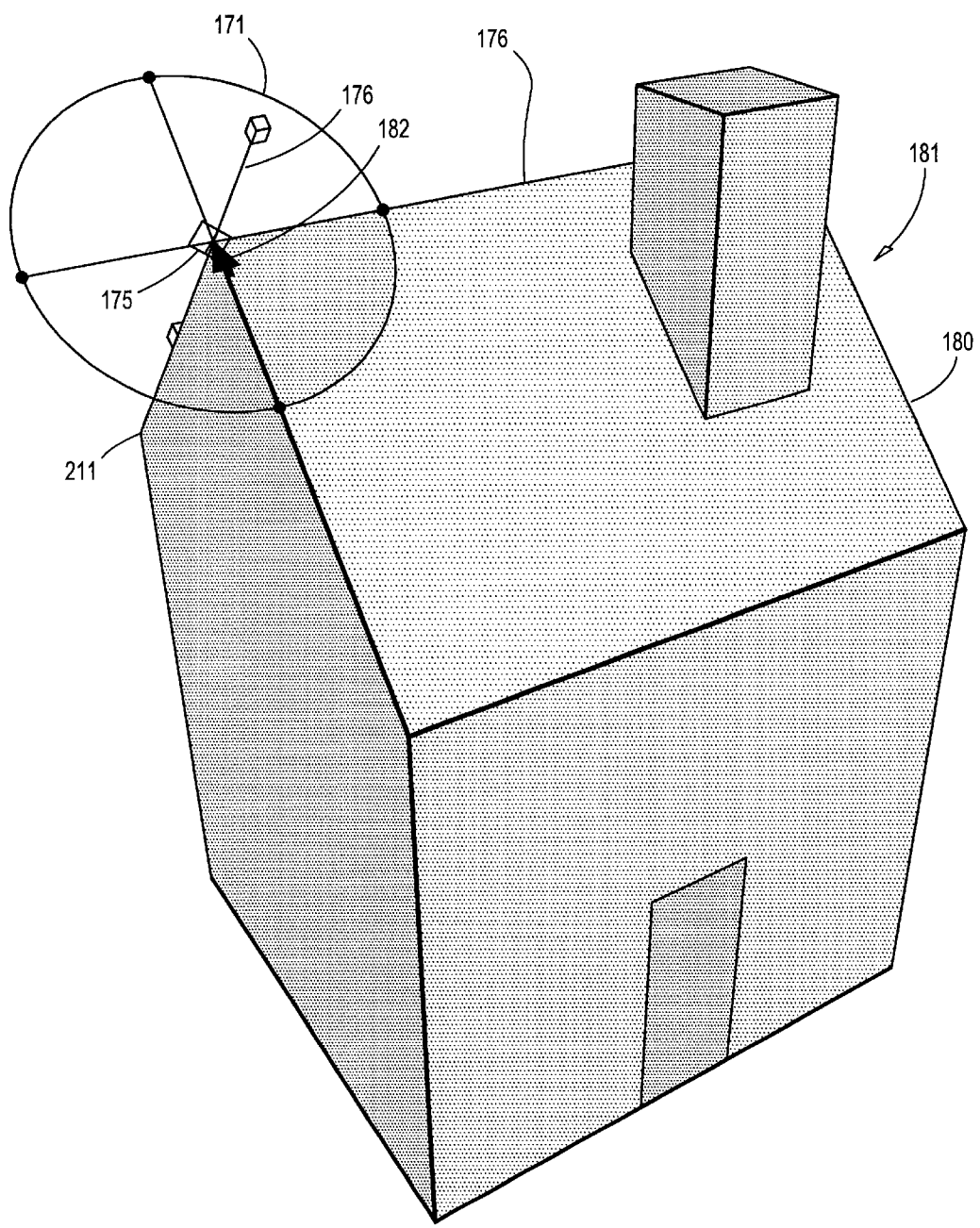

Another mode of PEP jack positioning is movement within the plane of the PEP jack's wheel 171. FIGS. 18 and 21 depict before and after views of an example of this PEP jack positioning mode. When the PEP jack is positioned as shown in FIG. 18 with its wheel 171 coplanar with roof polygon 180, the user can reposition the PEP jack 170 without realigning its axis. To do so, the user clicks the cursor 182 on the PEP jack's handle 175 and then shift-drags the PEP jack to the desired location. As shown in FIG. 21, the user in this example has shift-dragged the PEP jack so that its center is at rooftop point 192, but instead of reorienting itself to the position shown in FIG. 20, the PEP jack retains the same orientation as it had in FIG. 18, namely with its wheel 171 coplanar with roof polygon 180.

Figure 22:
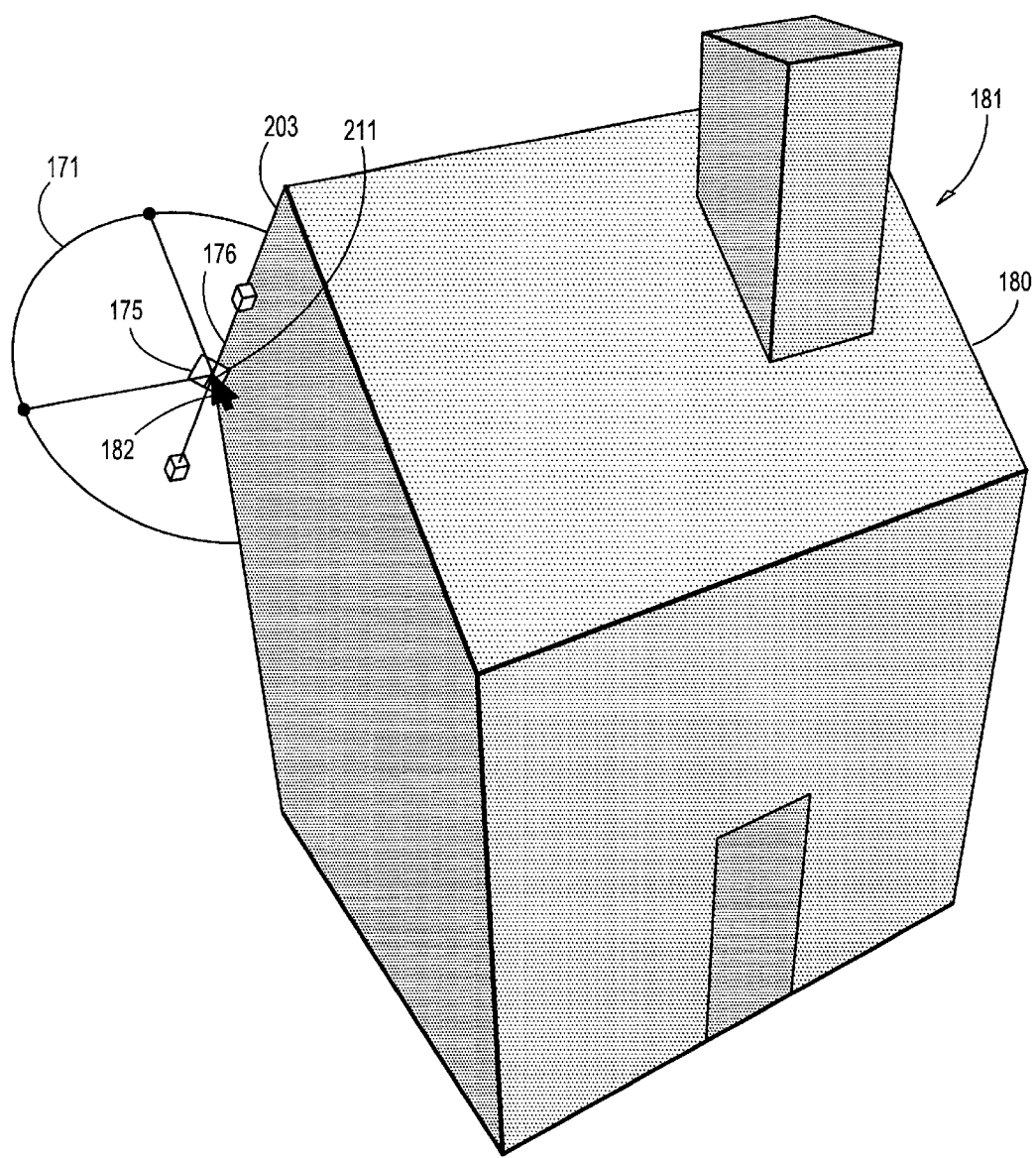

The third mode of PEP jack positioning is linear movement along the PEP jack's axle 176. FIGS. 21 and 22 depict before and after views of an example of this PEP jack positioning mode. When the PEP jack 170 is positioned as shown in FIG. 21 with its wheel 171 coplanar with roof polygon 180, the user can reposition the PEP jack 170 anywhere along the direction of the PEP jack's axle 176 without realigning the PEP jack. To do so, the user clicks the cursor 182 on the PEP jack's handle 175 and then control-drags the PEP jack to the desired location. As shown in FIG. 22, the user in this example has control-dragged the PEP jack down along edge 203 until the center 175 of the PEP jack is at point 211 on the house 180. The PEP jack retains the same orientation as it had in FIG. 21.

FIGS. 23A through 25B show three before and after examples of the PEP jack being used to rotate PEPs. Rotating PEPs with the PEP jack is performed first by selecting the desired PEPs to be rotated (i.e., designating the PEP selection), next positioning the PEP jack in the manner described above, and then dragging one of the PEP jack's four rotation knobs 173 to bring about the actual rotation of the PEPs. The default rotation mode (i.e., simple click-dragging of a rotation knob 173) performs one-dimensional rotation about the PEP jack's axle 176. Shift-dragging a rotation knob 173 causes the PEP selection to rotate freely (i.e., unconstrained rotation in all three dimensions) about the PEP jack's center point 175.

Figure 23A:
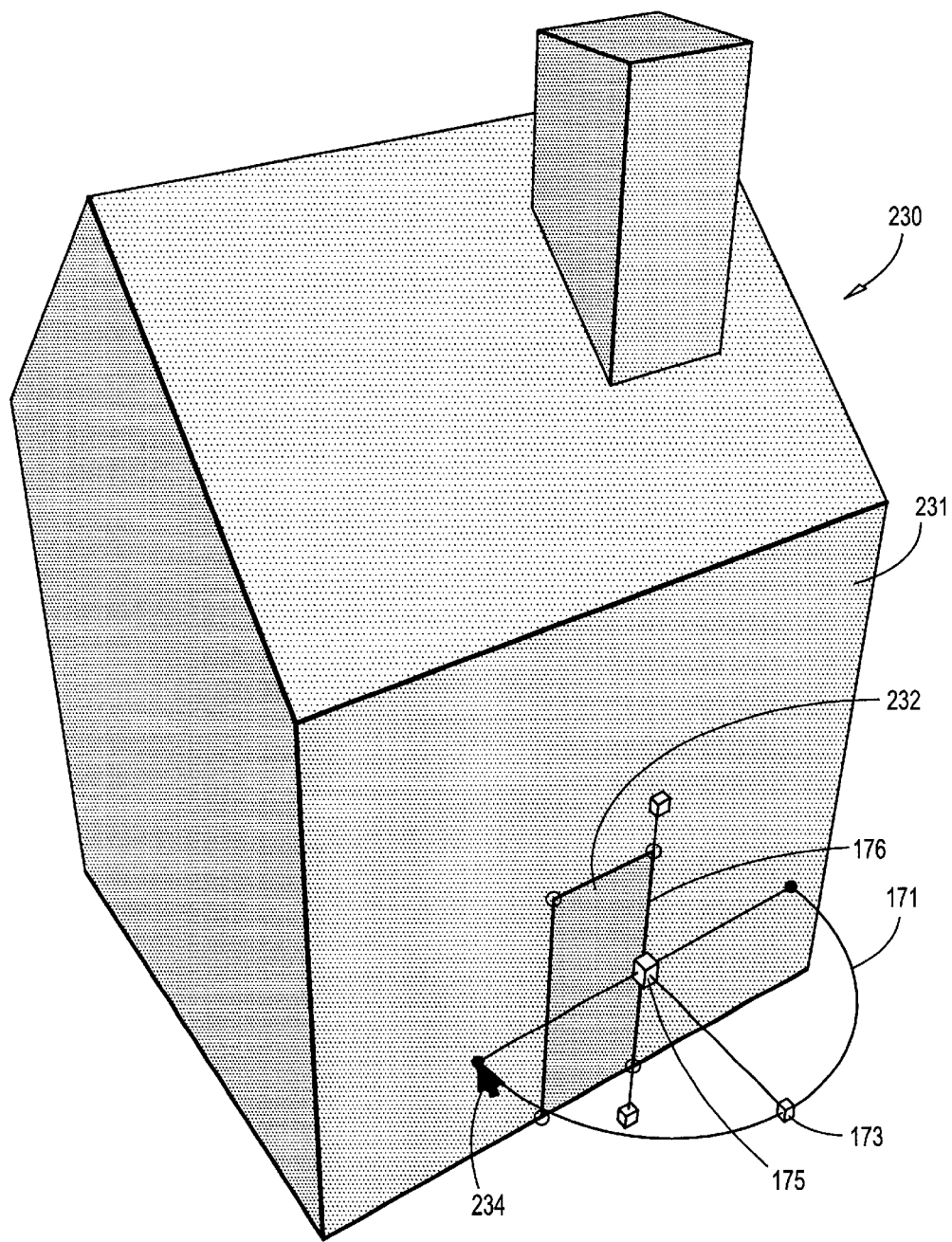
FIGS. 23A–23B, 24A–24B and 25A–25B show three examples of using the PEP jack of FIG. 17 to rotate features of a house.
Figure 23B:
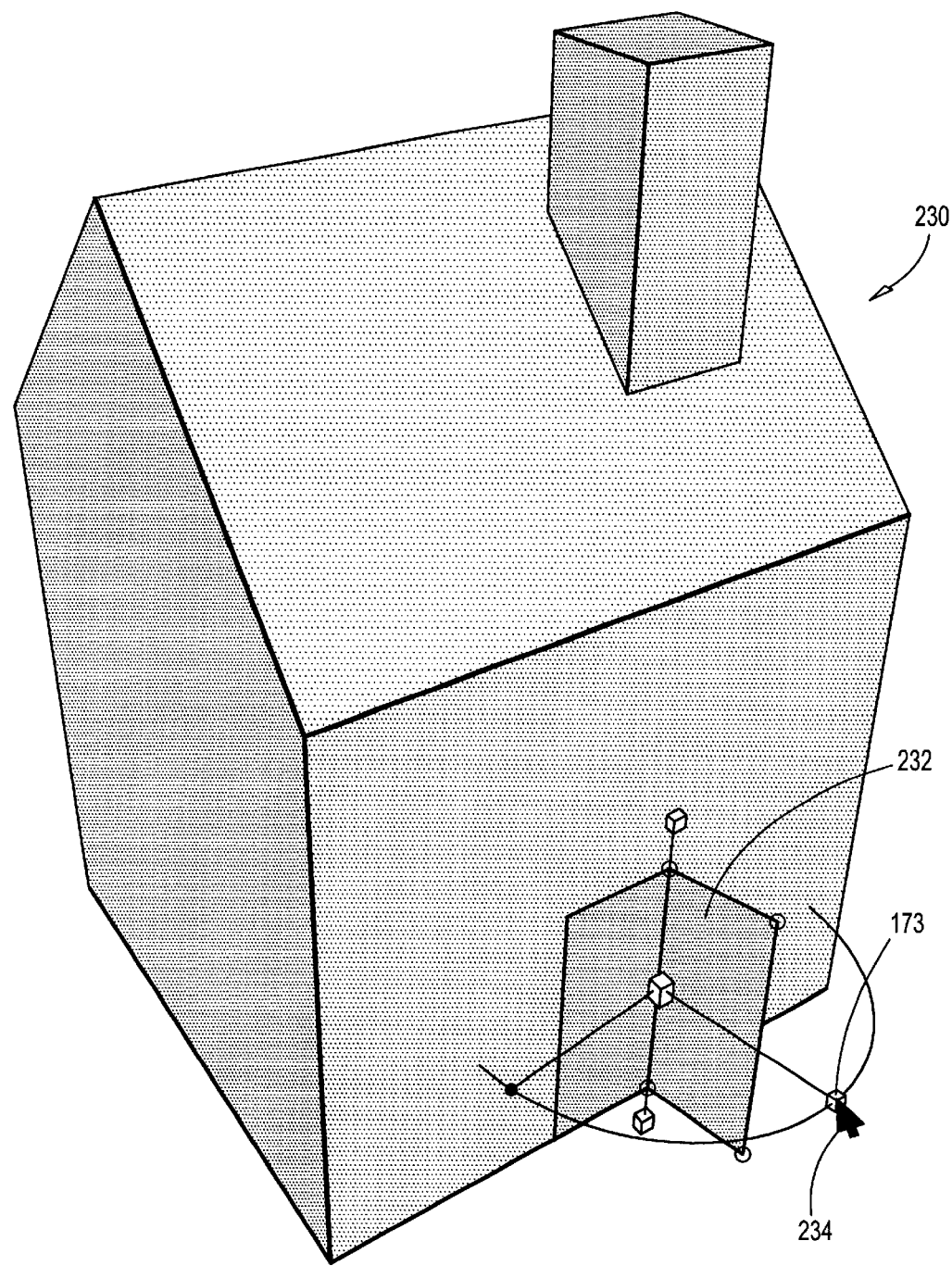

FIGS. 23A and 23B depict before and after views of an example in which one-dimensional rotation of the PEP jack is used to create an open door in a house 230. In FIG. 23A, the user has pre-cut and chipped-off a rectangle 232 which forms the door. The user has positioned the PEP jack so that its axle 176, which is the axis of rotation, is aligned with an edge of the door where the hinges would go. The door can be opened by clicking the cursor 234 on the rotation knob 173 and dragging it in the desired direction to the desired angle of rotation. As shown in FIG. 23B, the user has rotated the door 232 open by dragging the rotation knob 173 counterclockwise, as viewed from the top of the house 230, to an angle of approximately 90 degrees relative to the starting position.

Figure 24A:
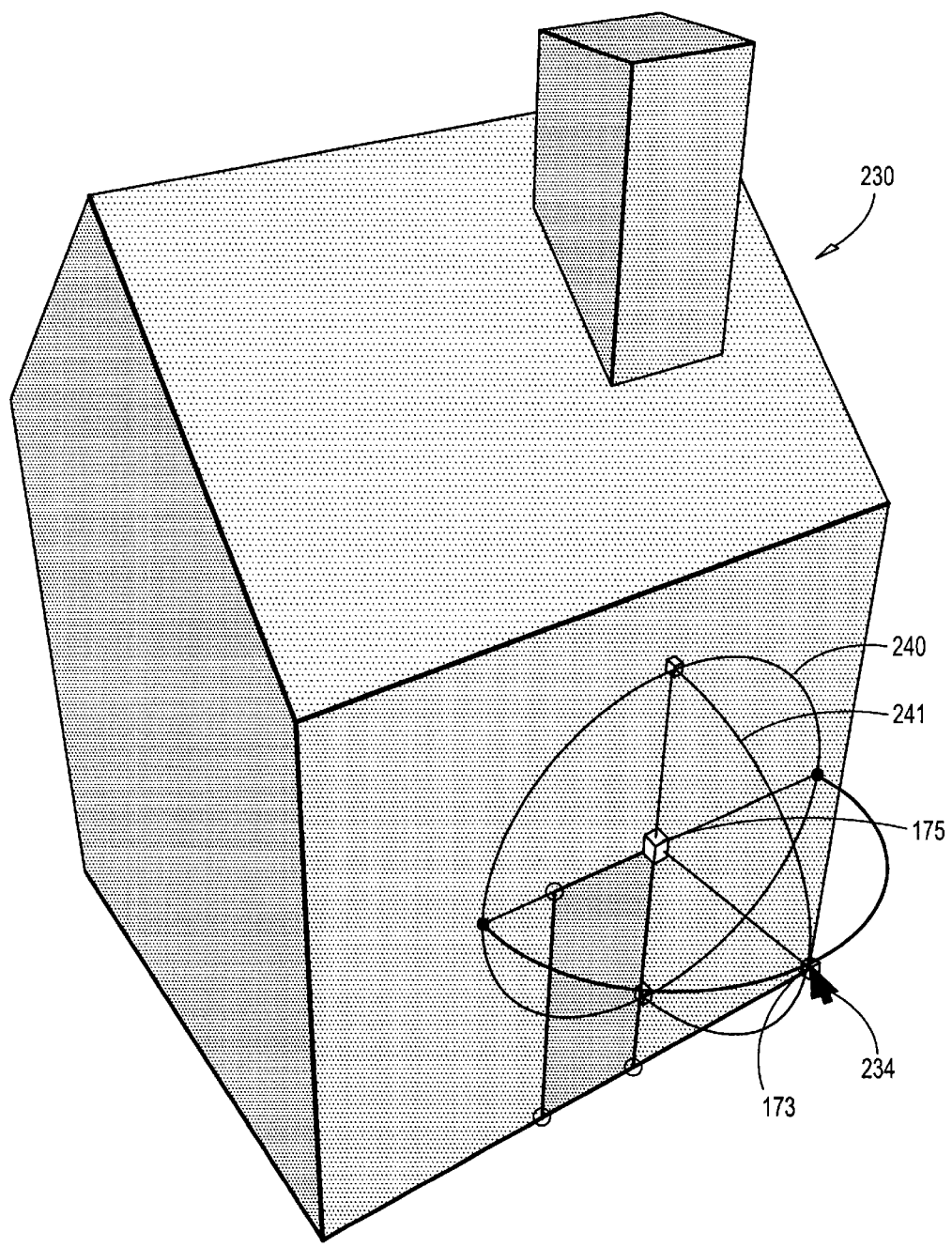
Figure 24B:
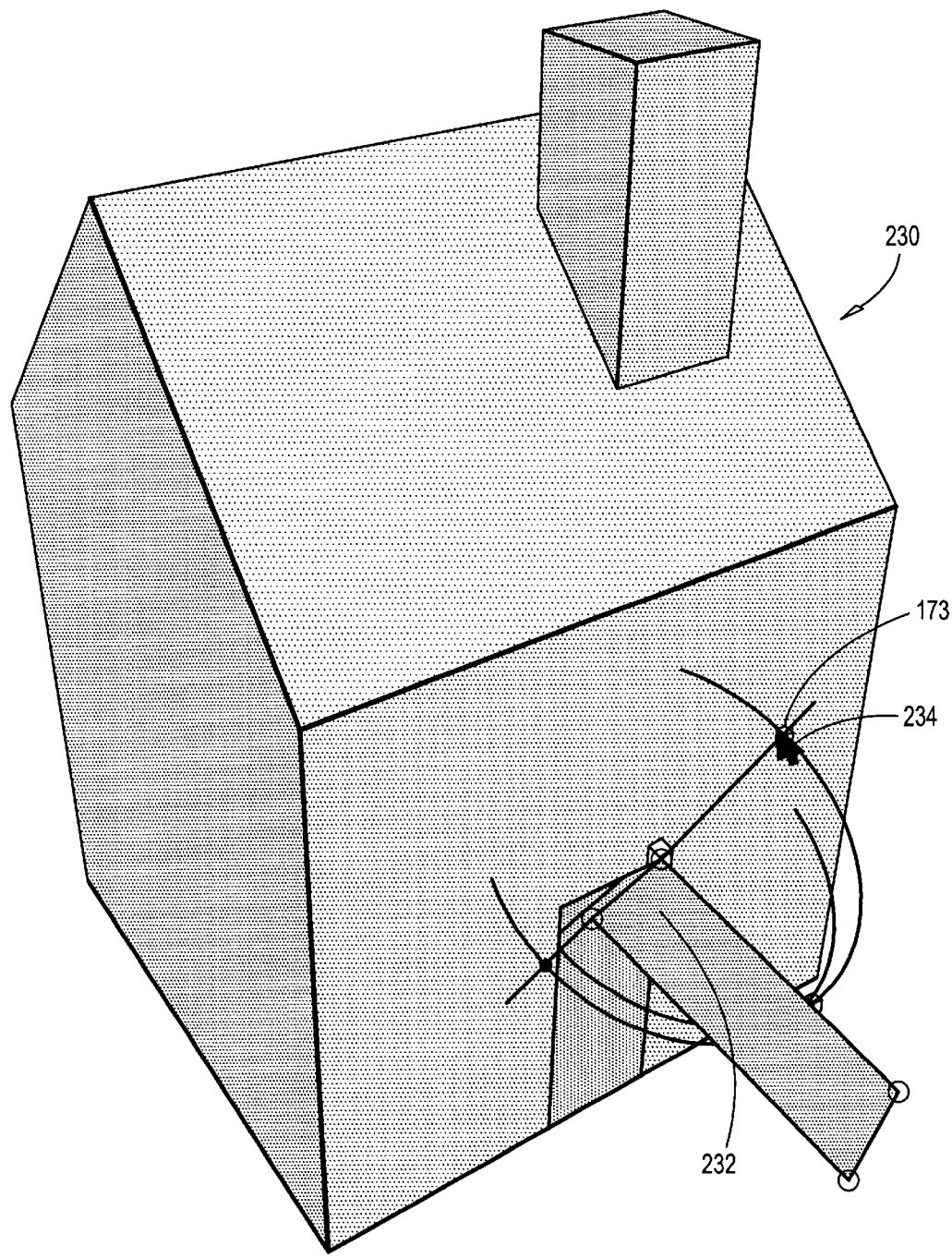

FIGS. 24A and 24B depict before and after views of an example in which the PEP jack is used to rotate PEPs freely in three dimensions. In FIG. 24A, the user has positioned the PEP jack so that its center point 175 coincides with a top right corner of the door 232, as viewed while facing the front of the house. In this example, the user clicks on rotation knob 173 and depresses the SHIFT key which causes two additional wheels, or rotation rings, 240 and 241 to appear. The three wheels 171, 240 and 241, which are oriented such that the plane of each ring is perpendicular to the planes of the other two rings with all three center points coinciding, inform the user that the PEP selection may be freely rotated in any or all of the three directions represented by the wheels. In this example, the user shift-drags the rotation knob 173 up and to the right to cause multi-dimensional rotation of the door 232 as shown in FIG. 24B.

Figure 25A:
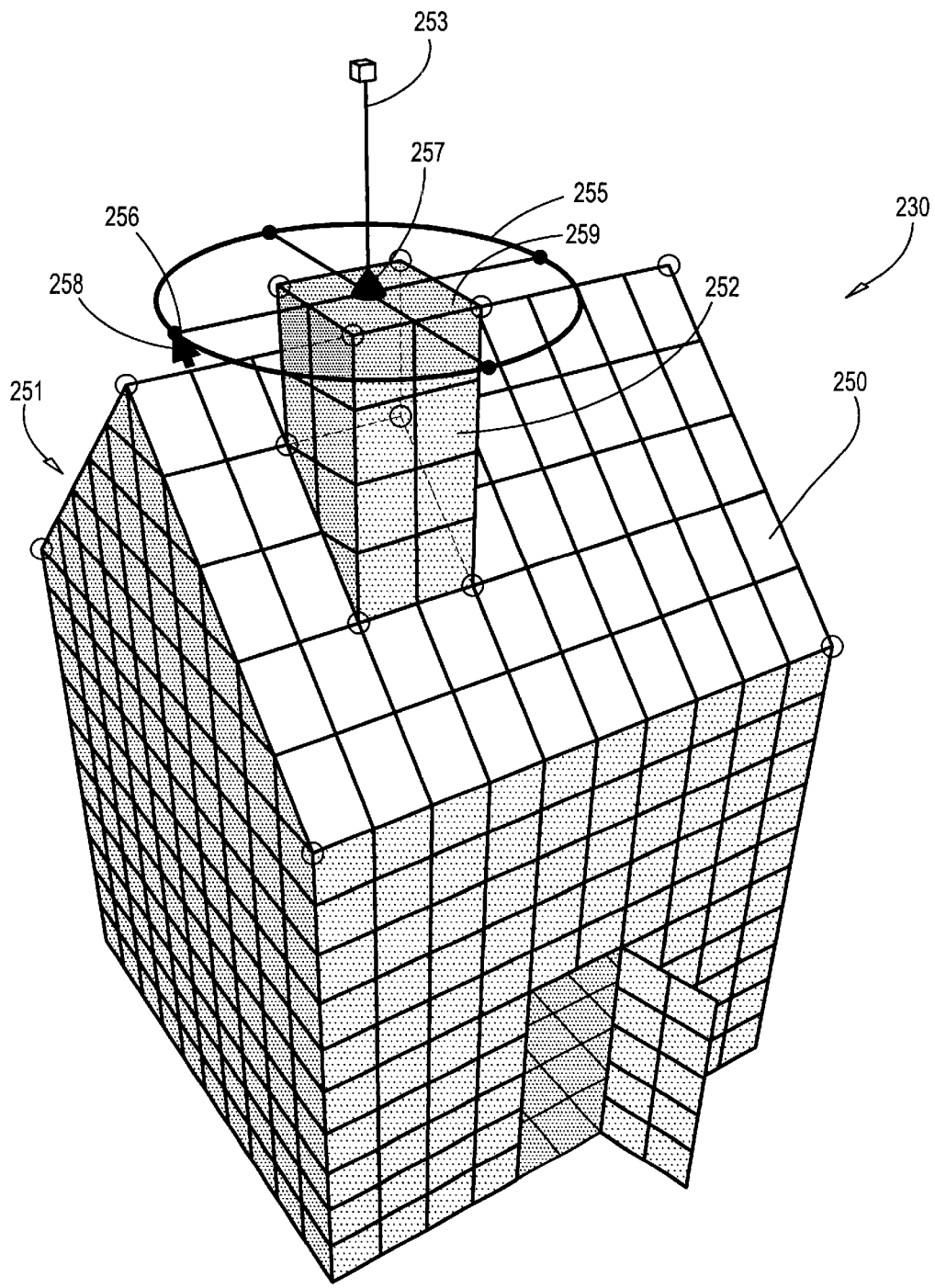
Figure 25B:
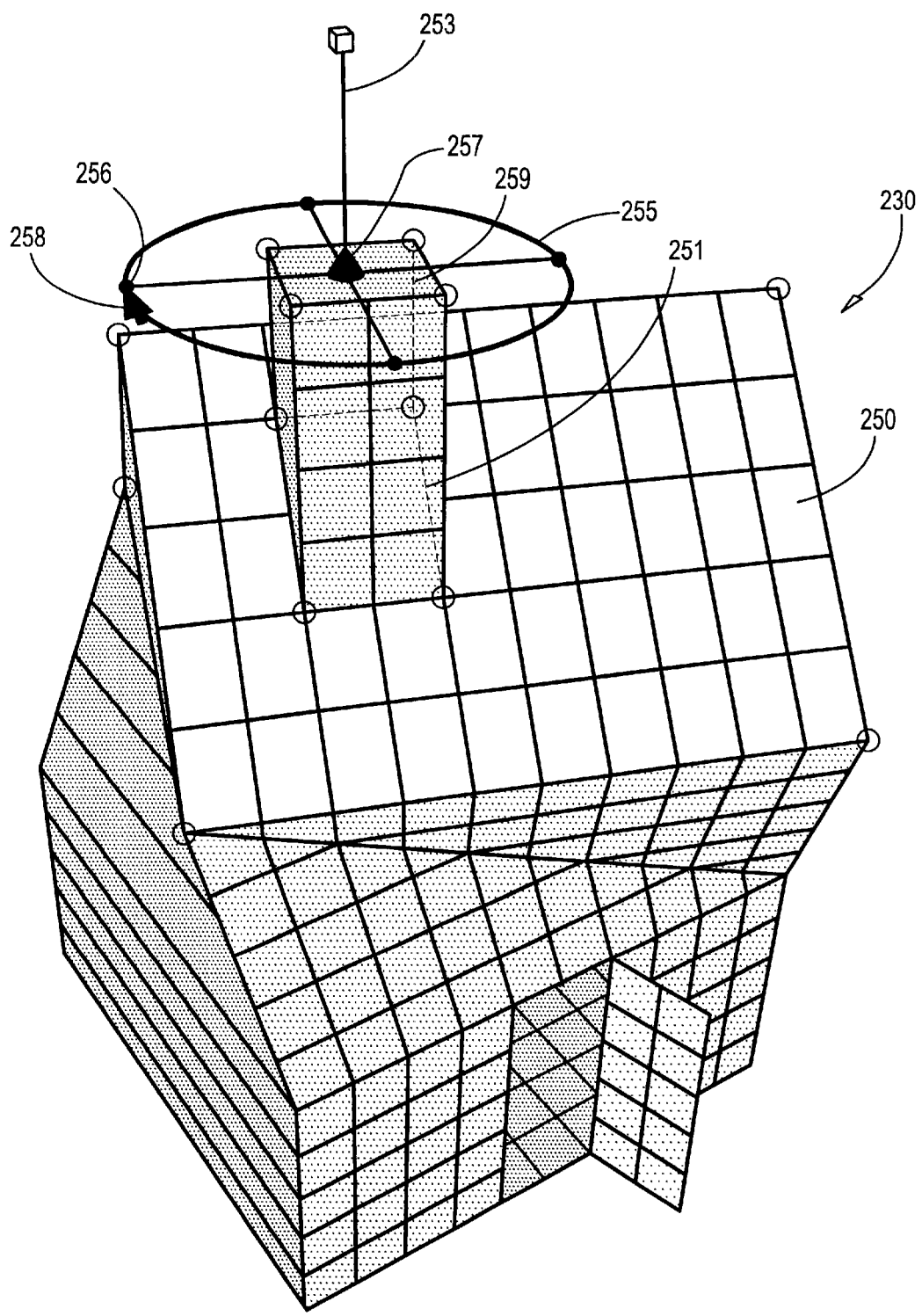

The PEP jack also may be used to rotate a group of PEPs simultaneously as shown in the example illustrated in the before and after views of FIGS. 25A and 25B. In FIG. 25A, the user has designated several features of the house 230 as the PEP selection including the PEPs forming the chimney 252 and both planes 250 and 251 of the roof. The user has positioned the PEP jack such that its wheel 255 is coplanar with a polygon 259 forming the top of the chimney 252 with the PEP jack's axis passing through the center of polygon 259. When the user clicks the cursor 258 on the rotation knob 256 and rotates the PEP jack clockwise (as viewed from above the house), all of the PEPs in the PEP selection rotate in concert and form the contorted and apparently non-earthquake-proofed structure shown in FIG. 25B.

FIGS. 26A through 28B illustrate examples of using the PEP jack to scale a PEP selection in one, two and three dimensions.

Figure 26A:
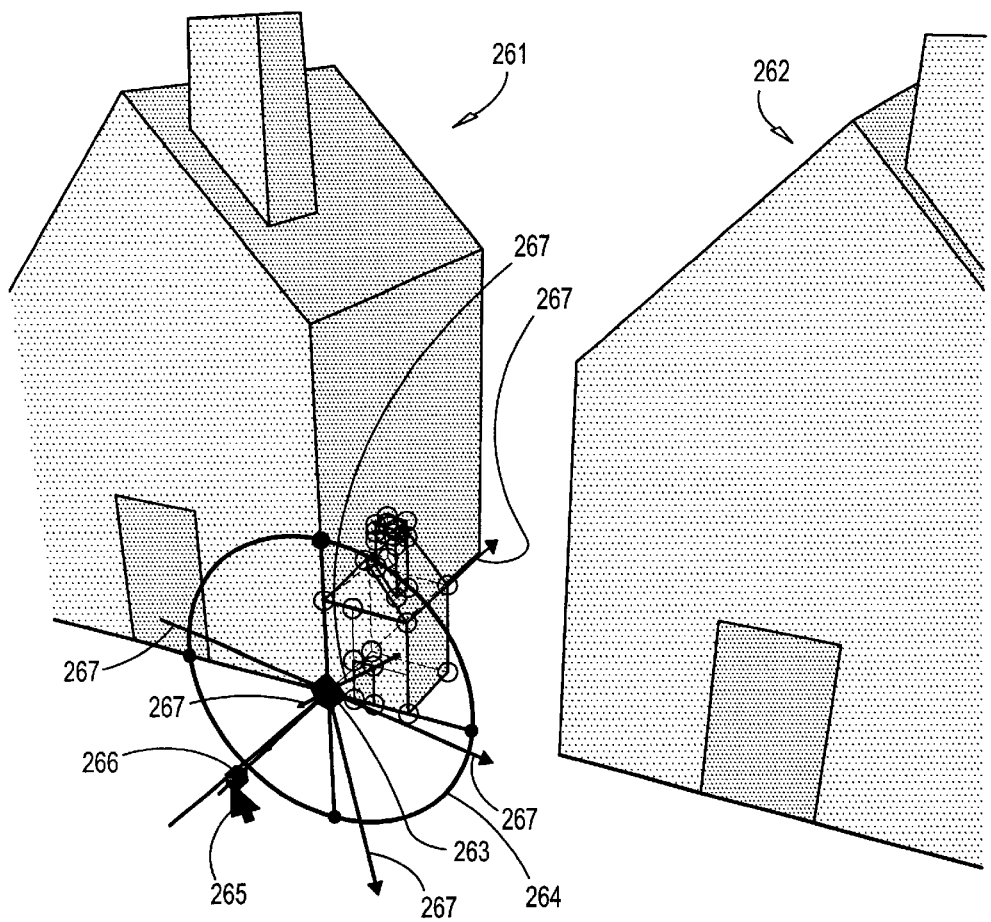
FIGS. 26A–26B, 27A–27B and 28A–28B show three examples of using the PEP jack of FIG. 17 to scale features of a house.
Figure 26B:
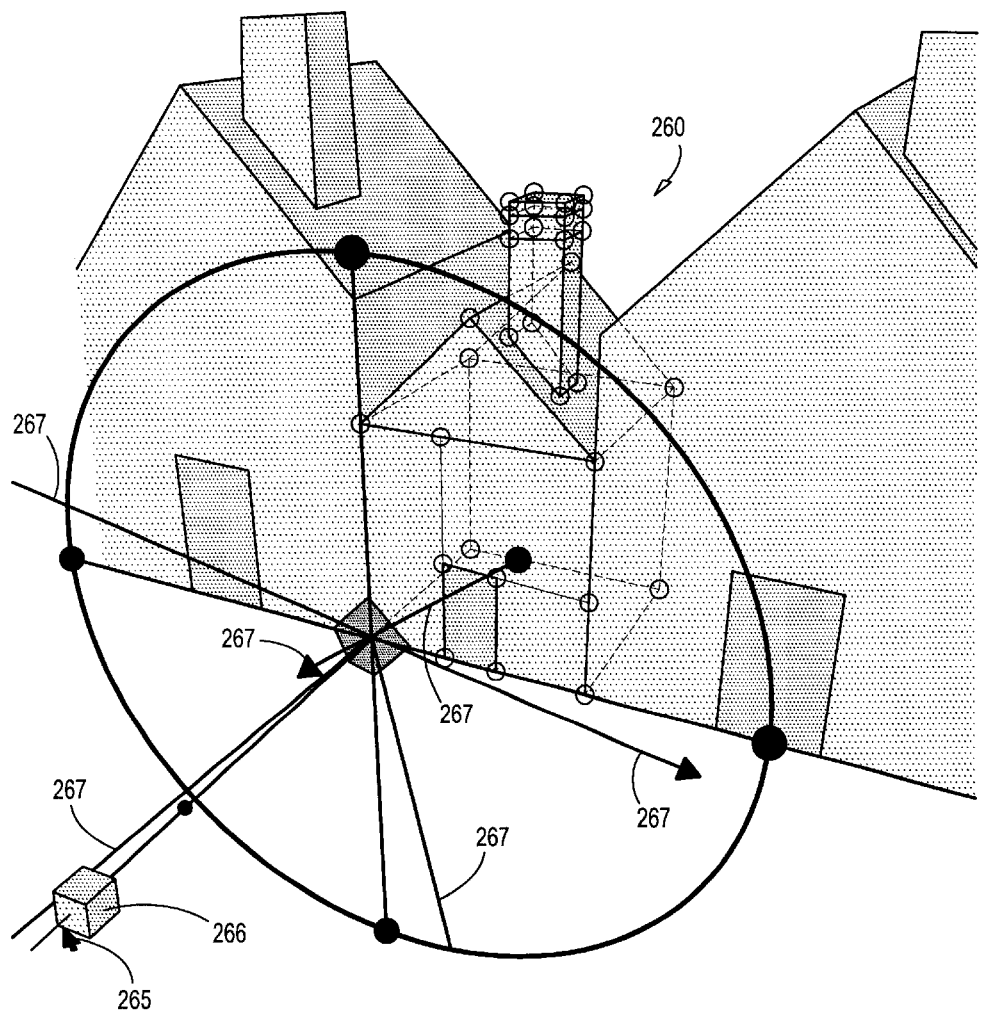

FIGS. 26A and 26B show before and after views of a house 260 that is scaled in all three dimensions (i.e., uniform scaling) to occupy the empty space between its two neighboring houses 261 and 262. In this example, the scaling occurs about (i.e., relative to) a single point, specifically the PEP jack's handle 263 which coincides with the point on the lower left edge of house 260, such that that point remains fixed at its present location regardless of how much or how little the house is scaled. To perform the uniform scaling operation, the user first designates all of the PEPs forming the house 260 as the PEP selection. The user then orients the PEP jack by click-dragging the handle 263 to a point on the front face of the house 260 (but not on the perimeter of that face) such that the PEP jack's wheel 264 is coplanar with the front of the house 260. Next the user shift-drags the translation handle 263 in order to reposition the PEP jack without re-orienting it, such that the "scale about" point is located at the lower left corner of the house.

Once the PEP selection has been designated and the PEP jack has been properly positioned and oriented, the user then clicks the cursor 265 on either of the two scaling handles 266 and click-drags the handle in the proper direction (away from the PEP jack's center to scale larger; towards the PEP jack's center to scale smaller) to uniformly scale the entire PEP selection as desired. Radial arrows 267 inform the user of the directions in which the PEP selection will expand or shrink as it is being scaled.

In this example, the user has dragged the scaling handle 266 away from the PEP jack's center until the house 260 is uniformly scaled to the point that it occupies the space between the neighboring houses 261 and 262, as shown in FIG. 26B. The scaling operation also causes the PEP jack to uniformly increase in scale proportionately to the PEP selection.

Figure 27A:
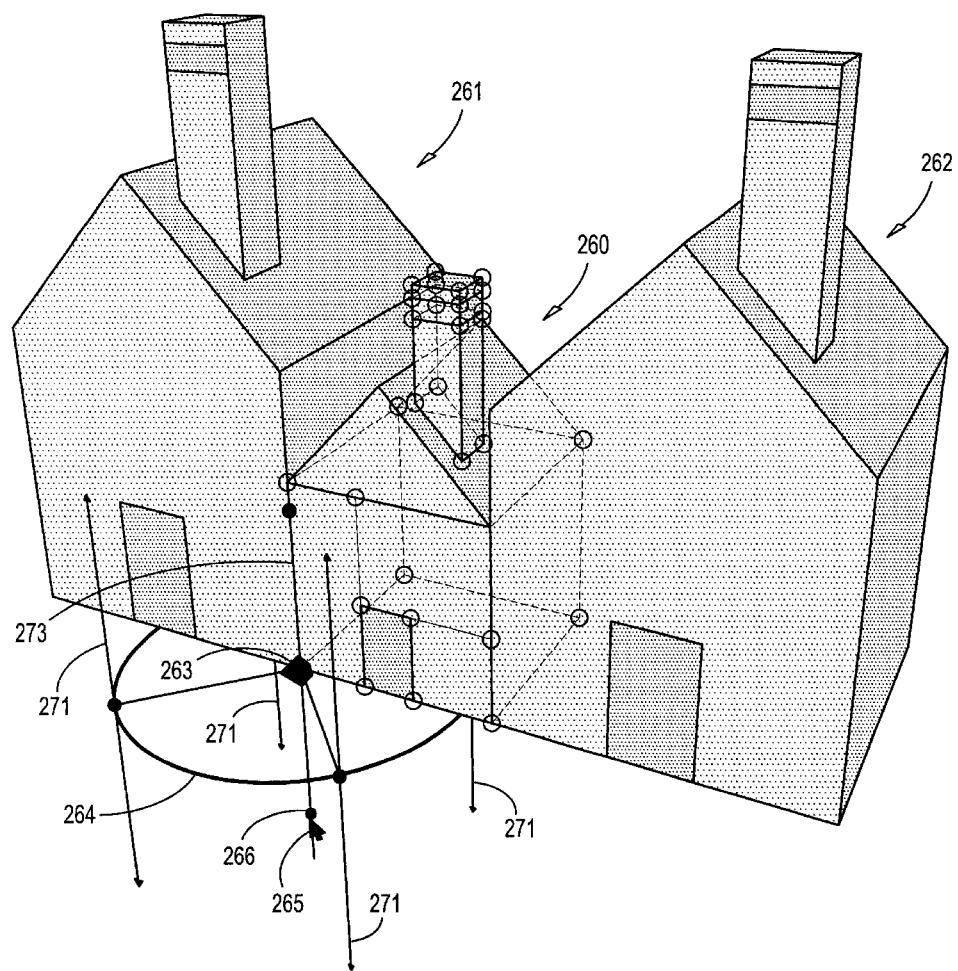
Figure 27B:
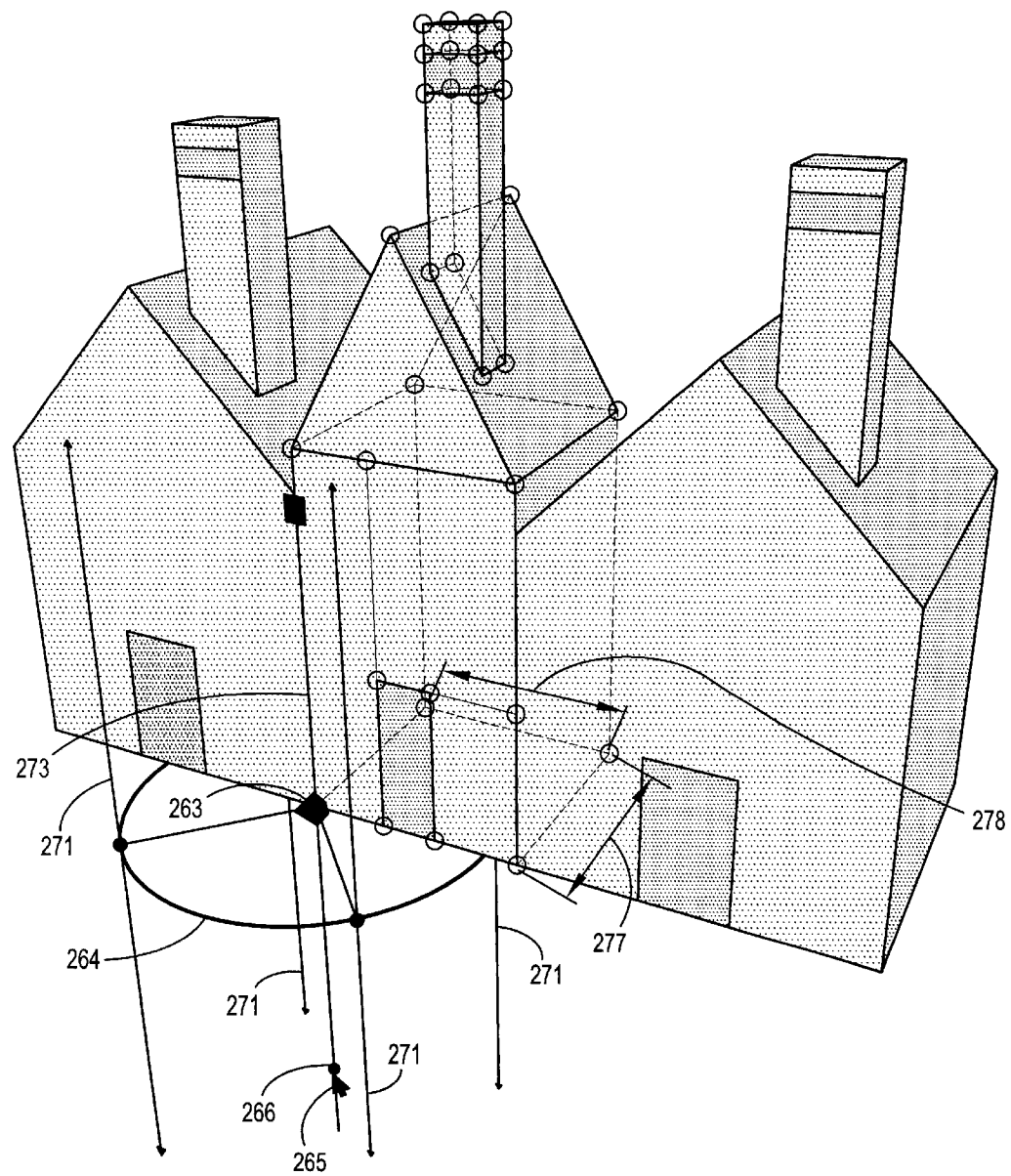

The before and after views of FIGS. 27A and 27B illustrate an example of scaling PEPs in one dimension along the PEP jack's axis 273 about a fixed point 263. As shown in FIG. 27A, after all of the house's PEPs have been designated as the PEP selection, the user positions the PEP jack such that its handle 263 is located at the point around which scaling is to occur and the PEP jack's axle 273 is parallel to the direction in which one-dimensional scaling (i.e., stretching) is desired. The user then clicks the cursor 265 on one of the scaling handles 266 and shift-drags it in the proper direction to scale the PEP selection as desired. Vertical arrows 271 inform the user of the directions in which the PEP selection will expand or shrink as it is being scaled.

In this example, the user has shift-dragged the scaling handle 266 away from the PEP jack's center until the house 260 is stretched along the PEP jack's axle 273 to the desired height, as shown in FIG. 27B. The scaling operation also causes the PEP jack to stretch proportionately to the PEP selection. Because the scaling has been constrained to the single direction along the PEP jack's axle 273, the other two dimensions 277 and 278 of the PEP selection (and of the PEP jack itself) remain unchanged.

Figure 28A:
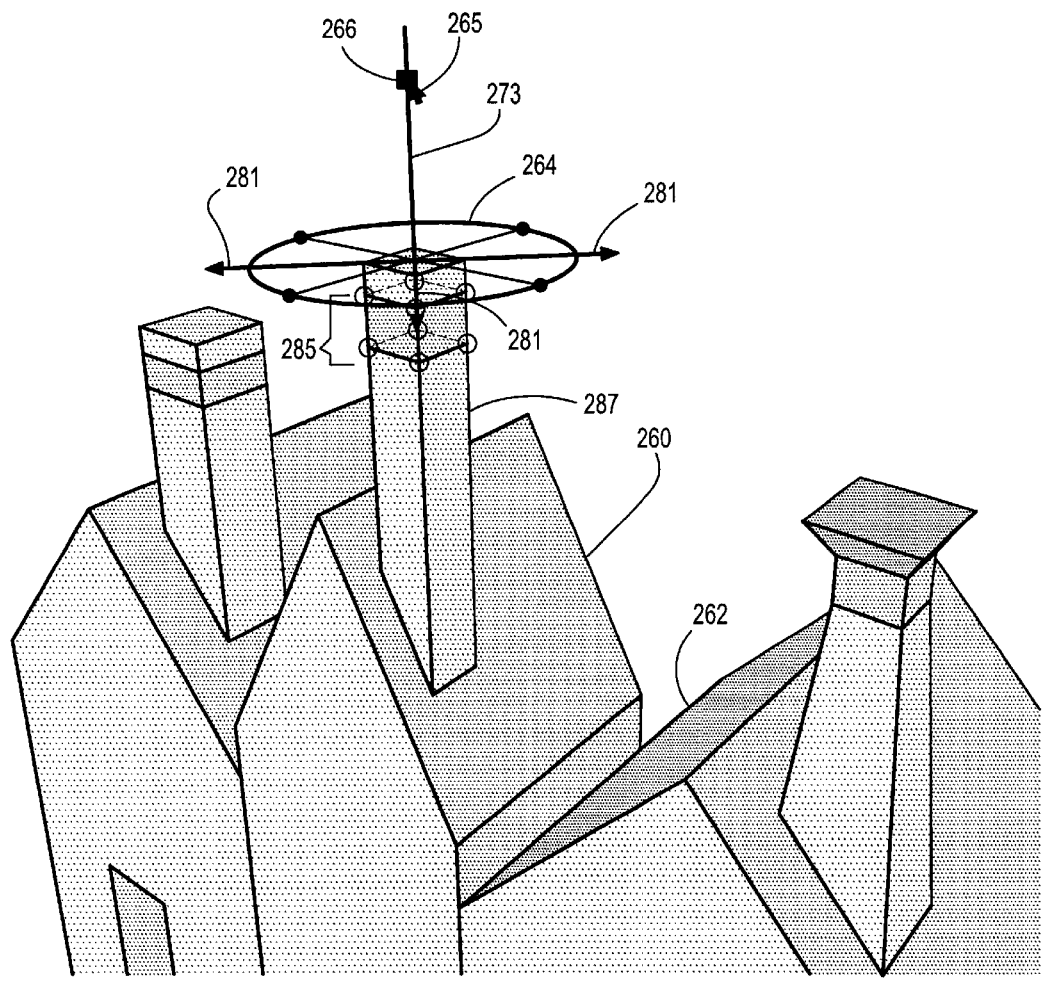
Figure 28B:
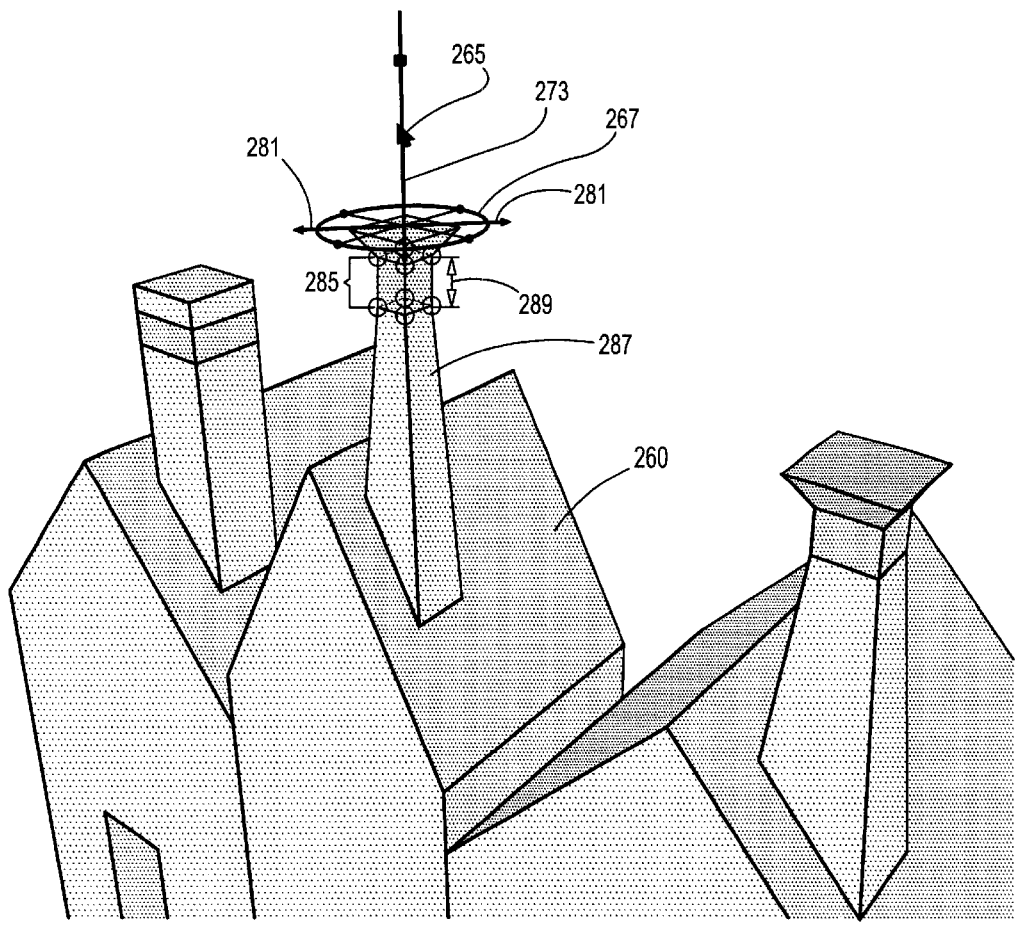

The before and after views of FIGS. 28A and 28B illustrate an example of scaling PEPs in two dimensions in the plane of the PEP jack's wheel 264. As shown in FIG. 28A, after the desired features of the house 260 have been designated as the PEP selection (the dark band 285 near the top of the chimney 287), the user positions the PEP jack atop the chimney 287 such that the PEP jack's wheel 264 is coplanar with the two dimensions in which scaling is desired. The user then clicks the cursor 265 on one of the scaling handles 266 and control-drags it in the proper direction to scale the PEP selection in two dimensions as desired. Radial arrows 281 within the plane of the wheel 264 inform the user of the directions in which the PEP selection will expand or shrink as it is being scaled.

As shown in FIG. 28B, the user in this example has control-dragged the scaling handle 266 towards the PEP jack's center until the dark band 285 is shrunk to the desired size in the two dimensions defining the plane of the PEP jack's wheel 264, thereby imparting a taper to chimney 287. The scaling operation also causes the PEP jack to shrink in two dimensions proportionately to the PEP selection. Because the scaling has been constrained to two dimensions in the plane of the PEP jack's wheel 264, the other dimension 289 of the PEP selection (and of the PEP jack itself) remains unchanged.

Object Alignment Techniques

Cosmo™ Worlds also provides several object alignment techniques, or "snapping" tools, that allow users to quickly and precisely align objects, both relative to other objects in the scene and in an absolute sense. The snapping tools make extensive use of visual feedback to provide users with qualitative and quantitative information concerning the alignment status of objects. The tools can be used in connection with any of the translation, rotation and scaling mechanisms described above, either with or without motion constraint, to align objects and their features in a dynamically defined coordinate space.

Figure 29A:
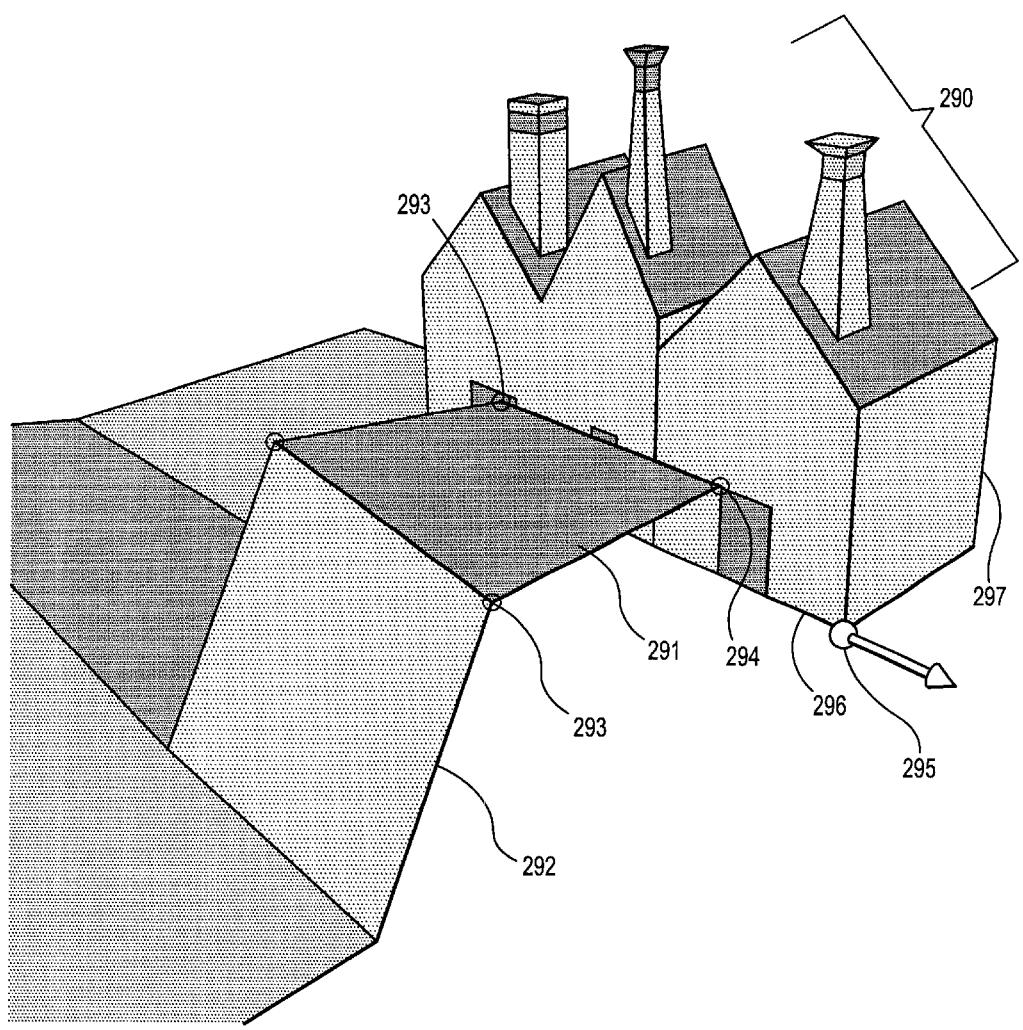
FIGS. 29A–29E illustrate an example of aligning a polygon to a snap target using translational motion.

FIGS. 29A through 29E illustrate an example of using a snap target to align, through translational movement, a ground polygon 291 with a front edge 296 of a row of three houses 290. As shown in FIG. 29A, the ground polygon is out of alignment with the front edge 296 in all three dimensions, as indicated by the symbol (".") appearing in the alignment indicators 224 arranged around the perimeter of the polygon 291 at eight locations, specifically, at each of the polygon's four corners and at the midpoints of the polygon's sides. A ninth alignment indicator 224 appears at the center of the polygon. To bring the polygon into proper alignment, the user first designates polygon 291 as the PEP selection by clicking and releasing on a point in the interior of the polygon. This action also designates the polygon as the master PEP selection since the master PEP selection is by definition the last point, edge or polygon selected.

The significance of the master PEP selection, which may be a single point, a single edge, or a single polygon, is that it is used as a reference in determining when alignment has been achieved and for providing visual feedback. As the master PEP selection is moved, the other PEPs in the PEP selection simply follow along by maintaining their respective spatial separations relative to the master PEP selection and relative to each other.

After designating the PEP selection, which in this case is coextensive with the master PEP selection, the user activates a snap target 295 and positions it at a target location within the scene. The target location is the point in the scene to which the master PEP selection is to be moved to achieve alignment. In this example, the user places the snap target 295 at the lower right corner of the rightmost house 297 in the row of houses 290 (as viewed when facing the row of houses).

Figure 29B:
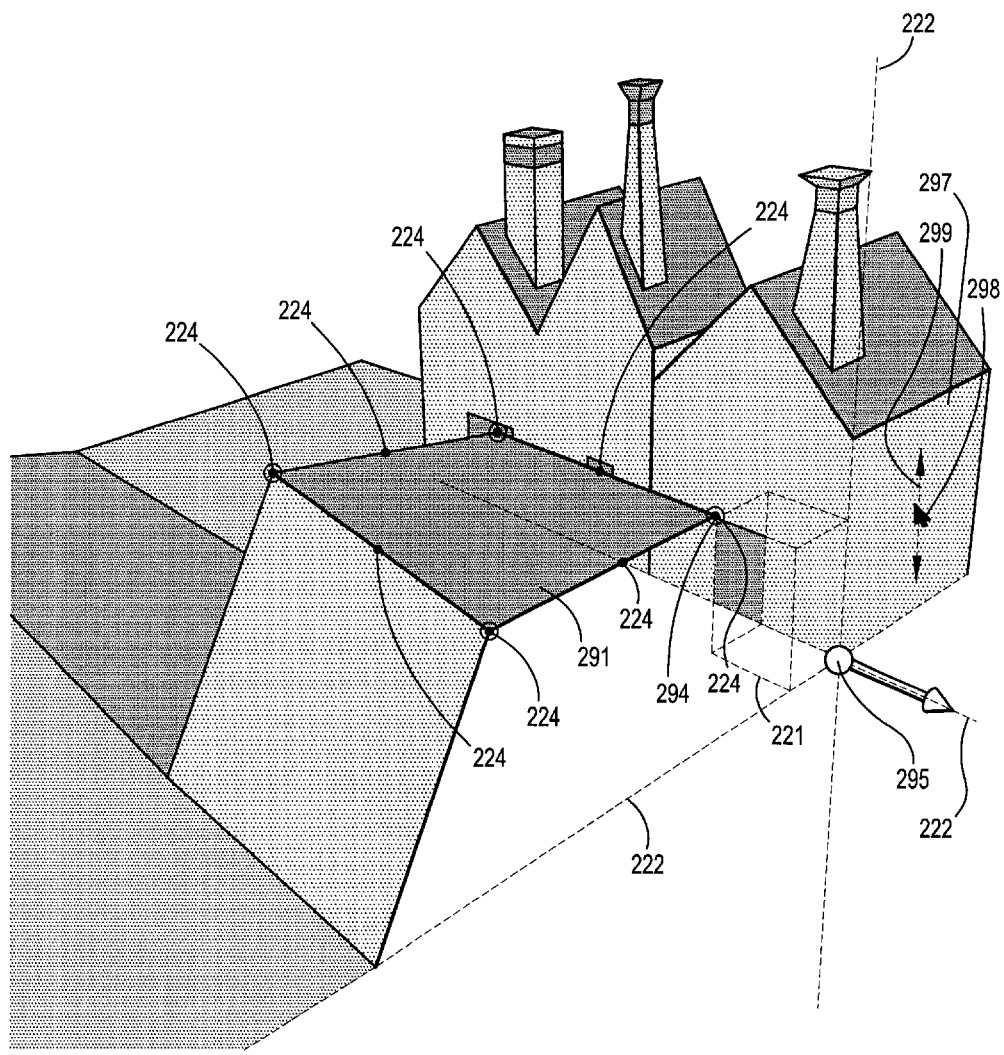

After the PEP selection has been designated and the snap target has been placed, the alignment operation is initiated as shown in FIG. 29B. Although the user could choose to move the master PEP selection 294 in many different ways, the user in this example has chosen to make use of the motion constraint features of Cosmo™ Worlds and move the master PEP selection in only one dimension at a time. To do so, the user first positions the cursor 298 over the side polygon 220 of the rightmost house 297 and clicks, thereby defining the motion plane to be coplanar with polygon 220. The user constrains motion to a single vertical direction within the motion plane, as indicated by bi-directional arrow 299, by shift-dragging the cursor 298 in the general direction pointed at by arrow 299. In response, a wire frame box 221 formed of blue-and-white dashed lines is displayed which fills the space between the closest point to the cursor 294 of the master PEP selection and the snap target 295 such that one corner of the box 221 coincides with the point 294 and the opposing corner of the box 221 coincides with the snap target 295. A separate set of three blue-and-white dashed lines 222 extending through the snap target point 295, one extending in each of the three axial directions of the motion plane, also appears when the user starts to shift-drag the cursor 298.

Figure 29C:
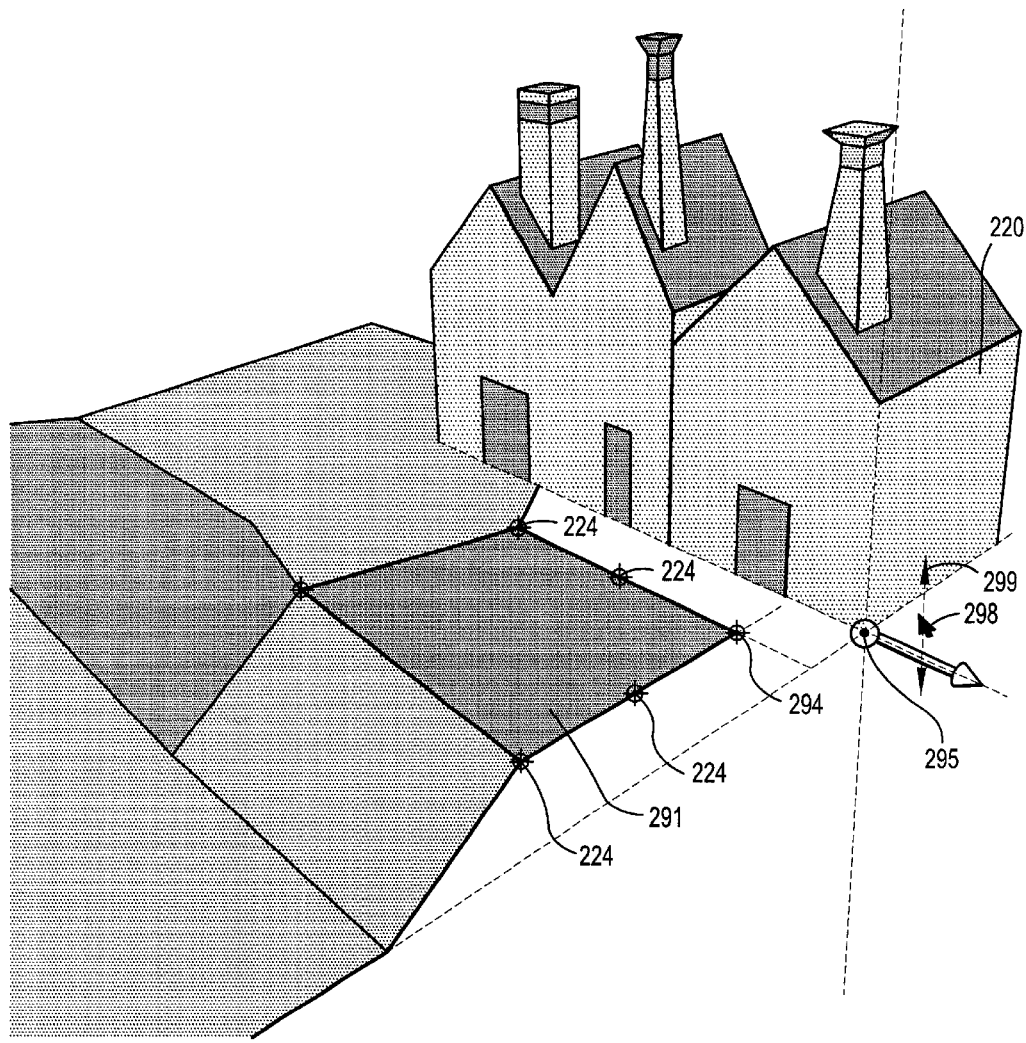

As the user continues to shift-drag the cursor towards the snap target point 295, the PEP selection translates in the constrained direction by a corresponding amount, with the blue-and-white wire frame box 221 rubber-banding so that it consistently occupies the narrowing void between the point 294 and the snap target 295. Eventually the user shift-drags the cursor to a location at which the point 294 becomes aligned with the snap target 295 in one of the three dimensions as shown in FIG. 29C. At that point of alignment, movement of the cursor 298 becomes slightly "sticky" to provide sensory feedback to the user that an alignment point has been reached. Visual feedback also is provided to the user by changing the symbol appearing in five of the nine alignment indicators 224 from a "." to a "+" to indicate that those points are now in alignment in one dimension relative to the snap point 295. The remaining four alignment indicators 224 retain their "." symbol to indicate that they are aligned in no dimensions relative to the snap target 295. In addition, the blue-and-white wire frame box 221 collapses in one of its dimensions to become a blue-and-white wire frame square 223 occupying the two-dimensional space between the point 294 and the snap target 295.

Figure 29D:
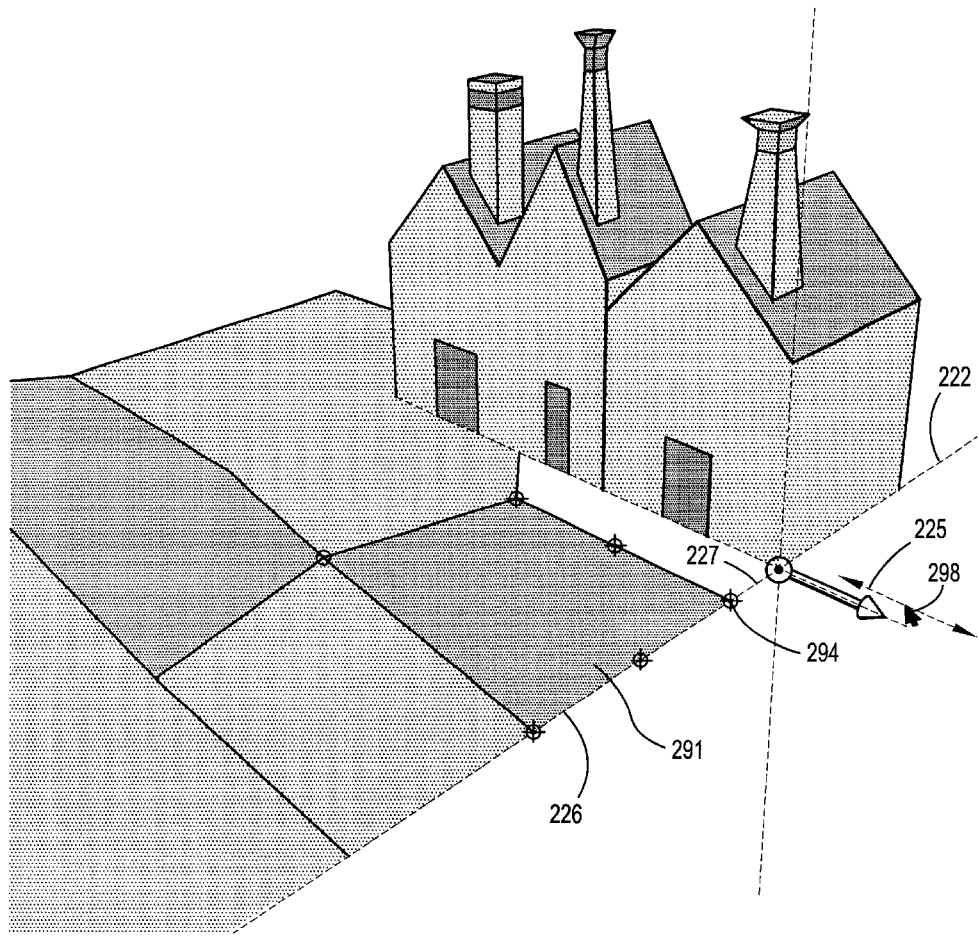

Next, the user aligns the master PEP selection in another of the three dimensions by control-dragging the cursor 298 to constrain motion to a new axial direction, specifically the directions indicated by the bi-directional arrow 225 shown in FIG. 29D. The user continues to control-drag the cursor 298 until the next alignment event occurs, specifically, when the edge 226 of polygon 291 becomes colinear with one of the blue-and-white axial lines 222 extending through the snap target point 295. Again, the user is provided with both sensory feedback and visual feedback when the point 294 becomes aligned with the snap target 295 in two dimensions. The cursor becomes sticky at the alignment point and the symbol in three of the nine alignment indicators 224 along edge 226 of polygon 291 changes from a "+" to a "*" to indicate alignment in two dimensions. In addition, the blue-and-white wire frame square 223 collapses in another dimension to become a blue-and-white line 227 extending between the point 294 and the snap target 225.

Figure 29E:
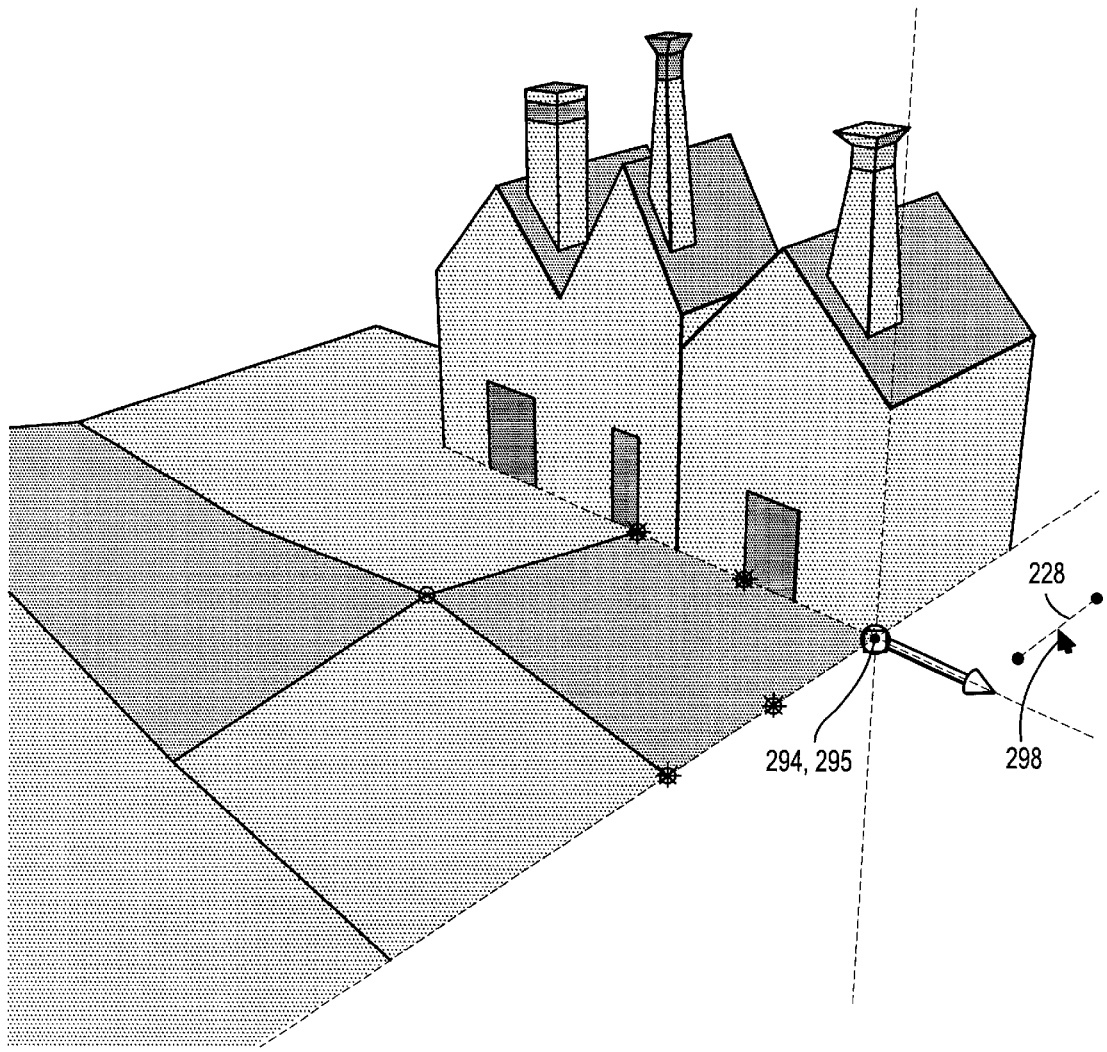

Finally, the user achieves alignment in all three dimensions by shift-dragging the cursor 298 to constrain motion to the directions indicated by the bi-directional is arrow 228 in FIG. 29E. The user continues shift-dragging until the point 294 coincides with the snap target 295 at which point the cursor again becomes sticky and the blue-and-white line 227 disappears altogether. The symbols in three of the nine alignment indicators 224 also change when the point 294 becomes aligned in three dimensions with the snap target 295. The symbol at the point 294 itself changes from a "*" to a "*" bounded by a square, and the symbols at the other two alignment indicators change from "+" to "*" to indicate alignment in all three dimensions relative to the snap target 295.

Figure 30A:
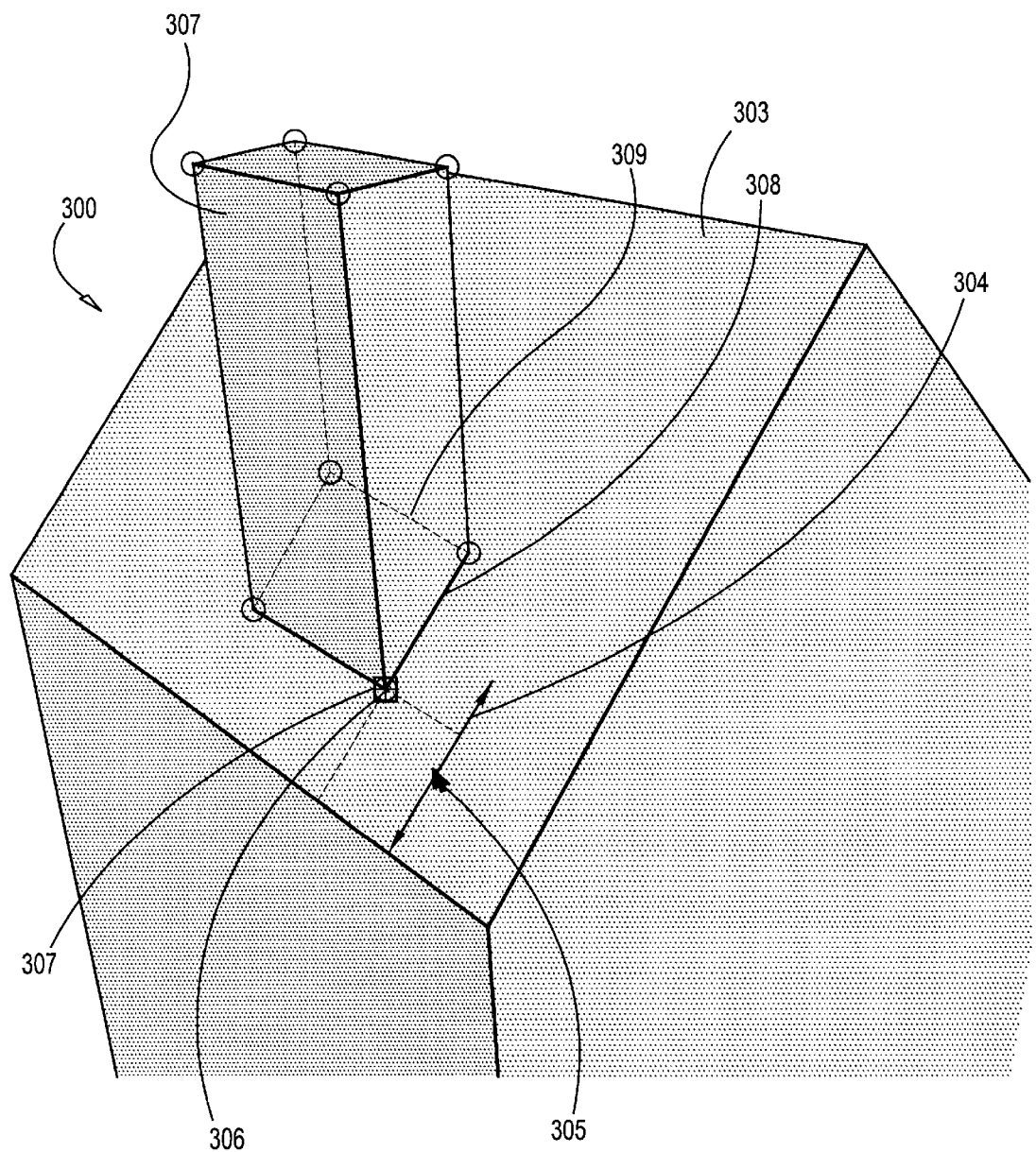
FIGS. 30A–30B show an example of translating a chimney on a house using a relative grid.
Figure 30B:
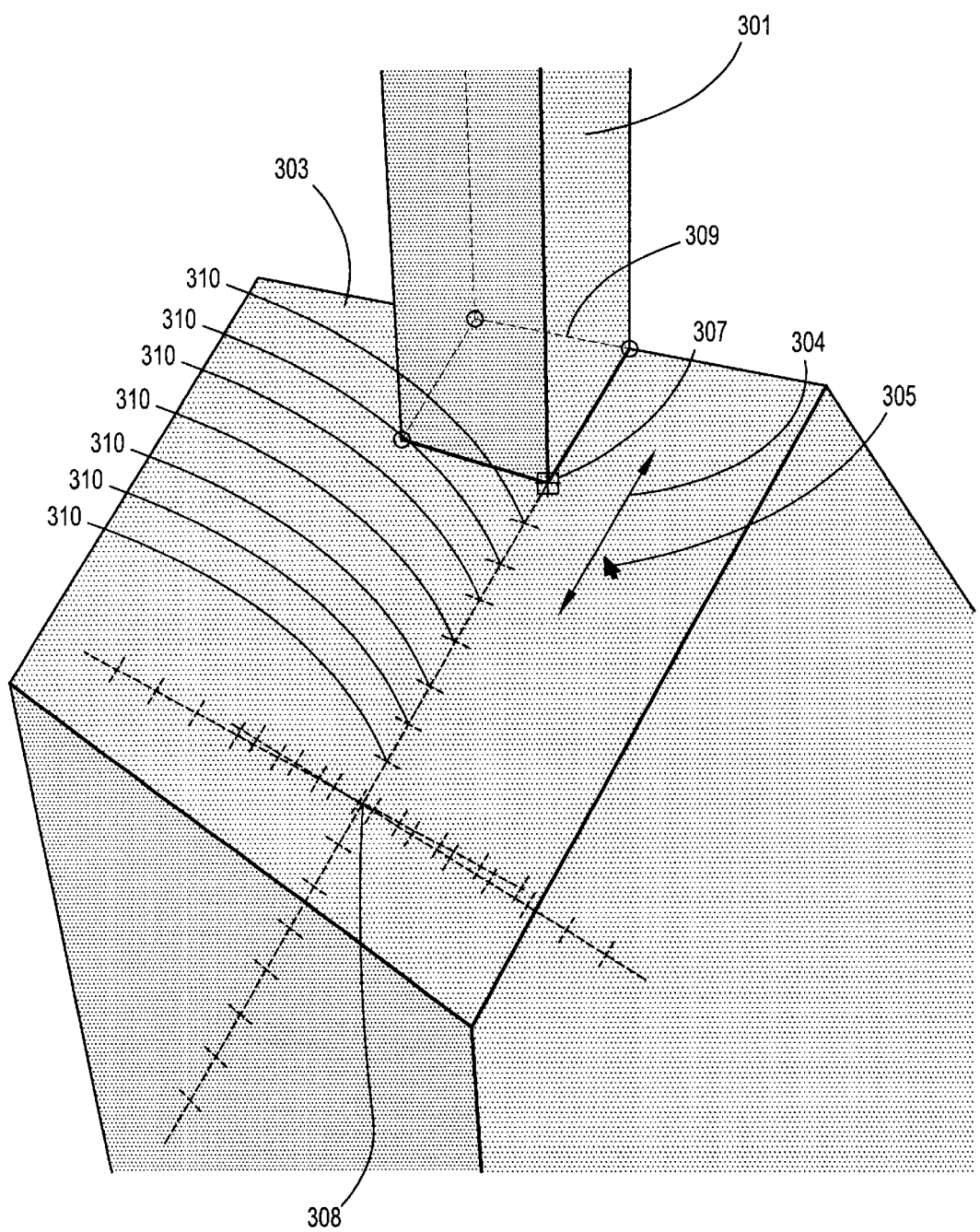

FIGS. 30A and 30B are before and after views illustrating an example of using a relative grid to position a chimney 301 on a roof 303 of a house 300 through translational movement. In FIG. 30A, the user has designated the chimney 301 as the PEP selection with point 306 serving as the master PEP selection. The user next designates the roof polygon 303 as the motion plane and constrains movement within the motion plane to the directions indicated by arrow 304. Because the relative grid feature has been activated, a set of blue-and-white 3D axes 308 is displayed to indicate the three directions in which motion can be constrained relative to the motion plane.

As the user shift-drags the cursor 305, the PEP selection (the chimney 301) translates along the motion plane accordingly as shown in FIG. 30B. At the same time, tick marks 310 appear along the blue-and-white axes, one new tick mark 310 appearing each time the user moves the PEP selection by an increment on the grid. In this example, the user has moved the master PEP selection 306 eight increments. The alignment indicator 307, which remains coincident with the master PEP selection, provides visual feedback to the user as the cursor 305 passes each new tick mark 310 by displaying a "*" bounded by a square to indicate that the master PEP selection 306 coincides with the tick mark. In addition, the cursor 305 becomes sticky each time it passes a tick mark 310 to provide sensory feedback to the user.

Figure 31A:
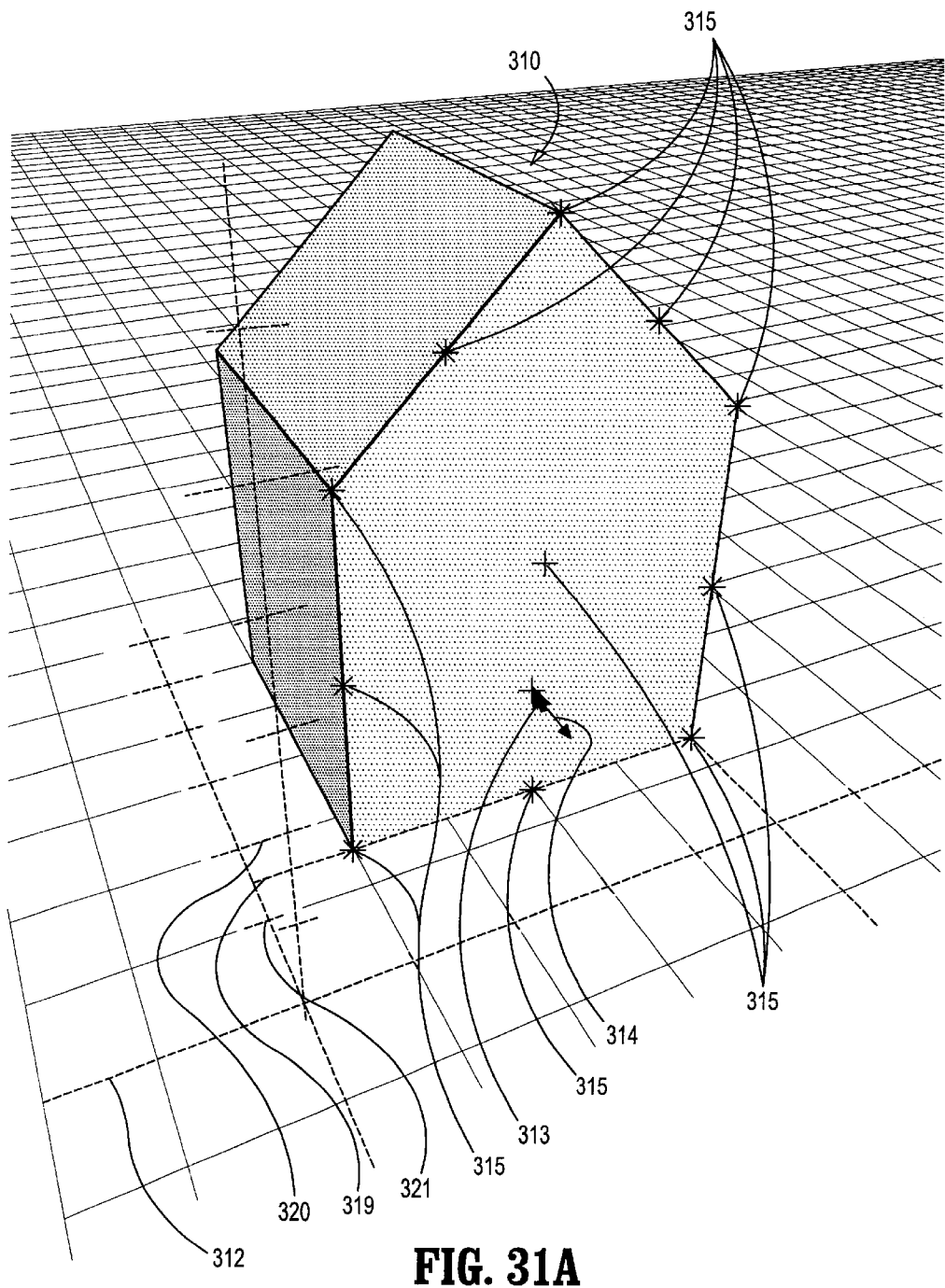
FIGS. 31A–31B show an example of translating a front surface of a house relative to an absolute grid.
Figure 31B:
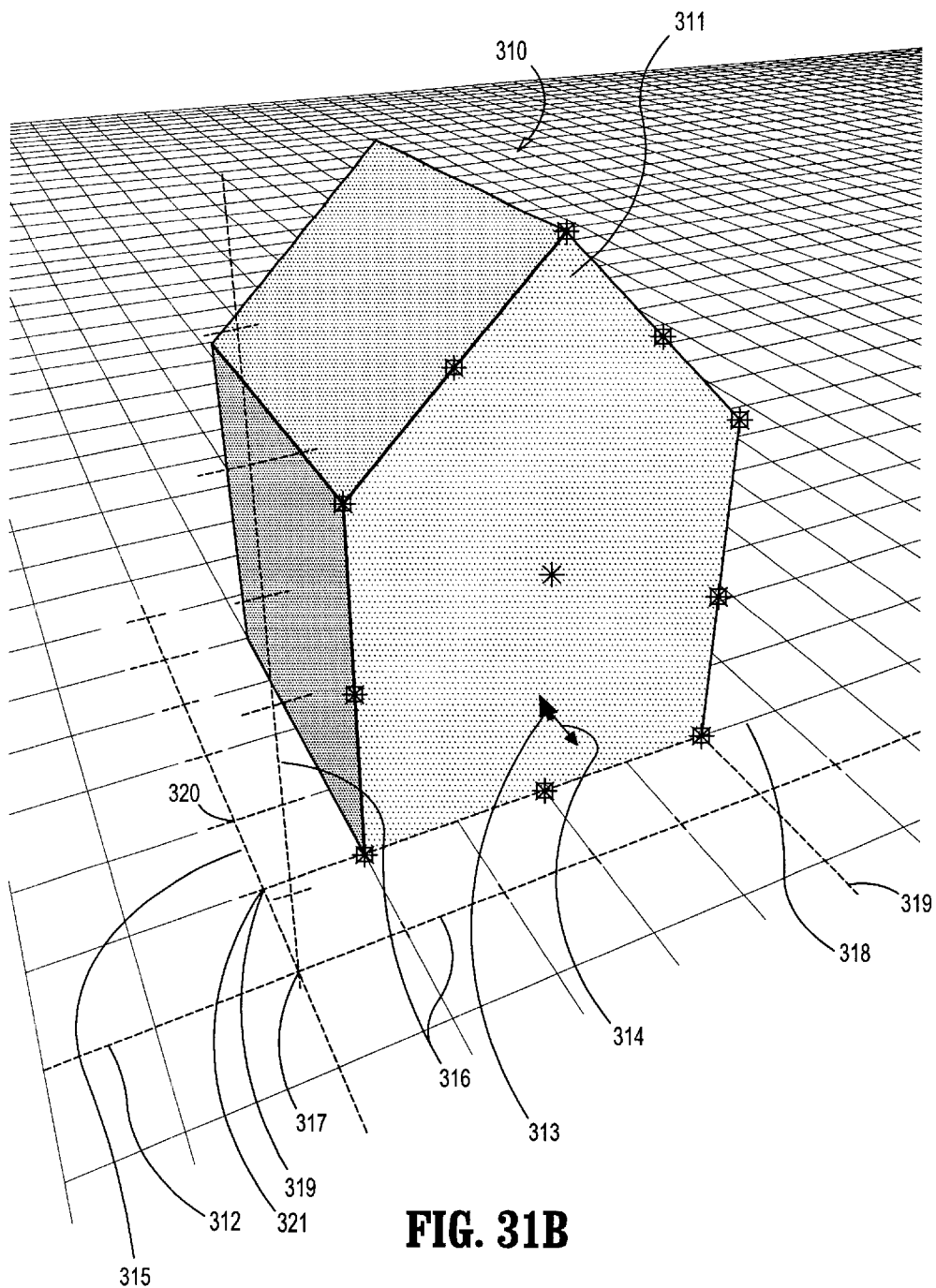

FIGS. 31A and 31B are before and after views illustrating an example of using an absolute grid 312 to align a front surface 311 of a house 310 with a grid line 318 of the absolute grid 312. As shown FIG. 31A, the house's front surface 311 is aligned with lines of the grid 312 in two dimensions, as indicated by the "*" symbol in the eleven alignment indicators 315, but the surface sits in between tick marks 320 and 321 in the third dimension. To bring the surface 311 into full 3D alignment with the grid 312, the user first designates the surface 311 both as the PEP selection and as the motion plane, and then control-drags the cursor 313 to constrain motion to the normal of the motion plane as indicated by the bi-directional arrow 314. Blue-and-white reference lines give the user a visual indication of the PEP selection's position relative to the grid 312.

As shown in FIG. 31B, the user control-drags the cursor 313 toward tick mark 321 until it snaps into alignment, at which point the user is provided with sensory feedback (cursor stickiness) as well as visual feedback (the symbol in each of the eleven alignment indicators 315 changes from a "*" to a "*" bounded by a square) to indicate that the PEP selection has become fully aligned in 3D.

Figure 32A:
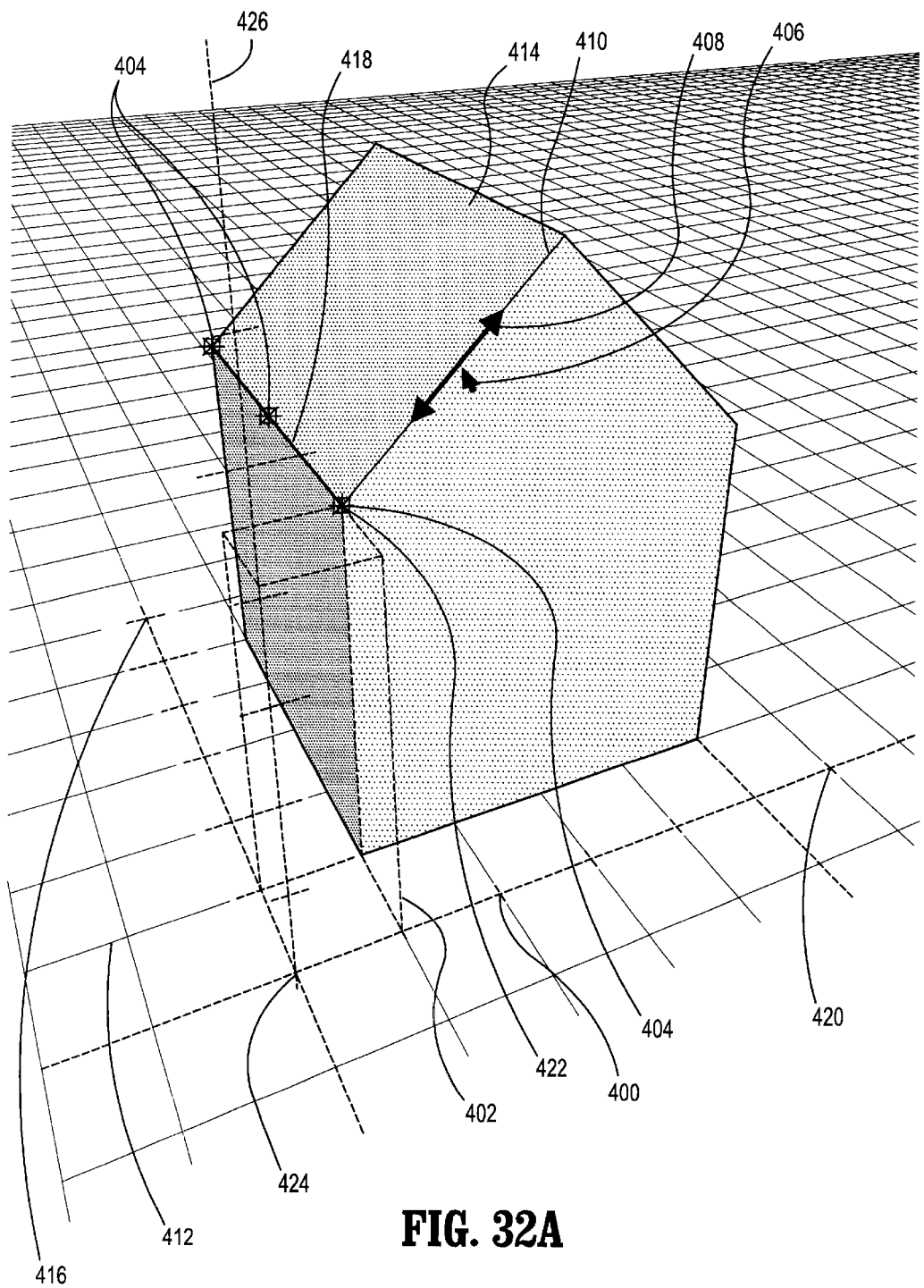
FIGS. 32A–32C show an example of modifying a roof polygon of a house using an absolute grid.
Figure 32B:
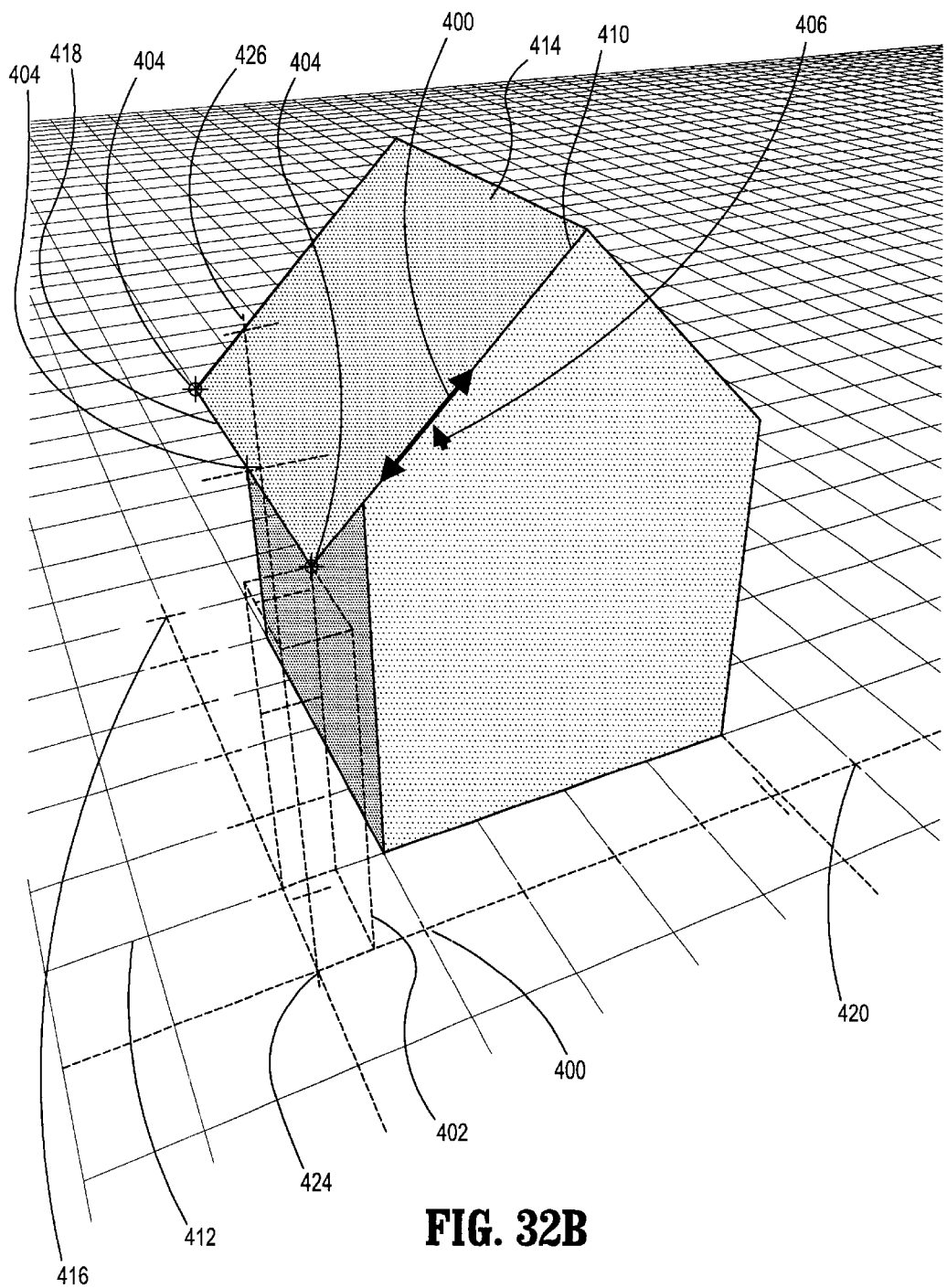
Figure 32C:
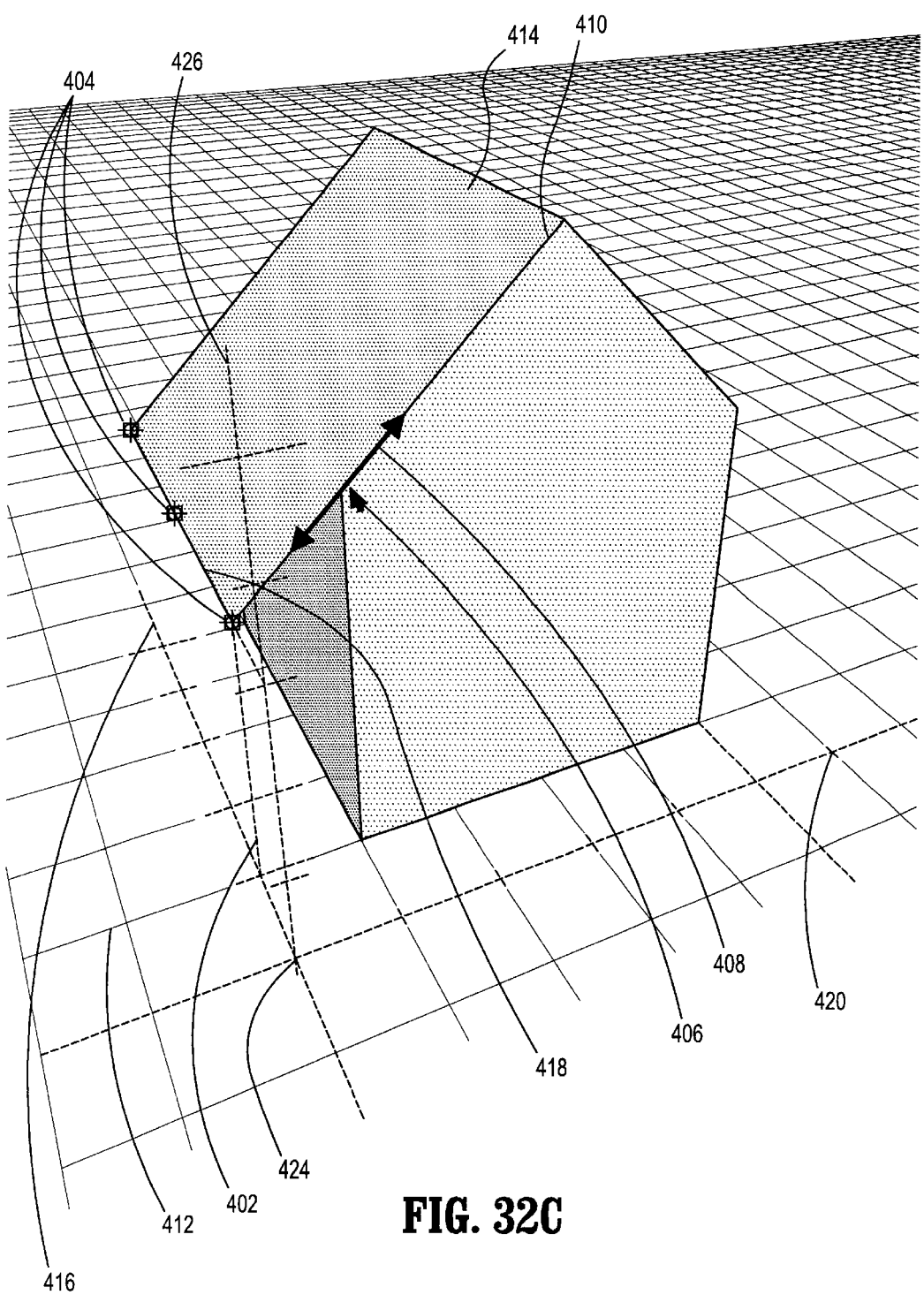

FIGS. 32A, 32B and 32C are before, during and after views illustrating an example of adding an overhang to a roof polygon 414 by extending a roof edge 418 until it snaps into alignment with an absolute grid 412. In contrast to the absolute grid example shown in FIGS. 31A–31B, the motion plane in this example is not aligned with the absolute grid to which a feature of the object is aligned. This example is illustrative of the high degree of flexibility that results from allowing users to define coordinate spaces on-the-fly relative to features in the scene. Specifically, an object can be manipulated relative to one coordinate space (e.g., the coordinate space defined by designating roof edge 410 as the reference PEP) while simultaneously aligning the object relative to a separate and independent coordinate space (e.g., the coordinate space defined by the absolute grid 312).

As shown in the "before" view of FIG. 32A, the roof edge 418 is aligned with lines of the grid 312 in all three dimensions, as indicated by the "*" symbol bounded by a square in the three alignment indicators 404. To create an overhang, the user designates roof edge 418 as the PEP selection and the roof edge 410 as the reference PEP, and shift-drags the cursor generally in the direction indicated by arrow 408 towards the origin 424 of the grid 412. In response, visual feedback in the form of a blue-and-white wire frame box 402 is displayed between the house's corner 422 and the origin 424 of the absolute grid 412. As the cursor 406 is shift-dragged by the user, the blue-and-white wire frame box 402 rubber-bands and becomes smaller in two dimensions as the roof polygon 414 is extended in the direction of shift-dragging.

As shown in the "during" view of FIG. 32B, the position of the roof edge 418, when projected onto the grid plane 412, is at a point midway between tick mark 400 and origin 424. Consequently, the symbols in the alignment indicators 404 have changed from a "*" in a square to a "+" to indicate that roof edge 418 is aligned with grid 412 only in the single direction along the grid axis 416. The blue-and-white wire frame box 402 has shrunk by about one-half of a grid unit along each of the grid axes 420 and 426.

As shown in the "after" view of FIG. 32C, the user continues to shift-drag the cursor 406 until edge 418 once again comes into full 3D alignment with the absolute grid. At the point of alignment shown in FIG. 32C (i.e., roof edge 418 is coplanar with the plane defined by grid axes 426 and 416), the user is provided with sensory feedback (cursor stickiness) and visual feedback (blue-and-white wire frame box 402 collapses in one dimension to form a-blue-and-white wire frame square; symbols change in the alignment indicators 404) to indicate that alignment has been achieved.

Figure 33A:
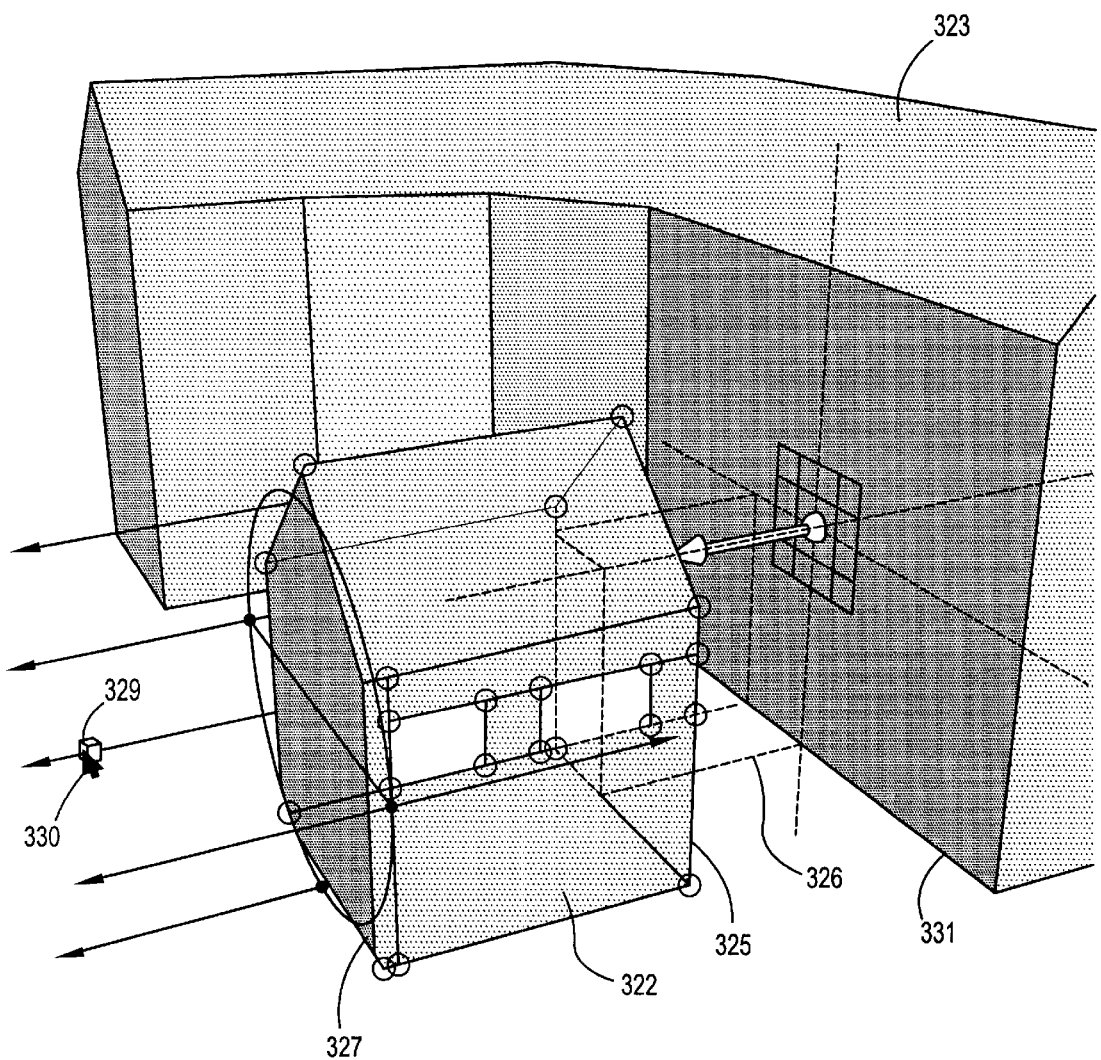
FIGS. 33A–33B show an example of scaling a house using a snap target.
Figure 33B:
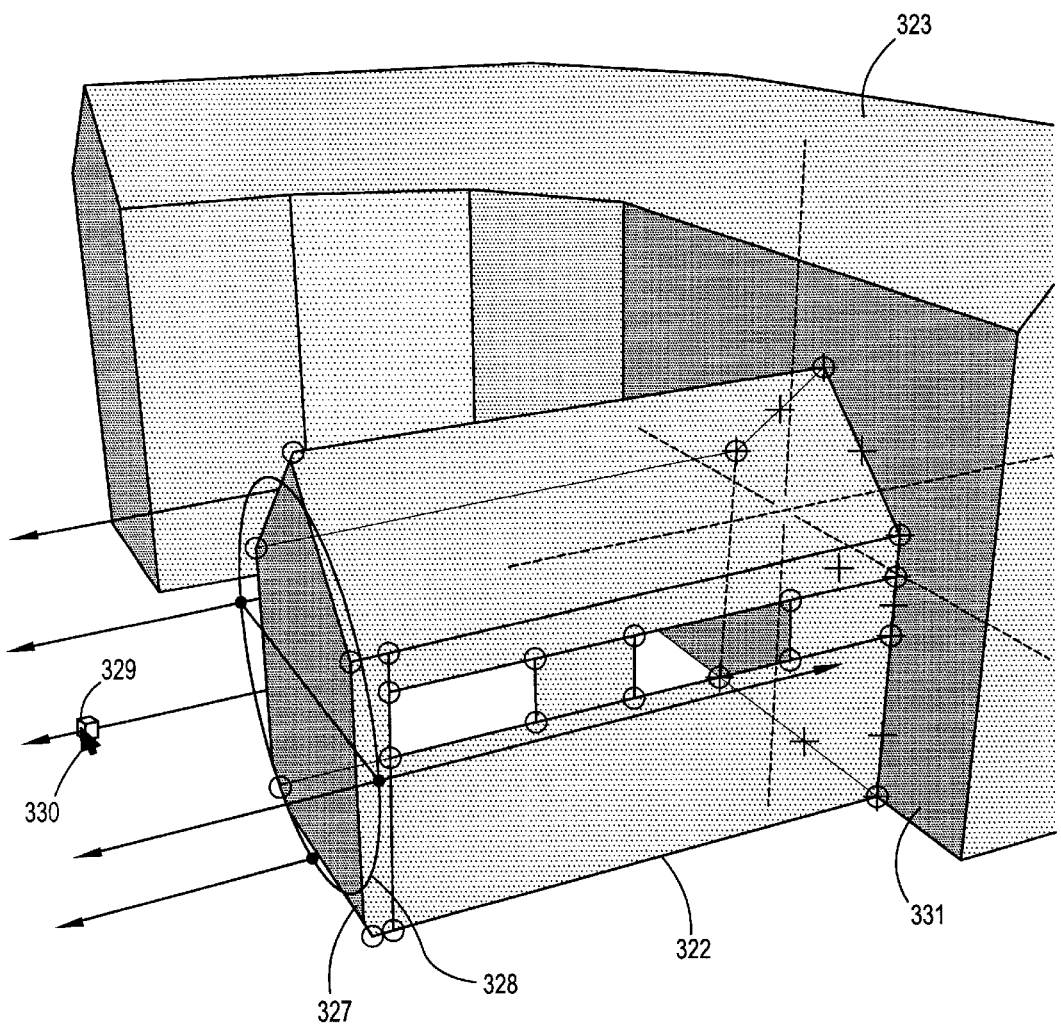

The snap target and relative grid alignment mechanisms described above also can be used when scaling or rotating PEPs. FIGS. 33A and 33B show before and after views of an example of using a snap target to stretch (scale in one dimension) a house 322 until a surface 325 of the house coincides with a surface 331 of a barn 323. The user first designates all of the PEPs in the house 322 as the PEP selection, with the house's surface 325 opposite the barn 323 serving as the master PEP selection, and then positions the PEP jack such that its wheel 328 is coplanar with surface 327 of the house 322. The user positions the snap target 324 on the barn's surface 331 and then shift-drags the scaling cube 329 away from the PEP jack until the house's surface 325 coincides with the barn's surface 331 as shown in FIG. 33B. During the scaling operation, the user is provided with the same sensory feedback (cursor stickiness) and visual feedback (rubber-banding blue-and-white wire frame box 326; changing symbols in alignment indicators) as discussed above in connection with FIGS. 29A–29E.

A relative grid also may be used to aid in the scaling of PEPs in a manner similar to that shown in FIGS. 30A and 30B. As the user scales the PEP selection up or down by an increment of the relative grid, the user would be provided with visual and sensory feedback in the manner described above.

Figure 34A:
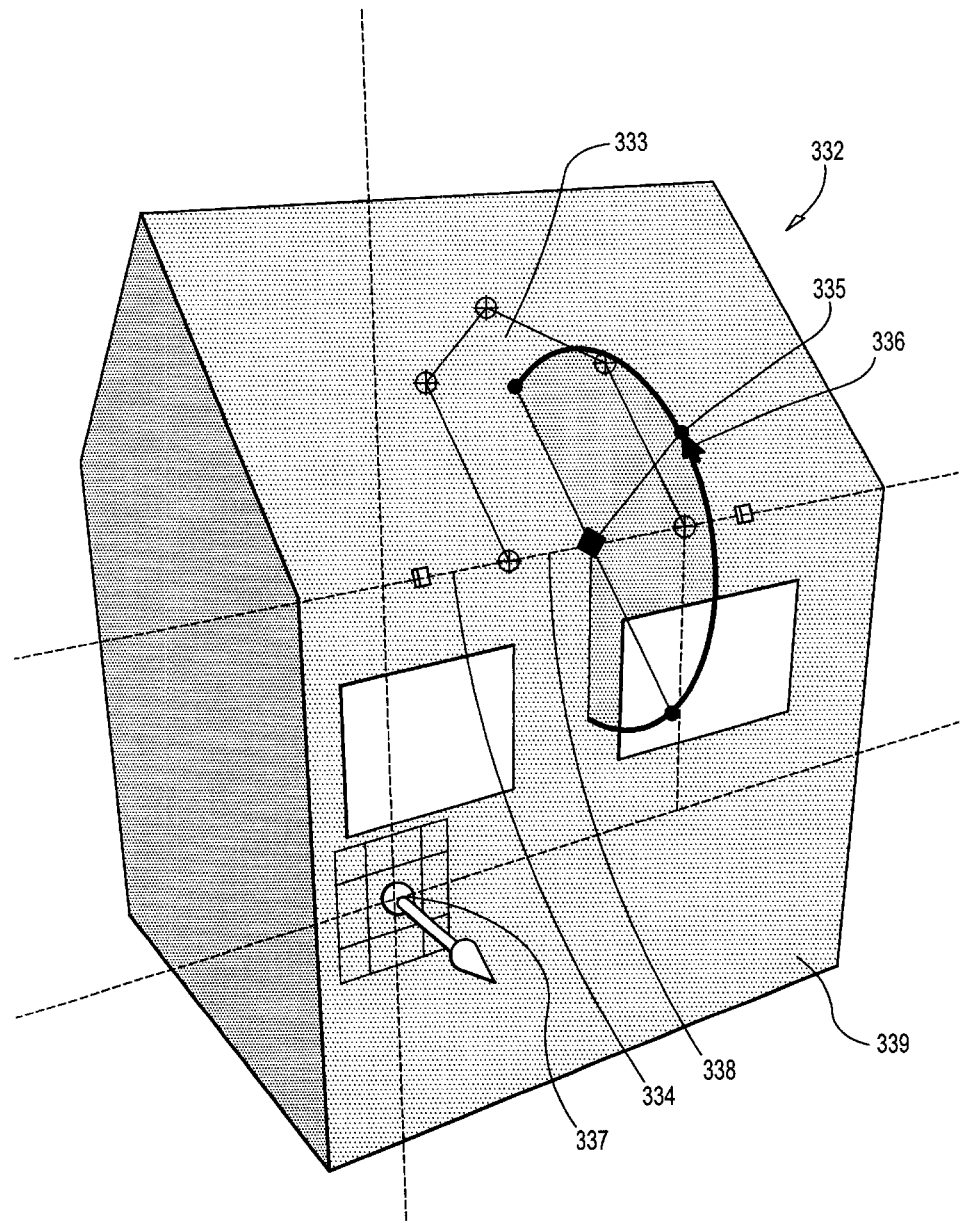
FIGS. 34A–34B show an example of rotating a polygon using the PEP jack to form a dormer on a house.
Figure 34B:
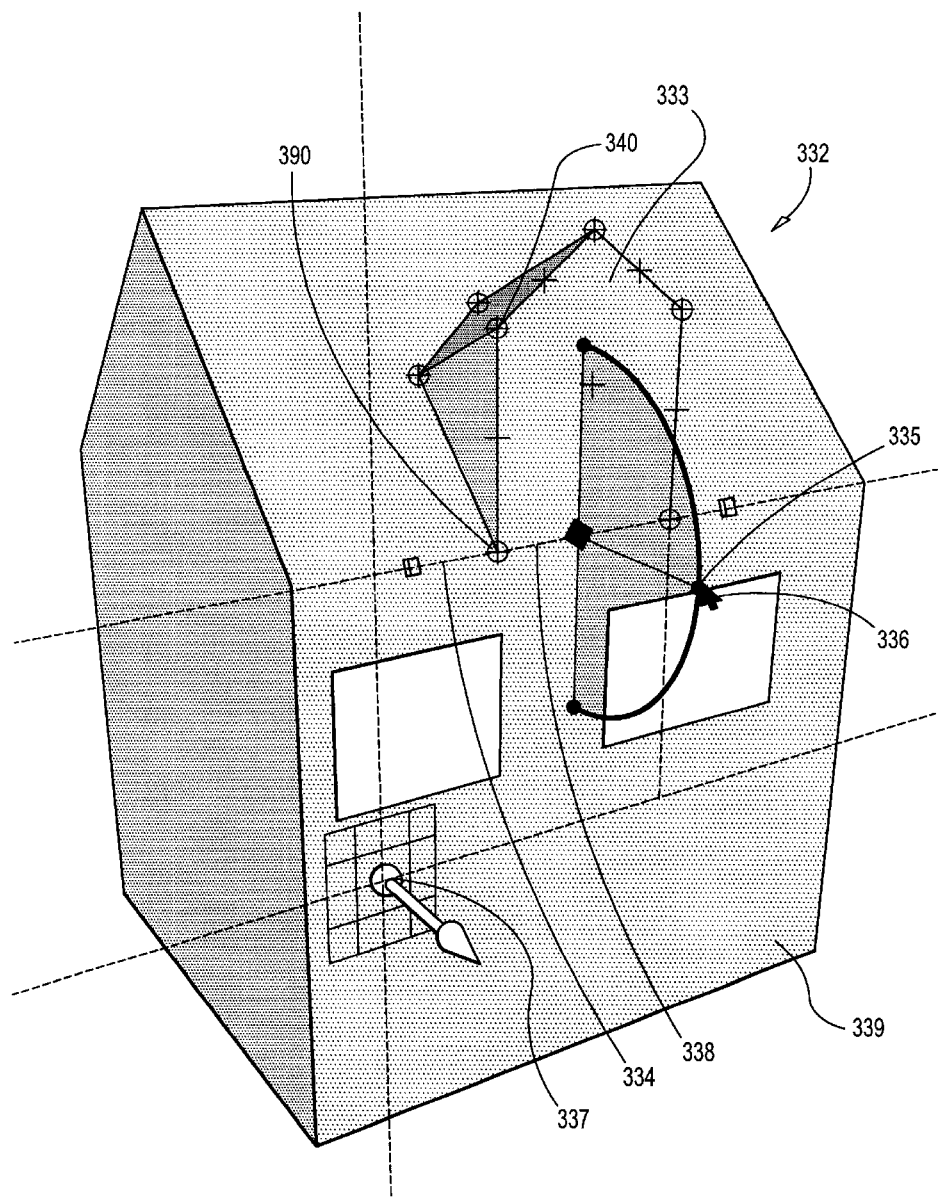

FIGS. 34A and 34B are before and after views illustrating an example of forming a dormer 333 on a house 332 by aligning PEPs to a snap target through rotational movement. As shown in FIG. 34A, polygon 333 has been pre-cut and extruded and will be used to form the dormer. The user has positioned the PEP jack such that its axle 334 is colinear with a roof edge 338 about which the dormer polygon 333 will be rotated. After placing the snap target 337 on a front surface 339 of the house 332, the user clicks cursor on a rotation knob 335 and drags it until the dormer 333 snaps into alignment (i.e., becomes flush) with the front surface 339 of the house 332, at which point the alignment indicators 340 change from a "." symbol to a "+" in a bounding square to indicate alignment.

Figure 35:
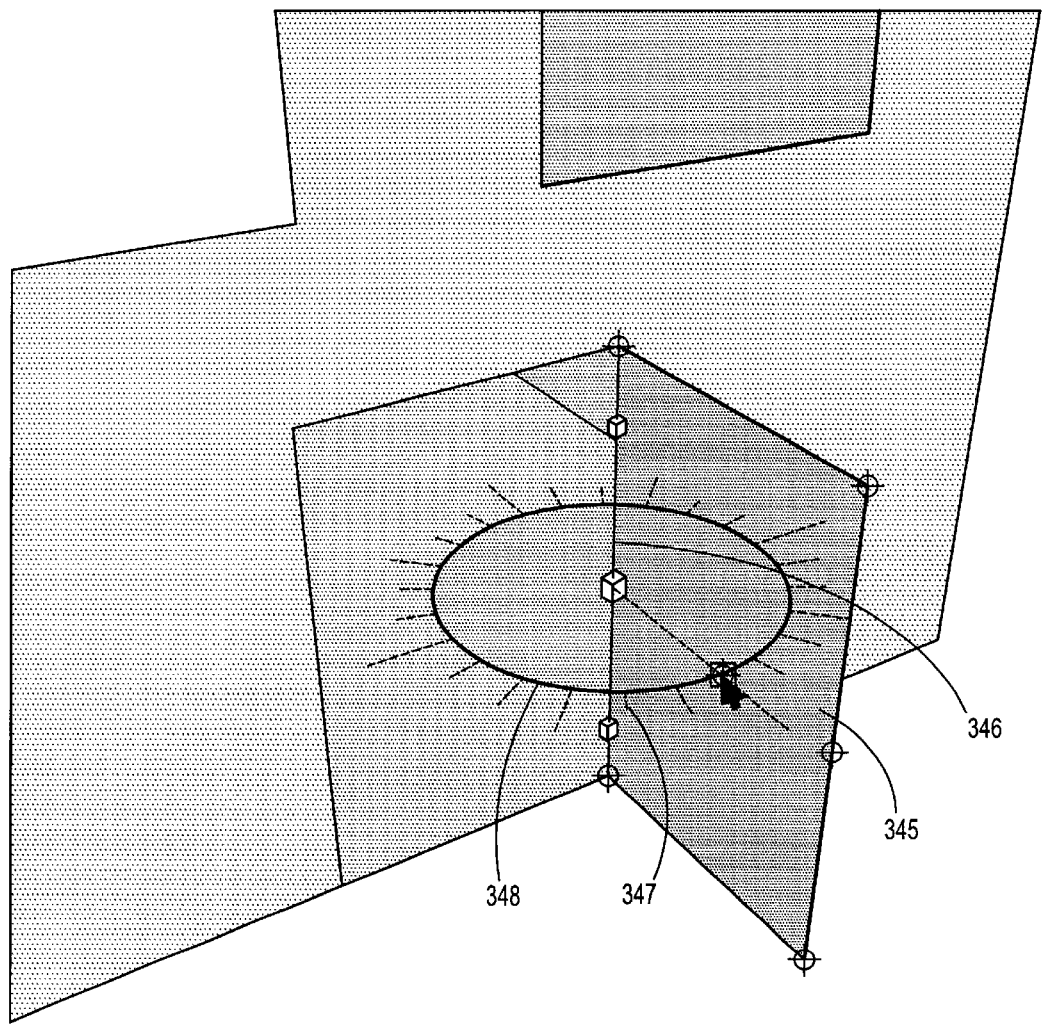
FIG. 35 shows a door being rotated using the PEP jack with a relative grid activated.

FIG. 35 shows an example of aligning rotational movement to increments on a relative protractor. As the user rotates the door about the PEP jack's axle 346, the user can align the door with tick marks 347 which are displayed at even increments around the PEP jack's wheel 348. Alignment feedback, both visual and sensory, are provided to the user as described above to indicate when the door 345 has come into alignment with a tick mark 347.

Figure 36A:
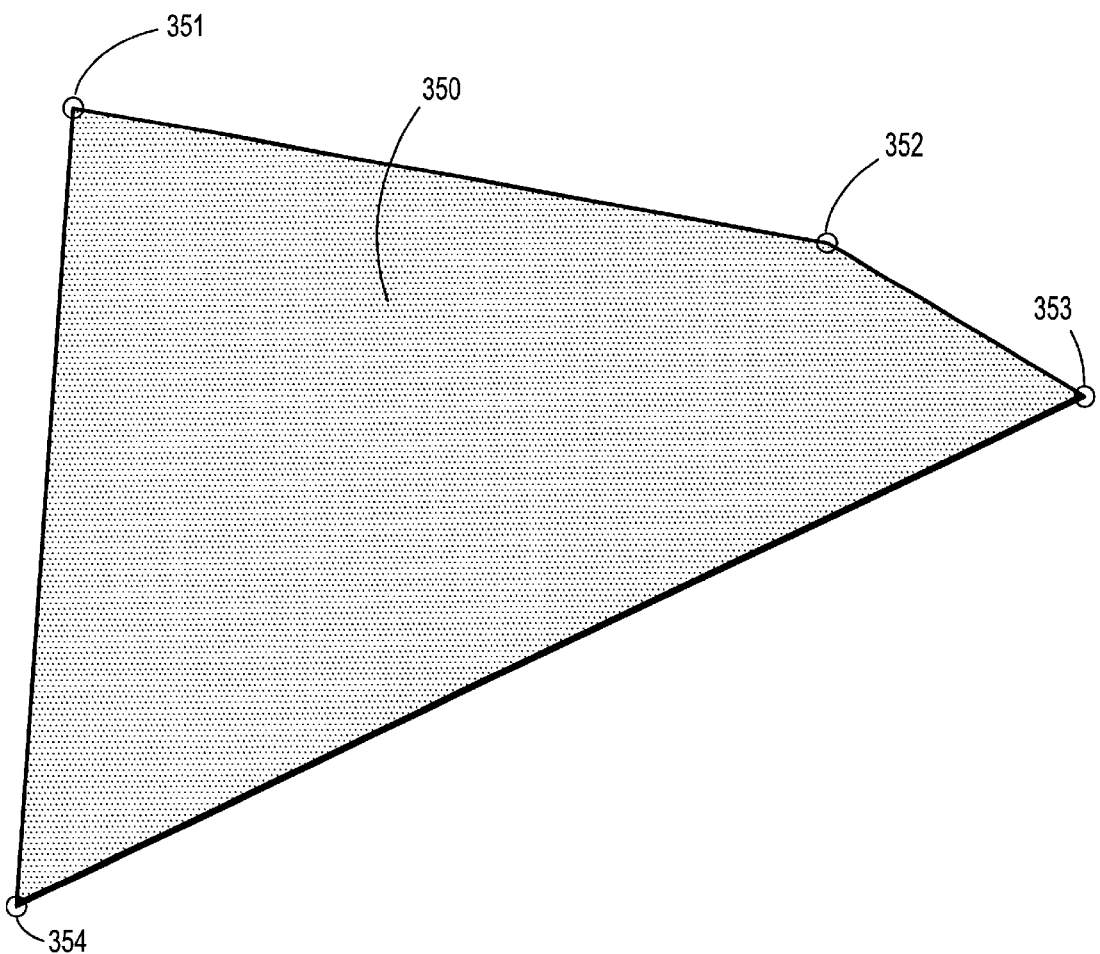
FIGS. 36A–36C and 37A–37B illustrate motion plane definition relative to cursor positions within a warped polygon.
Figure 36B:
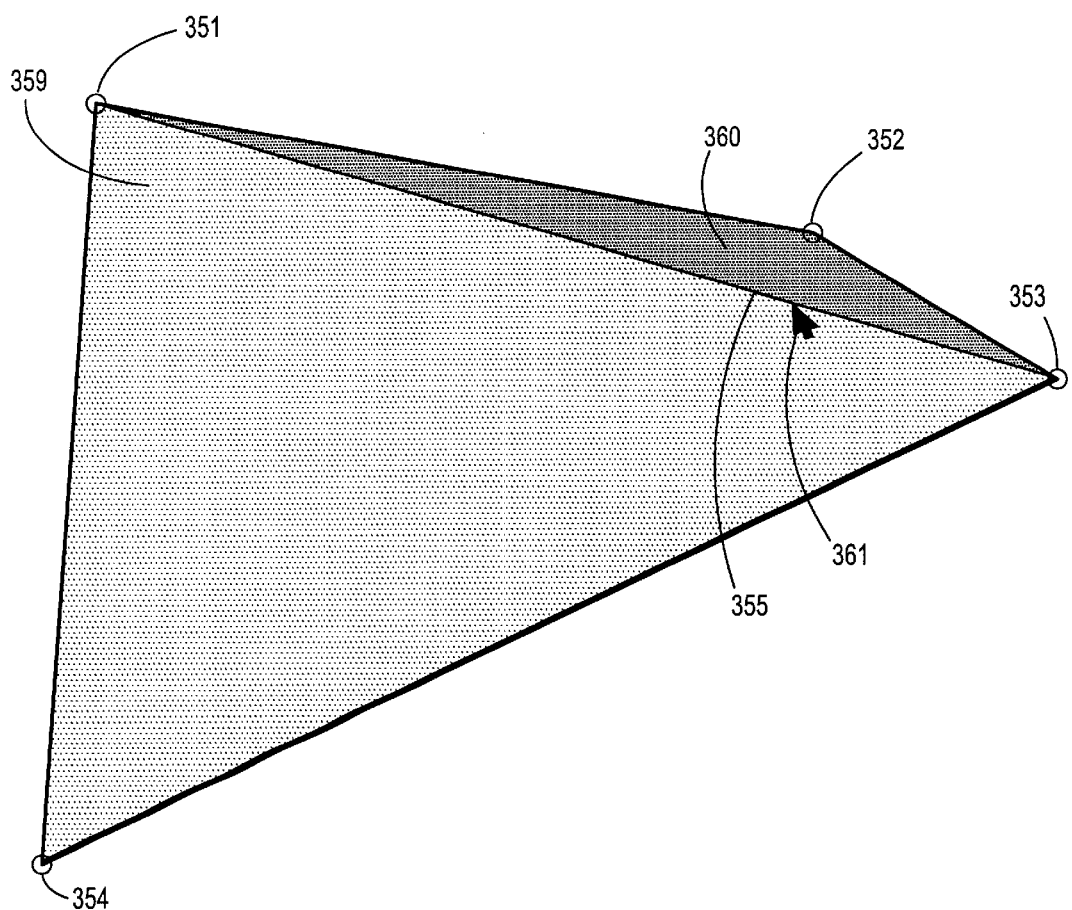
Figure 36C:
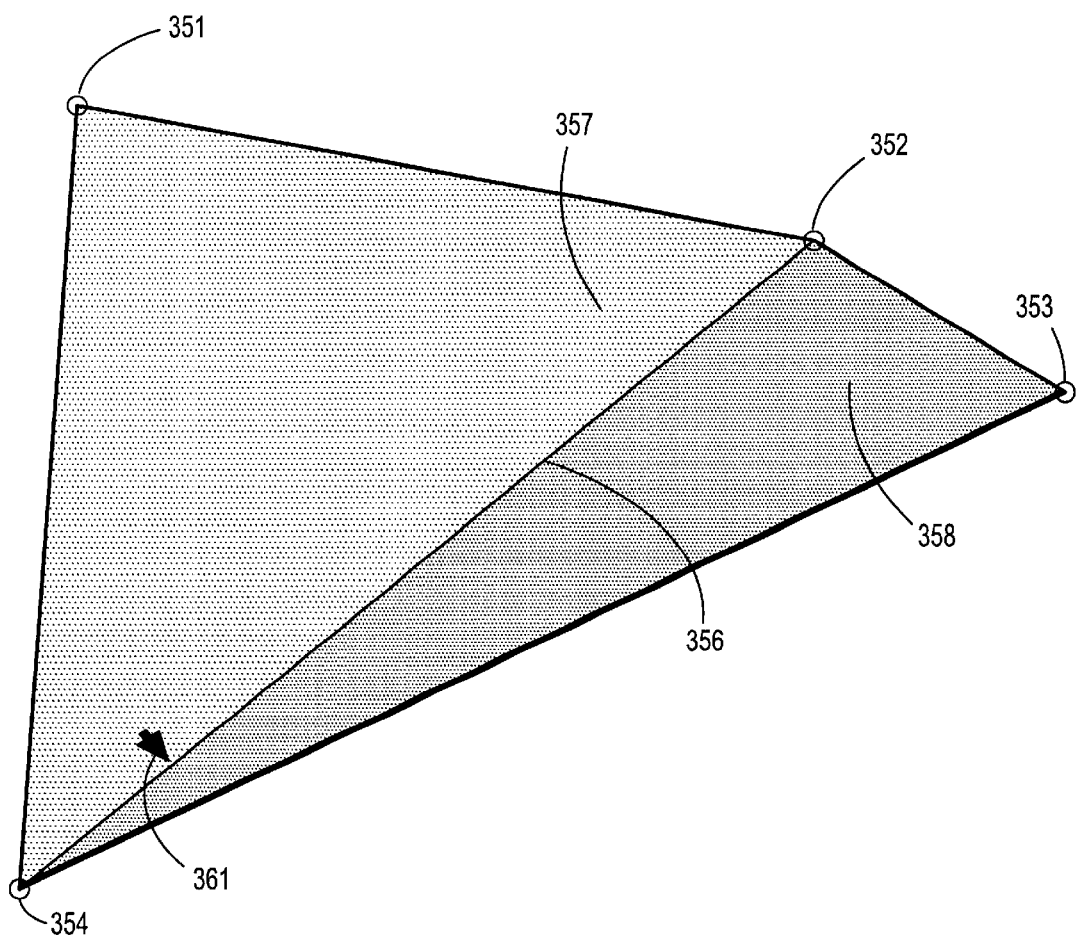

FIGS. 36A through 37B illustrate how Cosmo™ Worlds handles motion constraint and object manipulation for the special case presented by warped polygons. A warped polygon 350 as shown in FIG. 36A is defined as a polygon whose vertex points do not all lie in the same plane. As a result, the polygon's topology is indeterminate. Based on the relative positions of its vertices, the warped polygon 350 could represent either a peak as shown in FIG. 36B if points 351 and 353 were connected by an edge 355 (which would be the summit ridge of the peak) or the warped polygon could represent a valley as shown in FIG. 36C if points 354 and 352 were connected by an edge 356 (which would be the basin ridge of the valley).

When a non-warped polygon is designated as the reference PEP, the corresponding motion plane is coplanar with the non-warped polygon. However, a warped polygon is formed, by definition, of at least two non-coplanar planes, only one of which can be used as the motion plane. Depending on where the user has placed the cursor in designating the warped polygon as the reference PEP, the choice of which plane within the polygon should be used as the motion plane is ambiguous. For example, if the user placed the cursor 361 within the warped polygon 350 near point 354 in the valley configuration shown in FIG. 36C, it would be unclear whether the user intended for plane 357 or plane 358 to serve as the motion plane. Similarly, if the user placed the cursor 361 within the warped polygon 350 near point 353 in the peak configuration shown in FIG. 36B, it would be unclear whether the user intended for plane 359 or plane 360 to serve as the motion plane. In either case, if the wrong choice is made, the results likely will be inconsistent with the user's expectations.

To prevent confusion, Cosmo™ Worlds ensures that the motion plane choice is predictable to the user when a warped polygon is designated as the reference PEP. For example, when the warped polygon 350 is designated as the reference PEP, one of the four different potential motion planes 357, 358, 359 or 360 will be chosen as the motion plane depending on the point to which the cursor is positioned closest.

Figure 37A:
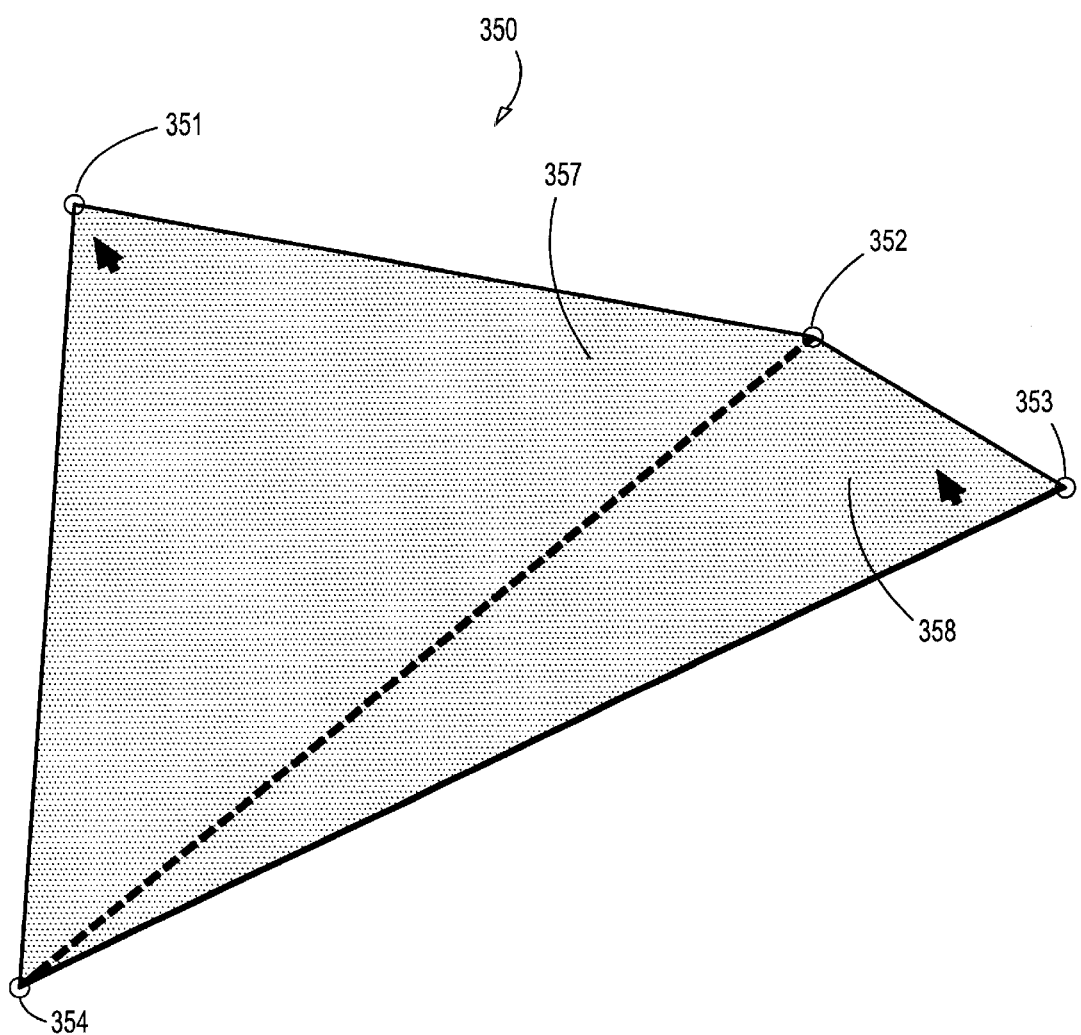
Figure 37B:
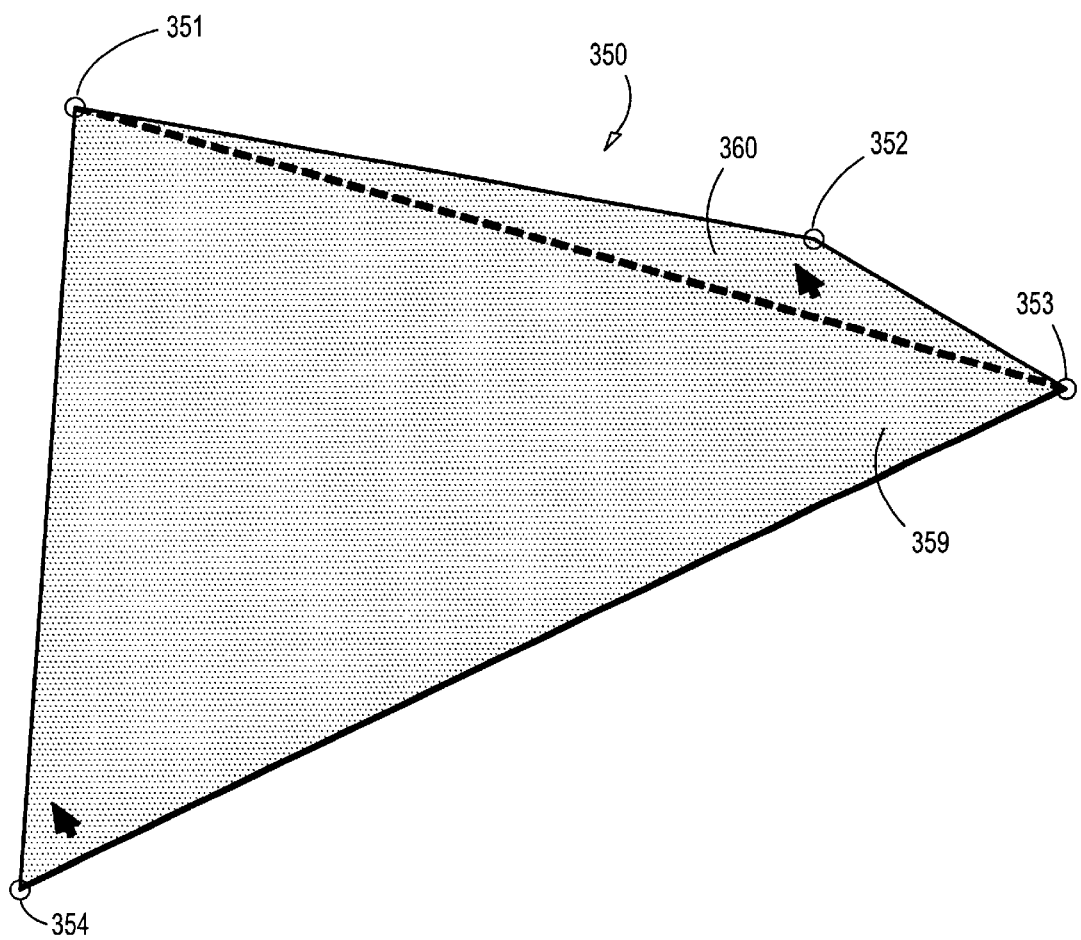

Specifically, as shown in FIGS. 37A and 37B, plane 357 will be used as the motion plane if the cursor 361 is positioned closest to point 351; plane 360 will be used as the motion plane if the cursor 361 is positioned closest to point 352; plane 358 will be used as the motion plane if the cursor 361 is positioned closest to point 353; and plane 359 will be used as the motion plane if the cursor 361 is positioned closest to point 354.

The particular motion plane calculations used by Cosmo™ Worlds enforce these motion plane choices. When a non-warped polygon is designated as the reference PEP, the motion plane can be determined by taking the cross product, or vector product, of any two adjacent edges within the polygon to determine its normal. The cross product of two edges (or vectors) E1 and E2, points in a direction perpendicular to both edges E1 and E2, and is equal to $|E1| \cdot |E2| \sin \theta$, where $|E1|$ and $|E2|$ are the respective magnitudes of the vectors E1 and E2, and $\theta$ is the angle between the vectors. The motion plane is then defined as the plane that is perpendicular to the calculated normal. However, when a warped polygon is designated as the reference PEP, Cosmo™ Worlds uses the two adjacent edges that are closest to the cursor's position to calculate the polygon's normal. Choosing a pair of adjacent edges for calculating the motion plane in this manner helps ensure that the resulting motion plane will reflect the user's intentions.

The techniques and mechanisms described here were implemented on Silicon Graphics machines using the Open Inventor Toolkit, Motif, OpenGL, and the C++ programming language. They are not limited to any particular hardware or software configuration, but rather they may find applicability in any computing environment in which graphical content may be created or manipulated. These techniques and mechanisms may be implemented in hardware or software, or a combination of the two. Preferably, implementation is achieved with computer programs executing on programmable computers that each include a processor, a storage medium readable by the processor (including volatile and non-volatile memory and/or storage elements), and suitable input and output devices. Program code is applied to data entered using the input device to perform the functions described and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A method, performed by a computer, of manipulating graphic objects in a 3D scene, the method comprising:

receiving input from a user and using the input to identify a plurality of features of a graphic object, one of the plurality of features of the graphic object comprising an edge;

defining a coordinate space with each item of input received from the user and based on the plurality of identified features of the graphic object in the 3D scene by determining at least one of a motion surface and a motion plane; and constraining a range of motion based on the defined coordinate system, wherein the determining comprises finding a plane that is perpendicular to an average of normals of polygons touching the edge of the graphic object.

2. The method of claim 1 wherein fewer than all of the polygons touching the edge are used in determining the motion plane.

3. A method, performed by a computer, of manipulating graphic objects in a 3D scene, the method comprising:

receiving input from a user and using the input to identify a plurality of features of a graphic object, one of the plurality of features of the graphic object comprising a point;

defining a coordinate space with each item of input received from the user and based on the plurality of identified features of the graphic object in the 3D scene by determining at least one of a motion surface and a motion plane by finding a plane as a function of edges that touch the point of the graphic object; and constraining a range of motion based on the defined coordinate system, wherein fewer than all of the edges touching the point are used in determining the motion plane.

4. A method, performed by a computer, of manipulating graphic objects in a 3D scene, the method comprising:

receiving input from a user and using the input to identify a plurality of features of a graphic object, one of the plurality of features of the graphic object comprising a point;

defining a coordinate space with each item of input received from the user and based on the plurality of identified features of the graphic object in the 3D scene by determining at least one of a motion surface and a motion plane by finding a plane that approximates an average of planes touching the point of the graphic object; and constraining a range of motion based on the defined coordinate space.

5. A method, performed by a computer, of manipulating graphic objects in a 3D scene, the method comprising:

receiving input from a user and using the input to identify a plurality of features of a graphic object, one of the plurality of features of the graphic object comprising a point;

defining a coordinate space with each item of input received from the user and based on the plurality of identified features of the graphic object in the 3D scene by determining at least one of a motion surface and a motion plane by finding a plane whose normal is an average of plane normals for edges that touch the point of the graphic object; and constraining a range of motion based on the defined coordinate system.

6. A method, performed by a computer, of manipulating graphic objects in a 3D scene, the method comprising:

receiving input from a user and using the input to identify a plurality of features of a graphic object;

defining a coordinate space with each item of input received from the user and based on the plurality of identified features of the graphic object in the 3D scene;

constraining a range of motion based on the defined coordinate system; and manipulating a graphic object based on the constrained range of motion, by manipulating a plurality of features in concert such that each feature is affected in an analogous manner, by manipulating a master one of the features and matching the motion of remaining features to that of the master feature.

7. A method, performed by a computer, of manipulating graphic objects in a 3D scene, the method comprising:

receiving input from a user and using the input to identify a plurality of features of a graphic object;

defining a coordinate space with each item of input received from the user and based on the plurality of identified features of the graphic object in the 3D scene; and constraining a range of motion based on the defined coordinate system, wherein the defining is based on a spatial relationship between the features.

8. A method, performed by a computer, of manipulating graphic objects in a 3D scene, the method comprising:

receiving input from a user and using the input to identify a plurality of features of a graphic object;

defining a coordinate space with each item of input received from the user and based on the plurality of identified features of the graphic object in the 3D scene;

constraining a range of motion based on the defined coordinate system; and aligning a graphic object using the constrained range of motion, wherein the aligning comprises snapping a graphic object to a constrained position.

9. A method, performed by a computer, of manipulating graphic objects in a 3D scene, the method comprising:

receiving input from a user and using the input to identify a plurality of features of a graphic object;

defining a coordinate space with each item of input received from the user and based on the plurality of identified features of the graphic object in the 3D scene;

constraining a range of motion based on the defined coordinate system; and aligning a graphic object using the constrained range of motion, wherein the aligning comprises positioning a graphic object relative to another graphic object.

10. A method, perform by a computer, of manipulating graphic objects in a 3D scene, the method comprising:

receiving input from a user and using the input to identify a plurality of features of a graphic object;

defining a coordinate space with each item of input received from the user and based on the plurality of identified features of the graphic object in the 3D scene;

constraining a range of motion based on the defined coordinate system; and aligning a graphic object using the constrained range of motion, wherein the aligning comprises positioning a graphic object with a relative grid.

11. A method, performed by a computer, of manipulating graphic objects in a 3D scene, the method comprising:

receiving input from a user and using the input to identify a plurality of features of a graphic object;

defining a coordinate space with each item of input received from the user and based on the plurality of identified features of the graphic object in the 3D scene;

constraining a range of motion based on the defined coordinate system; and aligning a graphic object using the constrained range of motion, wherein the aligning comprises translating a graphic object until a spatial condition is met.

12. A method, performed by a computer, of manipulating graphic objects in a 3D scene, the method comprising:

receiving input from a user and using the input to identify a plurality of features of a graphic object;

defining a coordinate space with each item of input received from the user and based on the plurality of identified features of the graphic object in the 3D scene;

constraining a range of motion based on the defined coordinate system; and aligning a graphic object using the constrained range of motion, wherein the aligning comprises rotating a graphic object until a spatial condition is met.

13. A method, performed by a computer, of manipulating graphic objects in a 3D scene, the method comprising:

receiving input from a user and using the input to identify a plurality of features of a graphic object;

defining a coordinate space with each item of input received from the user and based on the plurality of identified features of the graphic object in the 3D scene;

constraining a range of motion based on the defined coordinate system; and aligning a graphic object using the constrained range of motion, wherein the aligning comprises scaling a graphic object until a spatial condition is met.

14. A method, performed by a computer, of manipulating graphic objects in a 3D scene, the method comprising:

receiving input from a user and using the input to identify a plurality of features of a graphic object;

defining a coordinate space with each item of input received from the user and based on the plurality of identified features of the graphic object in the 3D scene; and constraining a range of motion based on the defined coordinate system, wherein a coordinate space is defined each time a predetermined type of input occurs and wherein when the predetermined type of input occurs, the constraining comprises restricting the range of motion relative to a plane that is coplanar with the polygon.

15. A method, performed by a computer, of manipulating graphic objects in a 3D scene, the method comprising:

receiving input from a user and using the input to identify a plurality of features of a graphic object;

defining a coordinate space with each item of input received from the user and based on the plurality of identified features of the graphic object in the 3D scene; and constraining a range of motion based on the defined coordinate system, wherein a coordinate space is defined each time a predetermined type of input occurs and wherein when the predetermined type of input occurs, the constraining comprises restricting the range of motion relative to a plane that is perpendicular to an average of normals of polygons touching that edge.

16. A method, performed by a computer, of manipulating graphic objects in a 3D scene, the method comprising:

receiving input from a user and using the input to identify a plurality of features of a graphic object;

defining a coordinate space with each item of input received from the user and based on the plurality of identified features of the graphic object in the 3D scene; and constraining a range of motion based on the defined coordinate system, wherein a coordinate space is defined each time a predetermined type of input occurs, and wherein when the predetermined type of input occurs, the constraining comprises restricting the range of motion relative to a plane that is a function of edges touching that point.

17. A method, performed by a computer, of manipulating graphic objects in a 3D scene, the method comprising:

receiving input from a user and using the input to identify a plurality of features of a graphic object in the 3D scene;

defining a coordinate space with each item of input received from the user and based on the plurality of identified features of the graphic object in the 3D scene;

receiving input that selects a type of motion constraint from a plurality of motion constraints based on the defined coordinate system; and constraining the range of motion based on the identified type of motion constraint, wherein one of the plurality of motion constraints comprises a constraint that limits motion to a plane parallel to the feature, and wherein one of the plurality of motion constraint comprises a line lying within the plane parallel to the feature.

* * * * *